US007117052B2

(12) United States Patent
Lucas et al.

(10) Patent No.: US 7,117,052 B2
(45) Date of Patent: Oct. 3, 2006

(54) VERSION CONTROL FOR OBJECTS IN A PROCESS PLANT CONFIGURATION SYSTEM

(75) Inventors: J. Michael Lucas, Leicestershire (GB); Arthur Webb, Manila (PH); Mark J. Nixon, Round Rock, TX (US); Larry O. Jundt, Round Rock, TX (US); Jian Li, Austin, TX (US); Dennis L. Stevenson, Round Rock, TX (US); Michael G. Ott, Austin, TX (US); Herschel O. Koska, San Marcos, TX (US); Robert B. Havekost, Elgin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 210 days.

(21) Appl. No.: 10/853,668

(22) Filed: May 25, 2004

(65) Prior Publication Data
US 2005/0027377 A1    Feb. 3, 2005

Related U.S. Application Data

(63) Continuation-in-part of application No. 10/368,151, filed on Feb. 18, 2003, now Pat. No. 7,043,311.

(51) Int. Cl.
*G05B 9/02* (2006.01)
(52) U.S. Cl. .......................... 700/83; 700/28; 719/315; 707/103 Y
(58) Field of Classification Search .................. 700/17, 700/18, 26, 28, 83, 87
See application file for complete search history.

(56) References Cited

U.S. PATENT DOCUMENTS

| 4,628,435 A | 12/1986 | Tashiro et al. |
| 4,736,320 A | 4/1988 | Bristol |
| 4,885,717 A | 12/1989 | Beck et al. |
| 4,972,328 A | 11/1990 | Wu et al. |

(Continued)

FOREIGN PATENT DOCUMENTS

GB    2 370 665    7/2002

(Continued)

OTHER PUBLICATIONS

Search Report Under Section 17(5), issued by UK Patent Office in GB 0403575.4 on Jun. 22, 2004.

(Continued)

*Primary Examiner*—Leo Picard
*Assistant Examiner*—Chad Rapp
(74) *Attorney, Agent, or Firm*—Marshall, Gerstein & Borun LLP

(57) ABSTRACT

A version control system helps to keep track of versions of process plant items that may represent, or be capable of representing, entities in a process plant. The process plant items may comprise, for example, module objects which may be capable of specifically representing process entities of the process plant. These module objects may be created from module class objects which may be capable of generically representing process entities of the process plant. Version data is stored and associated with a module object. The version data may comprise data indicative of a version of a module class object that was used to create the module object. The version data may also comprise data indicative of a version of the module object. Configuration systems, version control systems, viewing systems, debugging systems, run-time monitoring systems, asset management systems, etc., may examine or permit viewing of the version control data associated with an item.

11 Claims, 30 Drawing Sheets

U.S. PATENT DOCUMENTS

| | | | |
|---|---|---|---|
| 5,014,208 A | 5/1991 | Wolfson | |
| 5,051,898 A | 9/1991 | Wright et al. | |
| 5,421,017 A | 5/1995 | Scholz et al. | |
| 5,485,600 A | 1/1996 | Joseph et al. | |
| 5,485,620 A | 1/1996 | Sadre et al. | |
| 5,499,333 A | 3/1996 | Doudnikoff et al. | |
| 5,509,116 A | 4/1996 | Hiraga et al. | |
| 5,530,643 A | 6/1996 | Hodorowski | |
| 5,546,301 A | 8/1996 | Agrawal et al. | |
| 5,555,385 A | 9/1996 | Osisek | |
| 5,576,946 A | 11/1996 | Bender et al. | |
| 5,594,858 A | 1/1997 | Blevins | |
| 5,603,018 A | 2/1997 | Terada et al. | |
| 5,611,059 A | 3/1997 | Benton et al. | |
| 5,812,394 A | 9/1998 | Lewis et al. | |
| 5,862,052 A * | 1/1999 | Nixon et al. | 713/1 |
| 5,903,455 A * | 5/1999 | Sharpe et al. | 700/83 |
| 5,909,368 A * | 6/1999 | Nixon et al. | 700/2 |
| 5,950,006 A | 9/1999 | Crater et al. | |
| 6,028,998 A | 2/2000 | Gloudeman et al. | |
| 6,032,208 A | 2/2000 | Nixon et al. | |
| 6,138,174 A | 10/2000 | Keeley | |
| 6,157,864 A | 12/2000 | Schwenke et al. | |
| 6,161,051 A | 12/2000 | Hafemann et al. | |
| 6,167,316 A | 12/2000 | Gloudeman et al. | |
| 6,298,454 B1 * | 10/2001 | Schleiss et al. | 714/37 |
| 6,385,496 B1 * | 5/2002 | Irwin et al. | 700/87 |
| 6,415,418 B1 | 7/2002 | McLaughlin et al. | |
| 6,442,512 B1 | 8/2002 | Sengupta et al. | |
| 6,442,515 B1 | 8/2002 | Varma et al. | |
| 6,449,624 B1 | 9/2002 | Hammack et al. | |
| 6,477,435 B1 | 11/2002 | Ryan et al. | |
| 6,515,683 B1 | 2/2003 | Wright | |
| 6,546,297 B1 | 4/2003 | Gaston et al. | |
| 6,684,261 B1 | 1/2004 | Orton et al. | |
| 6,788,980 B1 | 9/2004 | Johnson | |
| 7,043,311 B1 * | 5/2006 | Nixon et al. | 700/83 |
| 2002/0059282 A1 * | 5/2002 | Andersson et al. | 707/100 |
| 2002/0199123 A1 | 12/2002 | McIntyre et al. | |
| 2003/0236576 A1 | 12/2003 | Resnick et al. | |

FOREIGN PATENT DOCUMENTS

| | | |
|---|---|---|
| GB | 2 377 045 | 12/2002 |
| GB | 2 398 659 | 8/2004 |
| GB | 2 398 659 A | 8/2004 |
| WO | WO-98/53398 | 11/1998 |
| WO | WO-00/70417 | 11/2000 |
| WO | WO-01/09690 | 2/2001 |
| WO | WO-03/003198 | 1/2003 |

OTHER PUBLICATIONS

Bailey, "Introducing Bailey Evolution 90TM . . . The Sound Investment Strategy for Process Automation", 1993.

Bailey, "Wide-Range, Fully Compatible Family of Process Automation and Management Sytems", 1993.

Computer Products, "Unbundling the DCS", approximately 1992.

Elsag Bailey, "Elsag Bailey automation", approximately 1993.

Fisher-Rosemount, "Managing the Process Better", Dec. 1993.

Honeywell, "Process Manager Specifiction and Technical Data", Sep. 1991.

Fisher-Rosemount, "Managing the Process Better", Sep. 1993.

Honeywell, "TDC 3000 Overview", approximately 1992.

Honeywell, "TDC 3000 Process Manager", approximately 1992.

Honeywell "UDC 6000 Process Controller", Aug. 1992.

Leeds and Northrup, "Make Your Automation Plan a Reality: MAX 1000", approximately 1990.

Reliance Electric Company, "Multitasking Capability Simplifies Process Control Design", approximately late 1980's by Angelo J. Notte.

Toshiba, "Toshiba Integrated Control Systems", Nov. 1990.

Search Report under Section 17(5) issued in GB 0418079.0 application by the United Kingdom Patent Office on Nov. 15, 2004.

Search Report under Section 17(5) issued in GB 0418080.8 application by the United Kingdom Patent Office on Nov. 17, 2004.

* cited by examiner

|  | A | B | C | D | E |
|---|---|---|---|---|---|
| 1 |  | Modules from placeholder TOTALIZER/COARSE_VALVE | | | |
| 2 |  |  |  |  |  |
| 3 |  |  | IO_OUT | IO_READBACK |  |
| 4 |  | VLV-101A | VLV-01/OUT_D | VRB-01/FIELD_VAL_D |  |
| 5 |  | VLV-201A | VLV-02/OUT_D | VRB-02/FIELD_VAL_D |  |
| 6 |  | VLV-301A | VLV-03/OUT_D | VRB-03/FIELD_VAL_D |  |
| 7 |  | VLV-401A | VLV-04/OUT_D | VRB-04/FIELD_VAL_D |  |
| 8 |  |  |  |  |  |
| 9 |  |  |  |  |  |
| 10 |  |  |  |  |  |
| 11 |  |  |  |  |  |
| 12 |  |  |  |  |  |
| 13 |  |  |  |  |  |
| 14 |  |  |  |  |  |
| 15 |  |  |  |  |  |
| 16 |  |  |  |  |  |
| 17 |  |  |  |  |  |

IO / Parameters / Fieldbus / Placeholders

VERSION CONTROL FOR OBJECTS IN A PROCESS PLANT CONFIGURATION SYSTEM

CROSS-REFERENCES TO RELATED APPLICATIONS

The present application is a continuation-in-part of U.S. patent application Ser. No. 10/368,151, entitled "MODULE CLASS OBJECTS IN A PROCESS PLANT CONFIGURATION SYSTEM," filed on Feb. 18, 2003 now U.S. Pat. No. 7,043,311, which is hereby incorporated by reference herein in its entirety for all purposes.

The present application is related to copending U.S. patent application Ser. No.10/853,655, entitled "SECURITY FOR OBJECTS IN A PROCESS PLANT CONFIGURATION SYSTEM," filed on same day as the present application, which is hereby incorporated by reference herein in its entirety for all purposes.

FIELD OF THE DISCLOSURE

The present invention relates generally to process plants and, more particularly, to version control related to configuration of a process plant.

BACKGROUND

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process plant.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Fisher Rosemount Systems, Inc. includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Presently, configuration applications may include a library of template objects, such as function block template objects and, in some cases, control module template objects. These configuration applications are used to configure a control strategy for a process plant. The template objects all have default properties, settings and methods associated therewith and the engineer using the configuration application can select these template objects and essentially place copies of the selected template objects into a configuration screen to develop a control module. During the process of selecting and placing the template objects into the configuration screen, the engineer interconnects the inputs and outputs of these objects and changes their parameters, names, tags and other properties to create a specific control module for a specific use in the process plant. After creating one or more such control modules, the engineer can then instantiate the control module and download it to the appropriate controller or controllers and field devices for execution during operation of the process plant.

Thereafter, the engineer generally creates one or more displays for operators, maintenance personnel, etc. within the process plant by selecting and building display objects in a display creation application. These displays are typically implemented on a system wide basis in one or more of the workstations and provide preconfigured displays to the operator or maintenance persons regarding the operating state of the control system or the devices within the plant.

Typically, these displays take the form of alarming displays that receive and display alarms generated by controllers or devices within the process plant, control displays indicating the operating state of the controllers and other devices within the process plant, maintenance displays indicating the functioning state of the devices within the process plant, etc. These displays are generally preconfigured to display, in known manners, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc.

Similar to the control configuration application, a display creation application has template graphical display items, such as tanks, valves, sensors, operator control buttons like slide bars, on/off switches, etc. which may be placed on a screen in any desired configuration to create an operator display, maintenance display and the like. When placed onto the screen, individual graphic items may be interconnected on the screen in a manner that provides some information or display of the inner-workings of the process plant to different users. However, to animate the graphic display, the display creator must manually tie each of the graphical items to data generated within the process plant, such as data measured by sensors or indicative of valve positions, etc. by specifying a communication link between the graphic item and the relevant data source within the process plant. This process is tedious, time consuming and maybe fraught with error.

While the control template objects within the control configuration application and the display items within the display creation application are convenient because they can be copied and used to create many different control modules and graphical displays, there is often a need to create numerous of the same control module and graphical display for different equipment within the process plant. For example, many medium to large sized process plants have numerous instances of the same or similar equipment that can be controlled and viewed using the same basic general control module and display. To create these numerous control modules and displays, however, a general control module or display module is created and this general control or display module is then copied for each of the different pieces of equipment for which it is applicable. Of course, after being copied, each of the new control or display modules must be manually altered in the configuration application to specify the particular equipment to which it is attached and all of these control and display modules must then be instantiated and downloaded to the process control system.

Unfortunately, the control modules and displays items discussed above are not modular in any manner. Thus, after being copied, each of the control modules and displays must be manually and individually altered using the appropriate configuration application to specify the equipment within the plant to which they are to be associated. In a plant having many copies of the same type of equipment (i.e., replicated equipment), this process is tedious, time consuming and fraught with operator introduced errors. Still further, once programmed, these different control modules and displays are not aware of each other. Therefore, to make a change to the control modules once created, the engineer or operator must manually make the same change to each of the different control modules for the different replicated equipment which, again, is time consuming and tedious. The same problem applies for the graphical views created for the different sets of replicated equipment within the plant. In other words, once a specific control module or a specific graphical view is created (individually or by being copied from a template object) and is then tied to a particular set of equipment within the plant, this control module or graphical view exists as a separate entity or object within the system without any automatic awareness of the other control modules or graphical displays that are the same or similar to it. As a result, changes applicable to every one of the control modules and graphical displays of a particular type must be made individually on those modules and displays.

Still further, because each control module and display is an individual object, it must be open, in the sense that all of its internal parameters, views, function blocks, and other elements must be made available to any user to be changed, viewed, etc. Currently, there is no manner of controlling what certain operators or other users may see or have access to in these control modules and displays and, thus, there is no ability to hide certain elements of these control modules and displays, such as proprietary software and methods, alarming activities, etc. from the user of the control modules and displays.

SUMMARY

A version control system helps to keep track of versions of process plant items that may represent, or be capable of representing, entities in a process plant. The process plant items may comprise, for example, module objects which may be capable of specifically representing process entities of the process plant. These module objects may be created from module class objects which may be capable of generically representing process entities of the process plant. Version data is stored and associated with a module object. The version data may comprise data indicative of a version of a module class object that was used to create the module object. The version data may also comprise data indicative of a version of the module object. Configuration systems, version control systems, viewing systems, debugging systems, run-time monitoring systems, asset management systems, etc., may examine or permit viewing of the version control data associated with an item.

BRIEF DESCRIPTION OF THE DRAWINGS

FIG. 15 is a depiction of an eighth configuration screen which may be used by a configuration operator to configure a process plant using module class objects.

DETAILED DESCRIPTION

Figure 1:
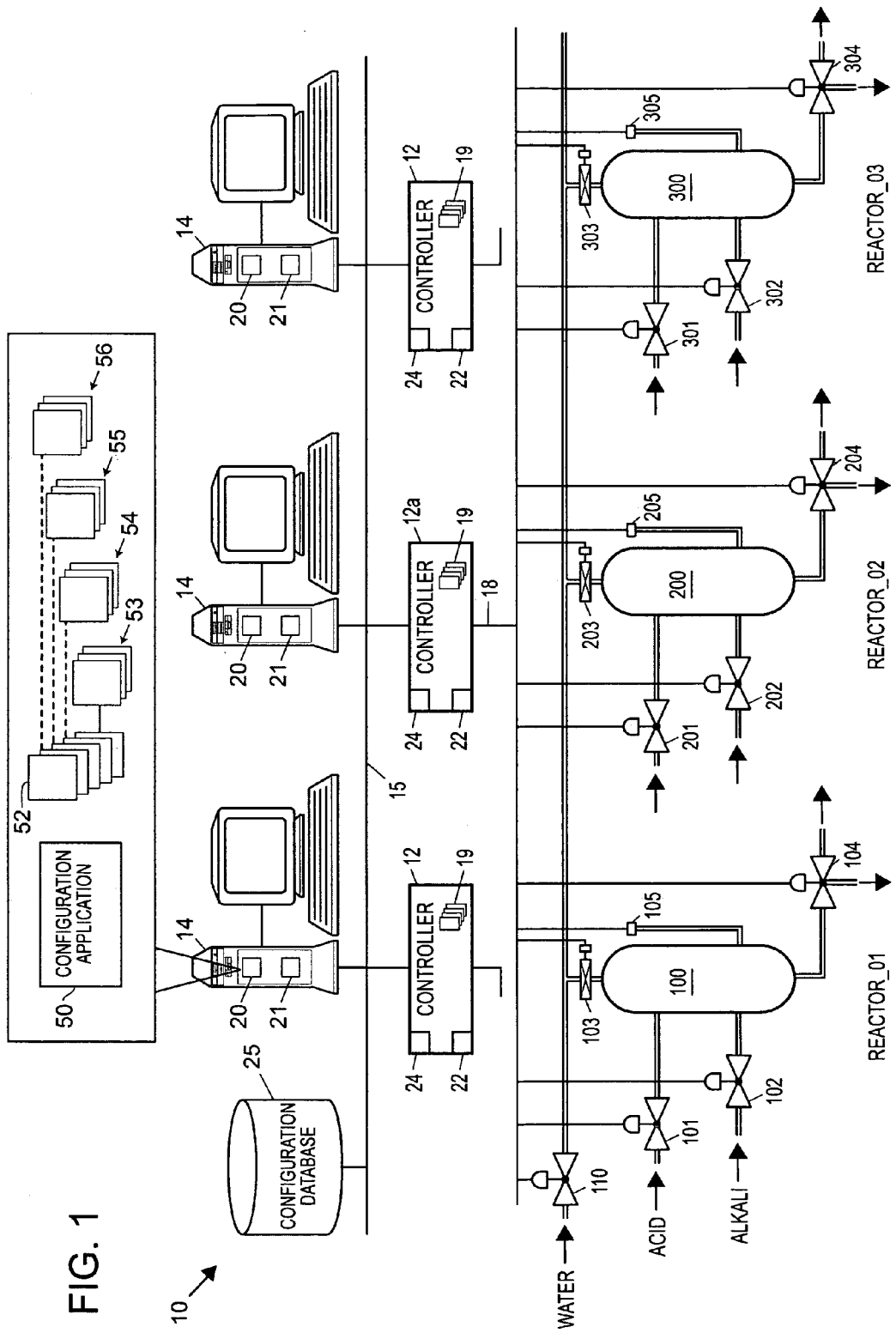
FIG. 1 is a block diagram of a distributed process control network located within a process plant, including an operator workstation that implements a configuration application that uses module class objects to configure control and display activities for the process plant.

Referring now to FIG. 1, a process plant 10 includes one or more process controllers 12 coupled to numerous workstations 14 via, for example, an Ethernet connection or bus 15. The controllers 12 are also coupled to devices or equipment within the process plant 10 via sets of communication lines or buses 18, with only the set of communication lines 18 connected to the controller 12a being illustrated in FIG. 1. The controllers 12, which may be implemented by way of example only using the DeltaV™ controller sold by Fisher-Rosemount Systems, Inc., are capable of communicating with control elements, such as field devices and function blocks within field devices distributed throughout the process plant 10 to perform one or more process control routines 19 to thereby implement desired control of the process plant 10. The workstations 14 (which may be, for example, personal computers) may be used by one or more configuration engineers to design the process control routines 19 to be executed by the controllers 12 and display routines to be executed by the workstations 14 or other computers, and to communicate with the controllers 12 so as to download such process control routines 19 to the controllers 12. Furthermore, the workstations 14 may execute display routines that receive and display information pertaining to the process plant 10 or elements thereof during operation of the process plant 10.

Each of the workstations 14 includes a memory 20 for storing applications, such as configuration design applications and display or viewing applications, and for storing data, such as configuration data pertaining to the configuration of the process plant 10. Each of the workstations 14 also includes a processor 21 that executes the applications to enable a configuration engineer to design process control routines and other routines and to download these process control routines to the controllers 12 or to other computers or to collect and display information to a user during operation of the process plant 10.

Still further, each of the controllers 12 includes a memory 22 that stores control and communication applications and a processor 24 that executes the control and communication applications in any known manner. In one case, each of the controllers 12 stores and executes a controller application that implements a control strategy using a number of different, independently executed, control modules or blocks 19. The control modules 19 may each be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV™ system protocol use control modules and function blocks designed and implemented in an object oriented programming protocol, the control modules could be designed using any desired control programming scheme including, for example, sequential function block, ladder logic, etc. and are not limited to being designed using function block or any other particular programming technique.

The workstations 14 may provide a graphical depiction of the process control routines 19 within the controllers 12 to a user via a display screen illustrating the control elements within the process control routines 19 and the manner in which these control elements are configured to provide control of the process plant 10. In the system of FIG. 1, a configuration database 25 is connected to the Ethernet bus 15 to store configuration data used by the controllers 12 and the workstations 14 as well as to serve as a data historian by collecting and storing data generated in the process plant 10 for future use.

In the process plant 10 illustrated in FIG. 1, the controller 12a is communicatively connected via the bus 18 to three sets of similarly configured reactors (which are replicated equipment within the plant 10) referred to herein as Reactor_01, Reactor_02 and Reactor_03. Reactor_01 includes a reactor vessel or tank 100, three input valve systems (which are equipment entities) 101, 102 and 103 connected so as to control fluid inlet lines providing acid, alkali and water, respectively, into the reactor vessel 100 and an outlet valve system 104 connected so as to control fluid flow out of the reactor vessel 100. A sensor 105, which can be any desired type of sensor, such as a level sensor, a temperature sensor, a pressure sensor, etc., is disposed in or near the reactor vessel 100. For the purpose of this discussion, the sensor 105 is assumed to be a level sensor. Moreover, a shared header valve system 110 is connected on the water line upstream of each of the reactors Reactor_01, Reactor_02 and Reactor_03 to provide a master control for controlling the flow of water to each of those reactors.

Similarly, Reactor_02 includes a reactor vessel 200, three input valve systems 201, 202 and 203, an outlet valve system 204 and a level sensor 205 while Reactor_03 includes a reactor vessel 300, three input valve systems 301, 302 and 303, an outlet valve system 304 and a level sensor 305. In the example of FIG. 1, the reactors Reactor_01, Reactor_02 and Reactor_03 may produce salt with the input valve systems 101, 201 and 301 providing acid, the input valve systems 102, 202 and 302 providing alkali and the input valve systems 103, 203 and 303, in conjunction with the shared water header 110, providing water to the reactor vessel 100. The outlet valve systems 104, 204 and 304 may be operated to send product out of a flow line directed to the right in FIG. 1 and to drain waste or other unwanted material out of a flow line directed to the bottom in FIG. 1.

The controller 12a is communicatively coupled to the valve systems 101–104, 110, 201–204 and 301–304 and to the sensors 105, 205 and 305 via the bus 18 to control the operation of these elements to perform one or more operations with respect to the reactor units, Reactor-01, Reactor_02 and Reactor_03. Such operations, generally called phases, may include, for example, filling the reactor vessels 100, 200, 300, heating the material within the reactor vessels 100, 200, 300, dumping the reactor vessels 100, 200, 300, cleaning the reactor vessels 100, 200, 300, etc.

The valves, sensors and other equipment illustrated in FIG. 1 may be any desired kinds or types of equipment including, for example, Fieldbus devices, standard 4–20 ma devices, HART devices, etc. and may communicate with the controller 12 using any known or desired communication protocol such as the Fieldbus protocol, the HART protocol, the 4–20 ma analog protocol, etc. Still further, other types of devices may be connected to and be controlled by the controllers 12 in accordance with the principles discussed herein. Also, other numbers and types of controllers maybe connected within the plant 10 to control other devices or areas associated with the process plant 10 and the operation of such additional controllers may be coordinated with the operation of the controller 12a illustrated in FIG. 1 in any desired manner.

Generally speaking, the process plant 10 of FIG. 1 may be used to implement batch processes in which, for example, one of the workstations 14 or the controller 12a executes a batch executive routine, which is a high level control routine that directs the operation of one or more of the reactor units (as well as other equipment) to perform a series of different steps (commonly referred to as phases) needed to produce a product, such as a particular type of salt. To implement different phases, the batch executive routine uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine within the controller 12a will execute a different control algorithm for each one of these phases. Of course, the specific materials, amounts of materials, heating temperatures, times, etc. may be different for different recipes and, consequently, these parameters may change from batch run to batch run depending on the product being manufactured or produced and the recipe being used. Those skilled in the art will understand that, while control routines and configurations are described herein for batch runs in the reactors illustrated in FIG. 1, control routines may be used to control other desired devices to perform any other desired batch process runs or to perform continuous process runs, if so desired.

As will also be understood, the same phases or steps of a batch process can be implemented on each of the different reactor units of FIG. 1 at the same or at different times. Furthermore, because the reactor units of FIG. 1 generally include the same number of and types of equipment, the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more valves associated with the input valve systems 101, 102 and 103 for a certain amount of time, for example, until the level meter 105 senses that the vessel 100 is full. However, this same control routine may be used to implement a fill phase for Reactor_02 by merely changing the designation of the input valve(s) to be those associated with the valve systems 201, 202 and 203 instead of the valve systems 101, 102 and 103 and by changing the designation of the level meter to be the level meter 205 instead of the level meter 105.

Figure 2:
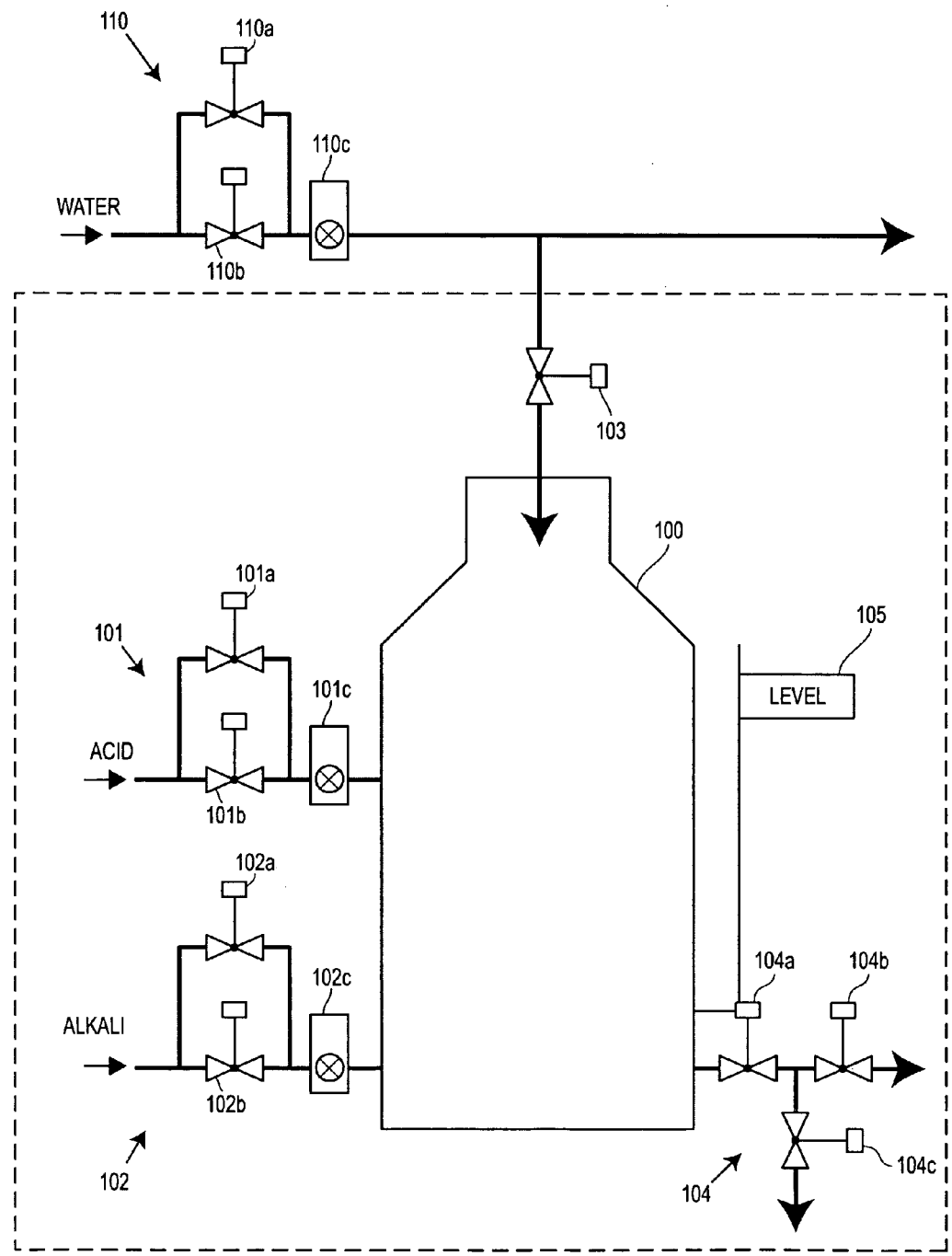
FIG. 2 is a diagram of a reactor unit of FIG. 1.
Figure 3:
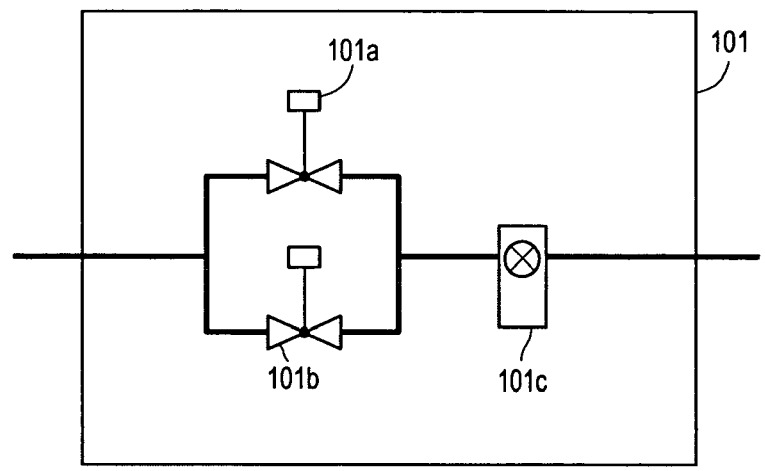
FIG. 3 is a diagram of a totalizer equipment entity used in the reactor unit of FIG. 2.

FIG. 2 illustrates one of the reactors of FIG. 1, in particular the Reactor)_01, in more detail. As similarly illustrated in FIG. 1, Reactor _01 of FIG. 2 includes the reactor tank 100, the input valves systems 101, 102, 103 and 110 for the input of acid, alkali and water into the tank 100, the outlet valve system 104 for removing material from the tank 100 and the level sensor 105. As further illustrated in FIG. 2, each of the input valve systems 101, 102 and 110 uses a similar equipment entity, referred to as a totalizer, which includes two valves disposed in parallel with one another and a flow measurement device disposed downstream of the two valves. The totalizer for the input valve system 101, which is illustrated in more detail in FIG. 3, includes an on/off type valve named coarse valve 101a, an on/off type valve named fine valve 101b and a flow meter 101c disposed downstream of the valves 101a and 101b. The totalizer 101 has one or more control modules or routines associated therewith that are used to control the input of the acid using the measurements made by the flow meter 101c. A first such control routine may perform fast flow control through the totalizer 101 using the coarse valve 101a and the fine valve 101b while a second such control routine may perform accurate flow control through the totalizer 101 using the coarse valve 101a and the fine valve 101b.

As will be understood from FIG. 2, the alkali input valve system 102 includes a totalizer having a coarse valve 102a, a fine valve 102b, and a flow meter 102c and the shared water input valve system 110 includes a coarse valve 110a, a fine valve 110b, and a flow meter 110c. Each of the totalizers 101, 102, and 110 has the same type of replicated equipment therein although they are used in different places on the same unit, i.e., the Reactor_01 unit. Likewise, Reactor_02 and Reactor_03 also include totalizes at the input valve systems 201, 202, 301 and 302.

Figure 4:
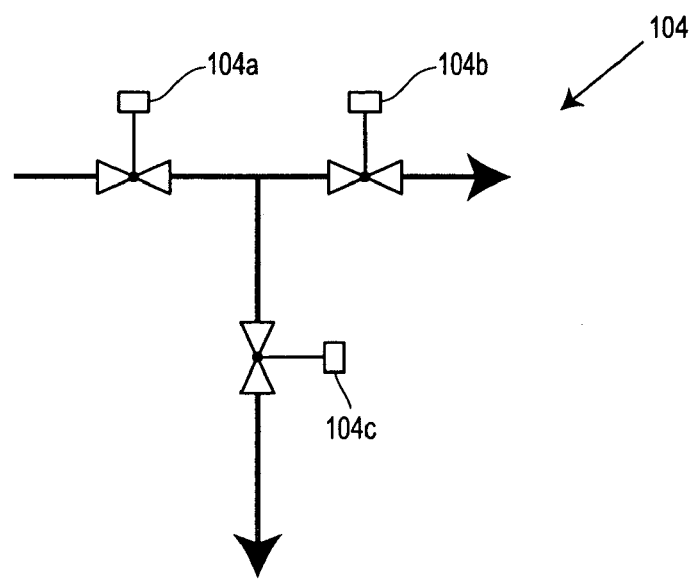
FIG. 4 is a diagram of an outlet valve system used in the reactor unit of FIG. 2.

Similarly, the outlet valve system 104 is another piece of replicated equipment including three valves. As best illustrated in FIG. 4, the outlet valve system 104 includes a main outlet valve 104a which must be opened for any material to be released from the tank 100, a product valve 104b which must be opened in conjunction with the main outlet valve 104a to deliver product from the tank 100, and a drain valve 104c which must be opened in conjunction with the main outlet valve 104a to drain material, such as waste product, cleaning fluids, etc. from the tank 100 into a drainage or refuge system. Of course, one or more control routines are associated with the outlet valve system 104 to control the states of the valves 104a, 104b and 104c to close the tank 100, to drain the tank 100 or to empty product from the tank 100.

In the past, to produce a control routine for controlling the different equipment associated with the reactors Reactor_01, Reactor_02 and Reactor_03 of FIG. 1, a configuration engineer may have first created a number of template control modules which were generic in nature and which were stored in a library in, for example, one of the workstations 14. To create a template control module, the engineer graphically connected together different control function blocks to provide a control routine for different elements or loops executed on the reactor. Once the generic template control modules were created, typically on a valve or a control loop basis, these template control modules could be copied and the copies of the template control modules could be manually bound to particular equipment within the plant 10, e.g., to a particular equipment within the reactors, Reactor_01, Reactor_02 and Reactor_03. Once bound, either directly or using alias names, as more specifically described in U.S. Pat. No. 6,385,496, the bound copies of the control modules were downloaded to one or more controllers 12 and were used to perform process control activities on the reactors to which they were bound. However, the bound control modules created from the template control modules had no reference or relationship to the template module from which they were created and were, in effect, stand-alone control modules or objects when used in the process control system.

Also, in these systems, configuration had to be performed at a control module level, meaning that a separate control module had to be created for each of the different pieces of equipment or loops within the process plant. At the control module level, there are typically numerous different types of control modules which must be created for and bound to each of the process entities within the process plant. As a result, the configuration engineer spent a great deal of time simply copying and binding individual control modules to individual pieces of equipment within the plant. For example, a configuration engineer may have had to create and copy dozens of control modules for a reactor unit in the plant and then bind each of these control modules to particular equipment within that reactor unit. When the reactor unit was replicated in the plant, the configuration engineer's task became much more tedious because the configuration engineer had to perform this copying and binding process for dozens of control modules for each of the replicated equipment, which was time consuming and fraught with human introduced errors.

While, in the past, a configuration engineer could develop a unit module, these unit modules were merely containers for the phases that could be run on a unit and did not include equipment indications associated with the unit or control schemes used to control basic operations of the equipment within the units. Also, while templates could be created for control elements used to control different equipment, there were no packages of control modules that could be used to indicate higher level replicated entities within the plant, such as equipment and unit entities. In other words, to create control routines for different replicated entities within the process plant 10, the configuration engineer had to copy control modules for each of the replicated pieces of equipment at the lowest level of control and tailor each one of these control modules to a specific or particular piece of equipment or other entity within the process plant 10. In large plants with a lot of replicated equipment, this task could be time consuming and fraught with configuration errors. Still further, changes to a control module associated with replicated equipment had to be made manually to each of the different control modules for the different equipment, which was also tedious, time consuming and fraught with operator introduced errors. Likewise, displays for the operator had to be created separate and apart from the control modules and, similar to the control modules, the displays had to be individually created, modified and tied to the equipment within the process plant.

To make the creation and changing of a process configuration easier and less time consuming, a configuration application 50 stored in one of the workstations 14 of FIG. 1 includes a set of module class objects 52 for use in configuring the process control plant 10. The module class objects are especially useful when configuring a plant with numerous sets of replicated equipment. Generally speaking, a different module class object 52 can be created for each different type of physical unit or equipment that is replicated or used within the process plant 10, for each type of control activity that is replicated or used within the process plant 10, for each different type of display application that is replicated or used in the process plant 10, etc. Once created, the module class objects 52 can be used to configure elements of the process plant 10 that correspond to module class objects.

The module class objects 52, which are essentially generic versions of process entities and are not tied to any particular process entity, can have lower-level objects or instances 53, 54, 55 and 56 (referred to herein as module objects or module blocks) associated therewith. Each module object is created from a module class object and inherits the same structure and properties as the module class object from which it was created. However, each module object is tied to a particular entity within the process plant 10. Thus, a single module class object 52 may be created to represent a particular type of reactor unit (no matter how many of those reactor units are present within the plant 10), while a different module object 53 may exist or be created for each of the different reactor units of that type actually present within the plant 10.

The module objects created from a module class object are associated with and owned by the module class object. As a result, changes made to the module class object can be automatically reflected in or propagated to each of the module objects associated with that module class object. Therefore, when a number of module objects have been created from a particular module class object, with each of the different module objects tied to different process entities, each of the different module objects can be changed by simply changing the module class object and having the changes automatically propagated down to the associated module objects.

Similarly, once the module objects have been created from a module class object, these module objects can be bound to particular equipment within the process plant 10 using a bulk editing method. In particular, because the module objects of a particular module class object are all coupled to or owned by the same module class object, they may all be configured together using, for example, a spreadsheet type application, which makes specification of the particular relationships between the module objects and the particular equipment in the plant 10 associated with those module objects easier and less time consuming.

The module class objects 52 of FIG. 1 may be what are commonly referred to as objects in an object oriented programming environment or language. As a result, these objects have the ability to own or to refer to other objects. Generally speaking, the module class objects 52 are high level objects which can include indications or definitions of individual elements such as control routines, equipment or other elements associated with a process entity along with a definition or indication of the manner in which those individual elements interact with one another, such as the way in which physical elements are interconnected or the way in which logical elements operate in conjunction with the physical elements. In other words, a module class object may be an object within, for example, an object oriented programming language, that provides the basis for control and viewing of a particular piece of or group of equipment, a control element, a display, etc. within the process plant 10 and may be useful for creating many instances of that element to be used to configure different replicated equipment within the process control plant 10.

Basically, each module class object is a configuration container including a generic definition of a process entity in the form of all of the different control and/or display applications or routines that are applicable to that entity to be used by the controllers 12 to control that entity or by the workstations 14 to perform display activities with respect to that entity. The module class object may represent a process entity of any nature, such as a unit, a piece of equipment, a control entity, a display application, etc. During the configuration of the process plant 10, the module class object may be used to create configuration instances of the process entity for any number of different process entities that conform to the definition provided by the module class object, with each configuration instance (the module object created from the module class object) being associated with or tied to a different actual process entity. These different module objects include, among other things, control routines and/or display routines bound to particular process entities as disposed within the process plant 10, with these control routines being able to be downloaded and used within the controllers 12 of FIG. 1 to perform actual control activities on the process entities and with the display routines being able to be downloaded to workstations 14 to perform actual display activities with respect to the entities during operation of the process plant 10.

Different types of module class objects may reflect process entities of different scopes and, therefore, contain control and/or display routines configured to operate on or with respect to process entities of different scope. The larger the scope of the process entity, such as a unit, the more control and/or display routines will typically be associated with the module class object and the easier it is to configure sections of the plant using those module class objects. However, the larger the scope of the process entity associated with a module class object, the less likely that the process will include replicated equipment at that scope and, thus, the less likely the module class object is to be useful on a large scale. Conversely, the lower the scope of the process entity associated with a module class object, the more likely the module class object is able to be used in various different locations of the plant, but the less amount of configuration is performed when using that module class object in any particular instance. In any event, the module class objects enable configuration to be performed for different replicated equipment at higher levels of abstraction than at the control module level, which makes configuring a process plant with replicated units and other equipment easier and less time consuming when using module class objects, especially module class objects of a large scope, such as at the unit level.

In one example, when configuring a process control system, a configuration engineer may create a single module class object for the different elements replicated within the process plant, such as for the different reactors of FIG. 1. Thereafter, the configuration engineer may create instances of the module class object (module objects) for each of the actual reactors of FIG. 1. Each such created module object will include control routines used by the controller 12*a* to operate one of the reactors of FIG. 1 and is specifically tied to or bound to the equipment within the one of the reactors of FIG. 1. These control routines can then be downloaded to the controller 12*a* and used during operation of the process plant 10. However, once created, each of the module objects is still tied to the module class object and can be controlled by the module class object to be changed, to provide or reject access to the module object, etc. Likewise, module objects from the same module class object can be created and defined together, e.g., can be bound to equipment within the plant using a spreadsheet program.

While there are many different possible types of module class objects that can be created or used within a process plant to perform configuration activities within the process plant, four specific types discussed herein as examples include unit module class objects, equipment module class objects, control module class objects and display module class objects. Generally speaking, each different type of module class object is designed or intended for a different scope of control or use within the process plant 10. A unit module class object is intended to be used to represent (and to configure) control activities for a broad scope of equipment within a process plant. In particular, a unit module class object is intended to model or be used to configure an inter-related set of equipment (typically replicated equipment) such as, for example, the reactors of FIG. 1, having individual elements that work in concert with one another in some known manner.

An equipment module class object is intended to be used to represent (and to configure) control activities for a less broad scope of physical equipment within the process plant. The equipment associated with an equipment module class object is generally one or more physical entities, such as valves, flow meters, etc. that make up a subsystem of a unit and the equipment module class object may include one or more commands or algorithms, which may be command driven algorithms (CDAs), state driven algorithms (SDAs), sequential flow chart (SFC) algorithms, function block diagram (FBD) algorithms, phase algorithms, etc., to be performed on the piece of equipment. Thus, an equipment module class object is aimed at configuring the control of multiple low level components or entities within a unit to provide a basic set of functions on that equipment as used within the unit. As is known, a command driven algorithm (command driven control logic) is used when the low level components must be coordinated through multiple steps to accomplish a function. For example, a valve may need to be opened for a particular amount of time and then closed while another valve is opened and then closed. The totalizer 101 of FIG. 3 uses this type of command driven algorithm to first initiate and then manipulate the coarse valve and the fine valve based on the readings of the flow meter to provide the desired total flow through the totalizer. A state driven algorithm (state driven control logic) may specify the states of different low-level components which can be manipulated in a single step. Such a state driven algorithm might be used in the outlet valve system 104 of FIG. 4 in which the states of the different valves therein are controlled differently (but in a single step) based on the desired state of the outlet valve system 104 to close the tank 100, to drain the tank 100 or to deliver product from the tank 100.

A control module class object is intended to be used to represent (and to configure) individual control elements or control modules within the process plant. A control module class object provides or specifies a particular type of control to be performed on a plant entity, such as a valve, meter, etc., a piece of equipment or even on a unit. Generally speaking, a control module class object provides a particular type of control programming, such as a set of communicatively interconnected function blocks defining some control module to be executed in a controller, useful to perform replicated control activities within a process plant. In most cases, a control module class object may provide a generic control strategy to manipulate a single device or a related set of devices.

A display module class object is intended to be used to represent (and to configure) display activities to be viewed by a user, such as to a control operator, during operation of the process plant 10. Thus, a display module class object may specify the programming needed to generate a display of a certain type within an operator workstation 14 of FIG. 1 and the programming needed to be run in one or more of the workstations 14 (as well as any other devices within the process plant 10) to enable that display to obtain the proper information from the plant during operation of the plant 10. Types of display class modules include, for example, alarm displays, configuration viewing displays, operation viewing displays, diagnostic displays, etc. Of course a display module class object may provide a display representing or tied to any desired scope of physical elements or entities within a process plant. For example, a display module class object may display information about an entire area, a unit, a piece of equipment, a control element, or any combination of these elements within the process plant 10.

Figure 5:
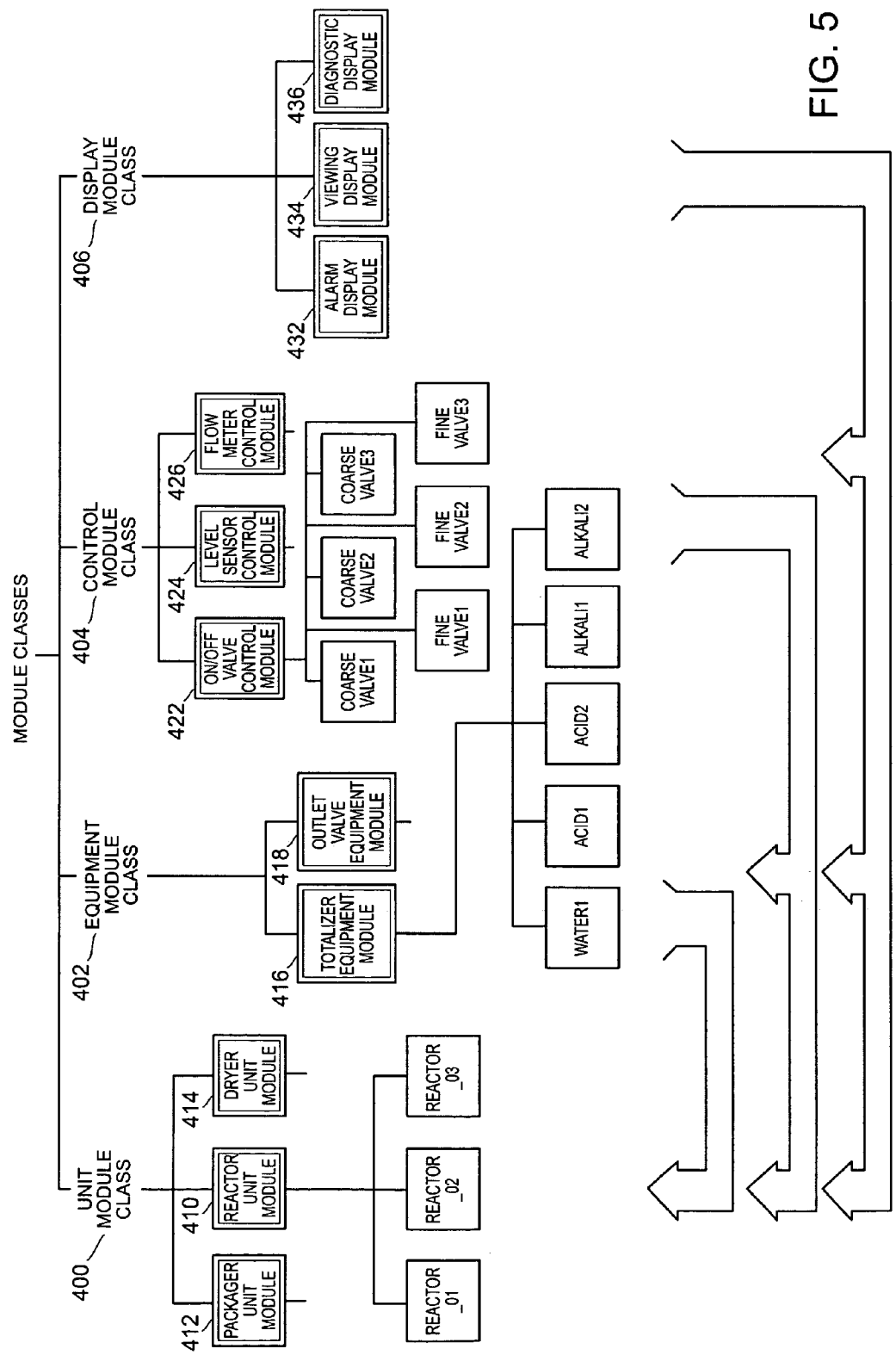
FIG. 5 is a logical diagram illustrating the interrelationships between module class objects and associated module objects for unit, equipment, control and display types of module class objects.

Referring to FIG. 5, a hierarchical graph illustrates the interconnections between the different types of module class objects used in the configuration application 50 of FIG. 1 and the interrelationship between module class objects and module objects developed from those module class objects. Starting at the top of the graph of FIG. 5, module class objects are separated by module class type into one of a unit module class type 400, an equipment module class type 402, a control module class type 404 and a display module class type 406. Of course, other types of module class objects may be provided or used as well, with the four types illustrated herein being merely exemplary module class types. Individual module class objects (which may be high level objects in, for example, an object oriented programming language, and are represented in FIG. 5 with a double outline for the sake of clarity) fall under each of the different types of module classes 400, 402, 404 and 406. In particular, there may be numerous different unit module class objects for different units or types of units within the process plant 10. For example, a reactor unit class module object 410 may represent a particular type or configuration of a reactor within the process plant 10. Likewise, a packager unit module class object 412 may represent a particular type or configuration of a packaging unit within the process plant 10 and a dryer unit class module object 414 may represent a particular type or configuration of a dryer unit within the process plant 10. Of course, there may be more than one reactor unit module class object to represent reactors that are different from one another in physical makeup. Further, no attempt is being made to list all of the different types of units within a plant that can be represented or modeled with a unit module class object, and one of ordinary skill in the art will realize that there are many different types of units in different types of plants that may be modeled or represented with unit module class objects.

Similarly, there may be many different equipment module class objects used to represent, model and configure different types of equipment within the process plant 10. Examples illustrated in FIG. 5 include a totalizer equipment module class object 416 and an outlet valve equipment module class object 418, each of is associated with different types of equipment (and preferably replicated equipment) within the process plant 10. In the same manner, there may be many different types of control module class objects, illustrated in FIG. 5 as an on/off valve control module class object 422, a level sensor control module class object 424, and a flow meter control module class object 426. Moreover, display module class objects are illustrated in FIG. 5 as an alarm display module class object 432, a viewing display module class object 434 and a diagnostic display module class object 436. Of course, any other desired unit, equipment, control and display module class objects may be created and used within the configuration application 50 of the process plant 10 according to the principles described herein.

Each module class object may have sub-objects associated therewith or owned thereby. These sub-objects may be module class objects in themselves or, as illustrated in FIG. 5, may be module objects which are created as instances of the module class objects to which they belong. FIG. 5 illustrates that the reactor unit module class object 410 has three reactor module objects named Reactor_01, Reactor_02 and Reactor_03 associated therewith, with these reactor module objects corresponding to (i.e., bound to) the respective reactors of FIG. 1. FIG. 5 also illustrates the totalizer equipment module class object 416 as having or owning five different module objects named Water1, Acid1, Acid 2, Alkali1 and Alkali2. Likewise, the on/off valve control module class object 422 is illustrated as including module objects named Coarse_Valve1, Coarse_Valve2, Coarse_Valve3, Fine_Valve1, Fine_Valve2 and Fine_Valve3. In a similar manner, each of the other unit, equipment, control and display module class objects of FIG. 5 may have one or more module objects associated therewith. However, for the sake of simplicity, these module objects are not illustrated in FIG. 5.

In the graph of FIG. 5, each of the Reactor_01, Reactor_02, and Reactor_03 unit module objects, the Acid1, Acid2, Alkali1, Alkali2 and Water1 totalizer (equipment) module objects, the Coarse_Valve1, Coarse_Valve2, Coarse_Valve3, Fine_Valve1, Fine_Valve2 and Fine_Valve3 control module objects and the other unit, equipment, control and display module objects are individual objects tied to actual units, equipment, control modules or display applications within the process plant 10. For example, because there are multiple physical acid totalizers used in the plant 10, there will be multiple acid totalizer module objects created in the configuration routine, with a separate acid totalizer module object existing for each of the individual acid totalizers that exists within the plant 10. However, each of the separate totalizer module objects is tied to or is owned by the same totalizer module class object 416. Of course, the graph of FIG. 5 illustrates only a limited number of module class objects and module objects associated therewith, and it will be understood that other types of module class objects may be provided and that any desired number of module objects may be created from each of the different module class objects.

Each of the module class objects of FIG. 5 (and therefore each of the module objects of FIG. 5) may include, as part of the object, a definition or indication of the physical or logical process elements that define or make up the module and, if desired, the manner in which those process elements interact either physically or logically with one another to perform some activity within the process plant 10. For example, unit module class objects will typically include an indication of all of the physical and control elements within or making up the process entity being defined as the unit. The unit module class object may also define the particular makeup of the individual parts and how those parts are physically tied together to operate as a unit. Likewise, an equipment module class object will typically include the control routines or control modules to be used to control the entity defined as the piece of equipment and commands which use the control routines or control modules to define the manner in which the parts interact either physically or logically, to operate as a piece of equipment when disposed within the plant 10. Similarly, each control module class object will define a control activity, typically in the form of a control algorithm of some sort, to be performed within the plant. Also, each display module class object may define, among other things, a display screen configuration and the information to be displayed, as well as the data to be collected and the data manipulations to be performed on collected data, if any, for specified types of units, equipment, areas of the plant, or any other physical or logical entity within the plant 10.

As part of a module class definition, a module class object may indicate or define other module class objects to be incorporated or used therein. When this is the case, the module objects created from that module class object will incorporate, refer to or include other module objects created from other module class objects according to the relationships defined at the module class level. Although not strictly necessary, unit module class objects may incorporate other unit module class objects, equipment module class objects, control module class objects and display module class objects, while equipment module class objects may incorporate other equipment module class objects, control module class objects and display module class objects. Control module class objects may incorporate or refer to other control module class objects and display module class objects. However, if desired, other module class object interrelationships may be used as well. These incorporation relationships are illustrated by the large arrows at the bottom of the graph of FIG. 5 indicating that any of the display module class objects may be included in or referred to by any of the control, equipment and unit module class objects, that any of the control module class objects may be included in or referred to by any of the equipment and the unit module class objects and that any of the equipment module class objects may be included in or referred to by any of the unit module class objects. It will be understood that module class objects may incorporate other module class objects of the same type. For example, a unit module class object may incorporate, as part of its definition, another unit module class object. In a similar manner, an equipment module class object may include another equipment module class object, a control module class object may include another control module class object and a display module class object may include another display module class object. Of course, if desired, a module class object may use or incorporate another module class object multiple times. For example, a reactor unit module class object may incorporate or use the totalizer equipment module class object numerous times because the reactors being modeled by the reactor unit module class object include multiple instances of totalizers.

It will also be understood that, when a first module class object incorporates or uses a second module class object, any module object created from or as an instance of the first module class object will incorporate or use a module object created from or as an instance of the second module class object. Thus, when the reactor unit module class object 410 uses a totalizer module class object 416 as an element or part thereof, the Reactor_01 module object will use or include one of the totalizer module objects, such as the Acid1 module object, as an element or part thereof. Similarly, if a totalizer equipment module class object incorporates or includes an outlet valve equipment module class object, a module object created from the totalizer equipment module class object, which will be uniquely named as, for example, Totalizer_1, will include a module object created from the outlet valve equipment module class object and uniquely named, for example, Outlet_Valve_2. In this manner, the relationships between the module class objects as defined at the module class object level are reflected in the module objects developed or created from these module class objects. This interconnection or referencing between module class objects (and therefore module objects) enables great variability and high transferability of objects during configuration activities so that, after a set of primitive module class objects, such as control and equipment module class objects, are created, more complex module class objects, such as unit module class objects, may be easily created by referencing the primitive module class objects. Of course, while module class objects can reference or use other module class objects, they can also or instead define or use simple objects or process entities, such as valves, sensors, etc. which have no associated module class object. These simple objects will be fully defined in terms of the control routines used therefor, within the module class object itself.

Figure 6:
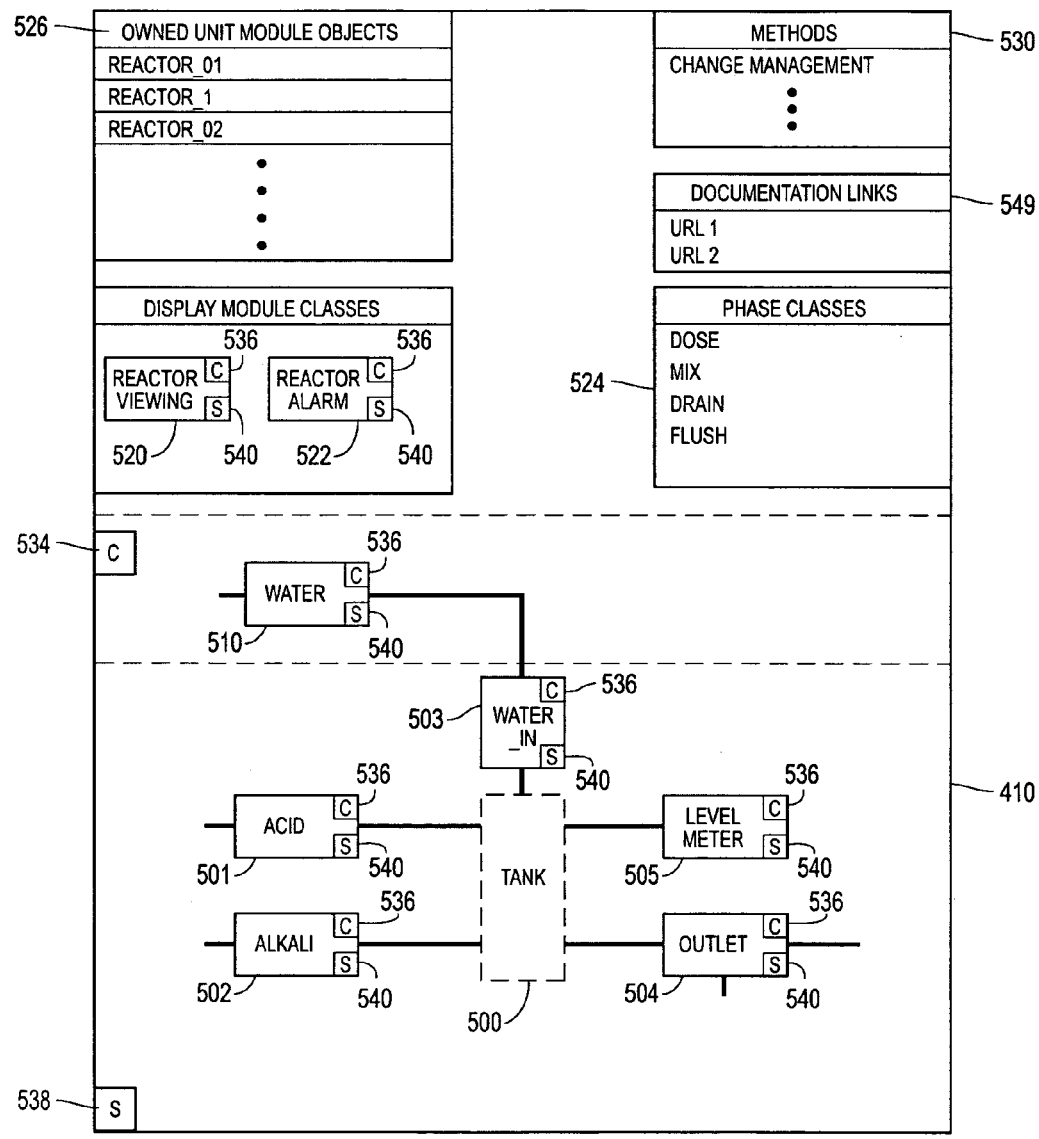
FIG. 6 is a logical diagram of reactor unit module class object, which can be used to perform configuration activities for reactors within the plant of FIG. 1.

An example reactor unit module class object 410 is illustrated in FIG. 6 to show one manner of describing or defining the entities associated with or present within a unit module class object. As illustrated in FIG. 6, the reactor unit module class object 410 includes an indication of a tank 500, which is a simple object or element within the process plant 10 for which no module class object exists. The tank 500 is illustrated in dotted lines because there is no control or low-level activities need to control, or perform input/output activities with respect to the tank. As a result, the tank 500 is included merely to illustrate the interconnections between the other objects associated with the reactor unit module class object 410. The reactor unit module class object 410 also includes three totalizers 501, 502 and 510 named Acid, Alkali and Water, respectively, which are three different references to the totalizer equipment module class object 416 of FIG. 5. The Water totalizer module class object 510 is illustrated in a section of the unit module class object 410 that is separated by dotted lines to indicate that this is a shared module class object and, thus, that the unit module class object 410 has shared control over this object with other unit module class objects. The outlet object 504 of FIG. 6 is a reference to the outlet valve equipment module class object 418 of FIG. 5, the level sensor 505 is a reference to the level sensor control module class object 424 of FIG. 5 and the water_in valve 503 is a reference to a valve object which may be a simple valve element (and so fully defined within the unit module class object 410) or which may be a reference to a valve control module class object defined elsewhere in the configuration strategy. The physical interconnections between the different entities or parts of the reactor unit module class object 410 are also illustrated for the sake of defining the interconnections between these different elements. As noted above, the unit module class object 410 or other module class objects of any type, can include simple elements which are fully defined within the module class object (including any generic control routines associated therewith) and/or can include references to module class objects defined exterior to the module class object.

The unit module class object 410 also includes two example display module class objects called a reactor viewing display 520 and a reactor alarm display 522 which are references to the viewing display module class object 434 and the alarm display module class object 432 of FIG. 5. These objects define generic display activities for displaying the state (e.g., the fill level of the tank) and alarms associated with any of the equipment or parts of the reactor unit defined in the reactor unit module class object 410. Similarly, the unit module class object 410 may include other elements, such as phase class objects, illustrated in the box 524 as a Dose, a Mix, a Drain and a Flush phase class object, each of which defines a generic control routine to be operated on the unit defined by the unit module class object 410. The unit module class object can have zero or more associations to phase class objects. The phase class objects 524 can be defined elsewhere and imported into the unit module class object 410 in any desired manner. In a sense, the phase classes 524 are commands or routines that may be operated on a unit defined by the unit module class object 410 to perform different functions, such as filling the unit, heating the unit, emptying the unit, cleaning the unit, etc.

Moreover, the unit module class object 410 may include a memory or section 526 that stores references to the module class objects which are created by the configuration application 50 (FIG. 1) from this unit module class object 410. The section 526 is essentially a list of the module objects that were created from and that are owned by the unit module class object 410. (Of course this list or other indication of the owned module objects can be stored in the workstation or by the configuration application 50 in any desired manner and does not have to be physically contained in the unit module class object 410). In any event, in the example of FIG. 6, the unit module class object 410 owns unit module objects Reactor_01, Reactor_1, Reactor_02, etc., each of which has been created from the reactor unit module class object 410.

The unit module class object 410 also includes a set of methods 530 that can be performed by the unit module class object 410 either during or after the configuration activities. The methods 530 may include a change management method or application that automatically propagates changes made to the unit module class object 410 to each of the module objects 526 owned by the unit module class object 410. Other methods may include security control methods which perform security or access control with respect to the unit module class object 410 and/or with respect to any of the unit module objects 526 owned thereby or methods that enable a user or configuration engineer to specify change parameters and/or security parameters for the module class object or any module objects created therefrom. Of course different methods 530 may perform any other procedure on or with respect to the unit module class object 410.

If desired, the unit module class object 410 may control the manner in which changes made to the module class object 410 are propagated to the unit module objects 526 as well as the manner in which security access is set up in the unit module objects 526. One manner of providing this functionality is to set one or more flags or parameters within the unit module class object 410 to specify the manner in which changes are to be propagated to and security is to be handled in the unit module objects 526. In particular, one or more change propagation parameters may be set to specify whether or not changes made to the unit module class object 410 are to be automatically propagated to the one or more of the unit module objects 526. These change propagation parameters may be stored in the unit module objects 526 and may specify for the entire unit module object, or on a sub-element by sub-element basis, whether changes made to the unit module class object are to be reflected in the unit module object. For example, the unit module class object 410 may include a global change parameter 534 (marked "C") which may be set in each unit module object created from the unit module class object 410 to enable or disable changes made to the unit module class object 410 from being automatically reflected in the unit module object. Likewise, each sub-element or block, such as the blocks 501–505, 510, 520 and 522 may include a change parameter 536 specifying, for that block only, whether changes made to that block in the unit module class object 410 are to be reflected in the unit module object. Of course, the different blocks of a unit module object may be set differently so that, for example, changes made to the Acid block 501 of the unit module class object 410 will be propagated to the corresponding Acid block of a particular one of the module objects 526 but so that changes made to the Alkali block 502 of the unit module class object 410 will not be propagated to the Alkali block of the particular one of the unit module objects. Furthermore, the different unit module objects created from a unit module class object may have the change parameters set differently from one another so that changes to the Alkali block 502 within the unit module class object 410 are propagated to the corresponding Alkali block of a first one of the unit module objects 526 but not to the corresponding Alkali block of a second one of the unit module objects 526. Of course, the change management method of the unit module class object 410 may access and use the change parameters of the unit module objects 526 to make or not make a change within those objects when the change is made in the unit module class object 410.

In a similar manner, the unit module class object 410 may include one or more security parameters which specify the manner in which security or access is controlled in each of the unit module objects 526. The unit module class object 410 may include a global security parameter 538 (marked "S") which may provide any desired level of security to the entire reactor unit module object created from the reactor unit module class object 410 and/or may include a different security parameter 540 for each sub-element of the unit module class object 410, such as for each of the blocks 501–505, 510, 520, 522, etc. which specifies a level of security for each of those blocks on a block by block basis. The global security parameter 538 may be a locking parameter that locks the unit module class object to all users except those having a preauthorized security access level. Of course, the security parameters 538 and 540 may specify any one of a number of different levels of security, such as no access, limited access, access to particular types or identities of users, etc., and the security levels may be set to be different in the different blocks and in the different unit module objects created from the same unit module class object. If desired, part of the security measures may include providing encryption on one or more methods or algorithms associated with the unit module class object.

It will be understood that the change and security parameters of the unit module class object 410 may be set to a default value, and that the corresponding change and security parameters of each unit module objects 526 created from the unit module class object 410 may take on this default value when created. However, the default change and security parameters may also be individually changed (by a user with proper security access) in the unit module objects 526 after these unit module objects are created. While the change and security parameters are discussed herein with respect to a reactor unit module class object, similar change and security parameters may be provided in other types of unit module class objects as well as in any desired types of equipment module class objects, control module class objects, display module class objects, etc.

If desired, the unit module class object 410 may include references, such as URLs or other references, to documentation stored for or associated with the unit class module object, including documentation associated with the unit or any sub-elements of the unit associated with the unit module class object 410. Such references are illustrated in FIG. 6 as references 549.

Figure 7:
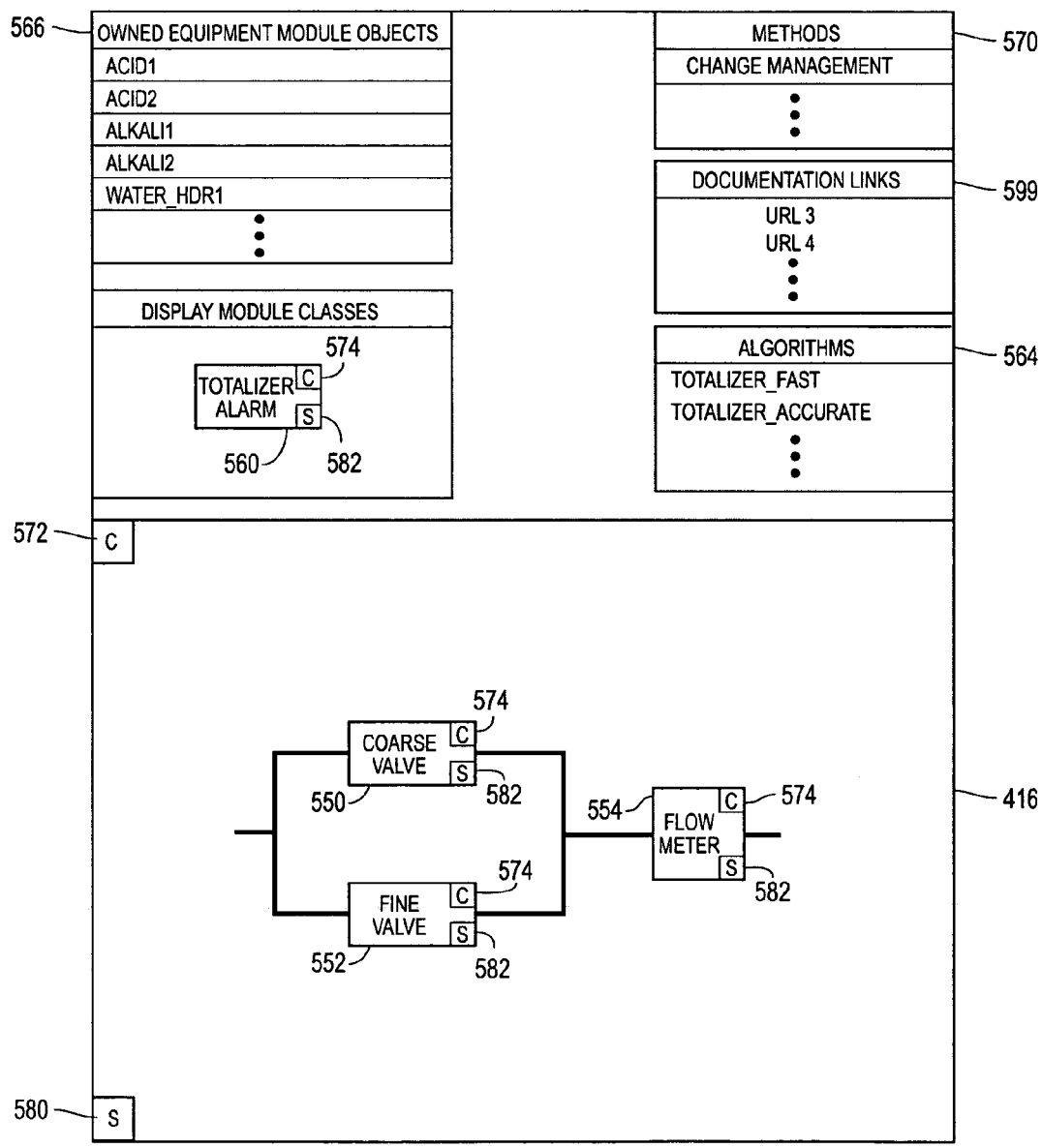
FIG. 7 is a logical diagram of a totalizer equipment module class object, which can be used to perform configuration activities for totalizers within the plant of FIG. 1.

For the sake of a further example of a module class object, a totalizer equipment module class object 416 is illustrated in FIG. 7. The totalizer equipment module class object 416 includes control module class objects named Coarse_Valve 550, and Fine_Valve 552 (both of which are on/off type control module class objects) and a control module class object named Flow_Meter 554 (which is a flow meter control module class object) along with indications of the interconnects between these elements. Still further, the totalizer equipment module class object 416 includes references to display module class objects, including to a Totalizer Alarm display module class object 560, and to one or more algorithms 564 which may be implemented on the equipment module class object 416. While the algorithms 564 are listed as including a Totalize_Fast command and a Totalize_Accurate command, any other commands or algorithms may be included or used as well. Still further, the command algorithms 564 associated with or included in an equipment module class object may take any desired form, and may be, for example, command driven algorithms (CDAs), state driven algorithms (SDAs), sequential flow chart (SFC) algorithms, function block diagram (FBD) algorithms, phase algorithms, etc. However, generally speaking, all of the algorithms 564 will be of a particular type, such as CDAs or SDAs. Of course, the algorithms 564 may be written in any desired language or programming environment such as the C, C++ programming environments, any sequential function chart programming environment, a function block programming environment, etc.

The totalizer equipment module class object 416 also includes a list or memory that stores indications (and if necessary communication paths to) a set of owned equipment module objects 566 named Acid1, Acid2, Alkali1, Alkali2, Water_Hdr1, etc. created from the equipment module class object 416. The totalizer equipment module class object 416 likewise includes a set of methods 570 including a change management method that can be used in conjunction with the global change parameter 572 and/or the object based change parameters 574 to control the propagation of changes to the equipment module objects 566. The totalizer equipment module class object 416 also includes a global security parameter 580 as well as object based security parameters 582. The change and security parameters 572, 574, 580 and 582 operate generally as described with respect to the change and security parameters of the unit module class object 410 of FIG. 6 and may apply to any of the elements of the control module class object 416, including the commands 564. Furthermore either or both of the change, and security parameters may be provided at any desired level within the module class objects (and thus within the module objects created therefrom) other than globally or at the object or element level, as is particularly described herein. If desired, the change and security parameters of a module class object or any module object created therefrom may be set or configured using a bulk configuration application or program, such as a spreadsheet program, to enable a configuration engineer to set or specify the different change and security parameters for the entire module class object or a module object in a simple and straightforward manner.

If desired, the equipment module class object 416 may include references, such as URLs or other references, to documentation stored for or associated with the equipment module class object, including documentation associated with the equipment or any sub-elements of the equipment associated with the equipment module class object 416. Such references are illustrated in FIG. 7 as references 599. Likewise, any of the algorithms of the equipment module class object 416, such as any of the algorithms 564, may be encrypted or have a security parameter associated therewith that encrypts or de-encrypts these algorithms 564. Such encryption or de-encryption may be performed by a method 570 if so desired.

To configure the process plant 10, a configuration engineer creates the unit, equipment, control and display module class objects as necessary within a library associated with the configuration application 50 (FIG. 1). The configuration engineer may, if desired, start with the lower scope entities, such as the control and display module classes, then develop module class objects for the higher scope entities, such as the equipment and the unit module class objects that may use or refer to the lower scope entities. Thereafter, the configuration engineer can select or specify the module class objects as necessary to create actual module objects corresponding to the selected module class objects for each of the process entities within the plant. When configuring replicated equipment, the configuration engineer will create a module object for each instance of the replicated equipment from the same module class object. Thus, the configuration engineer may create a reactor unit module class object for the reactors of FIG. 1 (which includes creating the other module class objects referenced by the reactor unit module class object if such other module class objects do not already exist within the library). Thereafter, the configuration engineer may configure the process by creating a reactor unit module object for each of the reactors Reactor_01, Reactor_02 and Reactor_03 of FIG. 1 from the reactor unit module class object.

After creating one or more module objects from a module class object, the configuration engineer may bind the module objects (including the sub-objects or referenced objects) to the specific equipment within the plant. Because the unit module objects are associated with a single unit module class object, the alias names, parameters, and other variables for the different unit module objects can be specified together using, for example, a bulk processing application such as a spreadsheet application. Of course, by binding the module objects to particular equipment, the configuration engineer is actually specifying the control variables and communication path names used by control routines or control modules within the controllers 12 to perform control activities during operation of the process plant 10 or display variables used by display routines in, for example, the workstations 14, during operation of the process plant 10. After the binding activities are completed, the configuration engineer may then download the bound control routines to the controllers 12 and the bound display routines to the workstations 14.

FIGS. 8–16 depict screen displays which may be created by the configuration application 50 of FIG. 1 during the process of a configuration engineer creating and using module class objects to configure the process plant 10. As will be understood, most of the screen displays in FIGS. 8–16 include an explorer view on the left-hand side of the screen, which provides an organizational tree structure depicting the configuration of the process plant 10. Likewise, most of the screen displays of FIGS. 8–16 include one or more information views on the right-hand side thereof. These information views provide further information about selected ones of the elements in the explorer view. The information that is able to be displayed to a user or changed by a user in the information views may be determined or controlled by the control and security parameters 534, 536, 538, 540, 572, 574, 580 and 582 of FIGS. 6 and 7 set for each of the different module class objects or sub-elements thereof. Thus, a particular element within the explorer view may be displayable or exposed to a user for viewing and/or changing based on the security and control parameters set in the module class object and propagated to the module objects depicted in the explorer view. Of course, as explained earlier, information may be hidden at all times, may be displayable or changeable only by a user entering a password or other security code, may be displayable at all times and not changeable, may be displayable and changeable at all times or any other combination of these or other security and change parameters. Still further, if desired, the displayability or changability of an element may be indicated in the explorer view using highlighting, graying out, color or any other technique to inform the user which elements can be displayed in more detail or changed.

Figure 8:
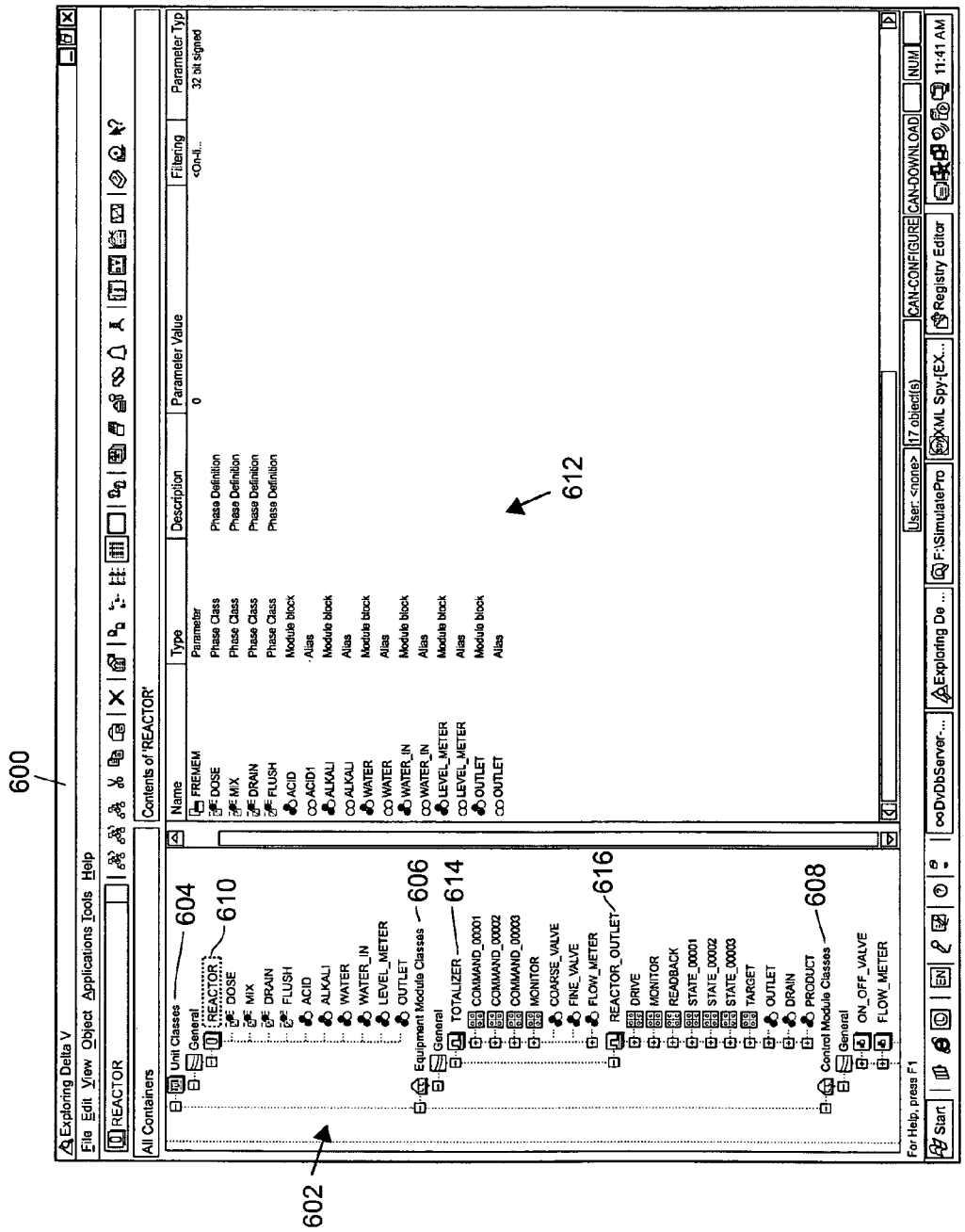
FIG. 8 is a depiction of a first configuration screen which may be used by a configuration operator to configure a process plant using module class objects.

In FIG. 8, a screen display 600 includes a portion of an explorer configuration view 602 depicted on the left-hand side of the display. The portion of the explorer view 602 illustrates a library which stores numerous module class objects, including unit module class objects 604, equipment module class objects 606 and control module class objects 608. A Reactor unit module class object 610 (which may correspond to the reactor unit module class object 410 of FIG. 6) is stored within the unit module class library 604 and includes indications of numerous sub-elements including a Dose, a Mix, a Drain, and a Flush phase class objects, and an Acid, an Alkali, a Water, and an Outlet equipment module class objects, a Water_In and a Level_Meter control module class objects and other objects as desired. Thus, as defined in the unit module class library 604, the Reactor unit module class object 610 includes indications of phase classes as well as indications of equipment module class objects and control module class objects. Because the Reactor unit module class object 610 is selected in the screen 600, the elements thereof are depicted in more detail on the right-hand side 612 of the screen 600.

Still further, the equipment module class library 606 includes a totalizer equipment module class object 614 (which may correspond to totalizer equipment module class object 416 of FIG. 7) and a Reactor_Outlet equipment module class object 616. The totalizer equipment module class object 614 includes three different portions of an algorithm (such as one of the algorithms 564 of FIG. 7) called Command_00001, Command_00002 and Command_00003. The module class object 614 also includes references to control module objects called Coarse_Valve and Fine_Valve (which are on/off type control module class objects) and Flow_Meter (which is a flow meter type control module class object). Still further, the Reactor_Outlet equipment module class object 616 includes a state driven control algorithm having different states called State_00001, State_00002 and State_00003, a Target, a Drive, a Monitor and a Readback module and an Outlet, a Drain and a Product valve control module object (which may be indications of or references to module blocks of the on/off control module class object type and which are named Outlet, Drain and Product or which may be simple objects). The command and state driven algorithms associated with the Totalizer and the Reactor_Outlet module class objects 614 and 616 may be any desired routines and may refer to control module objects within the equipment module class object to be used with those commands. In particular, the CDA or SDA command algorithms of the equipment module class objects may include expressions or actions which refer to control modules (or other equipment modules) by incorporating the names of module blocks corresponding to those modules to indicate which piece of equipment is to be manipulated when performing the algorithm. The use of the module block name corresponding to the control module (or another equipment module) within these algorithms specifies the control module object referenced by or associated with the equipment module object in which the algorithm is located and the specific names will be bound or instantiated when the equipment module object is created from the equipment module class object.

Figure 9:
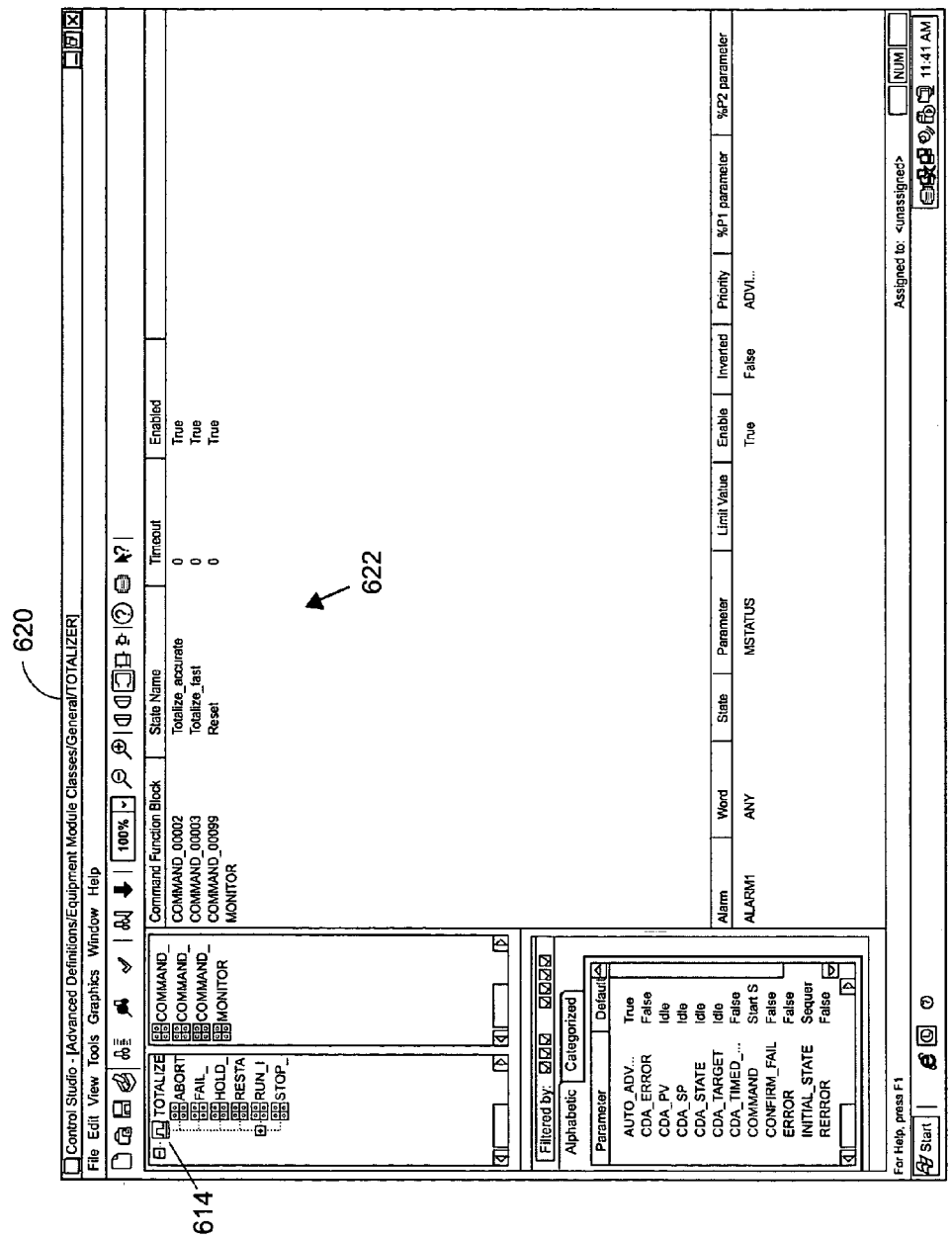
FIG. 9 is a depiction of a second configuration screen which may be used by a configuration operator to configure a process plant using module class objects.

FIG. 9 illustrates a configuration screen 620 in which the totalizer equipment module class object 614 is expanded to illustrate the run logic associated therewith including the command driven algorithm having Command_00002, Command_00003 and Command_00099. As illustrated in the right-hand side 622 of the screen 620, information about the run logic control routines is provided in more detail. In particular, the Command_00002 is a totalize accurate routine used to control accurate or fine flow through the totalizer. The Command_00003 is a totalize fast routine used to control or provide fast flow through the totalizer and the Command_00099 is a reset routine that resets the totalizer. The Monitor block in the screen 620 is a function block associated with the run logic which provides monitoring activities. As will be understood from FIGS. 8 and 9, each of the elements within the module class objects within the libraries 604, 606 and 608 has sub-objects and sub-elements and, in some or all cases, these sub-elements refer to or include control routines or display routines to be executed by a computer, such as a controller or a workstation, during operation of the process plant 10. However, the control and display routines and the other equipment references within the module class objects are generic in nature so that they are not tied to or bound to actual individual equipment within the plant 10.

Figure 10:
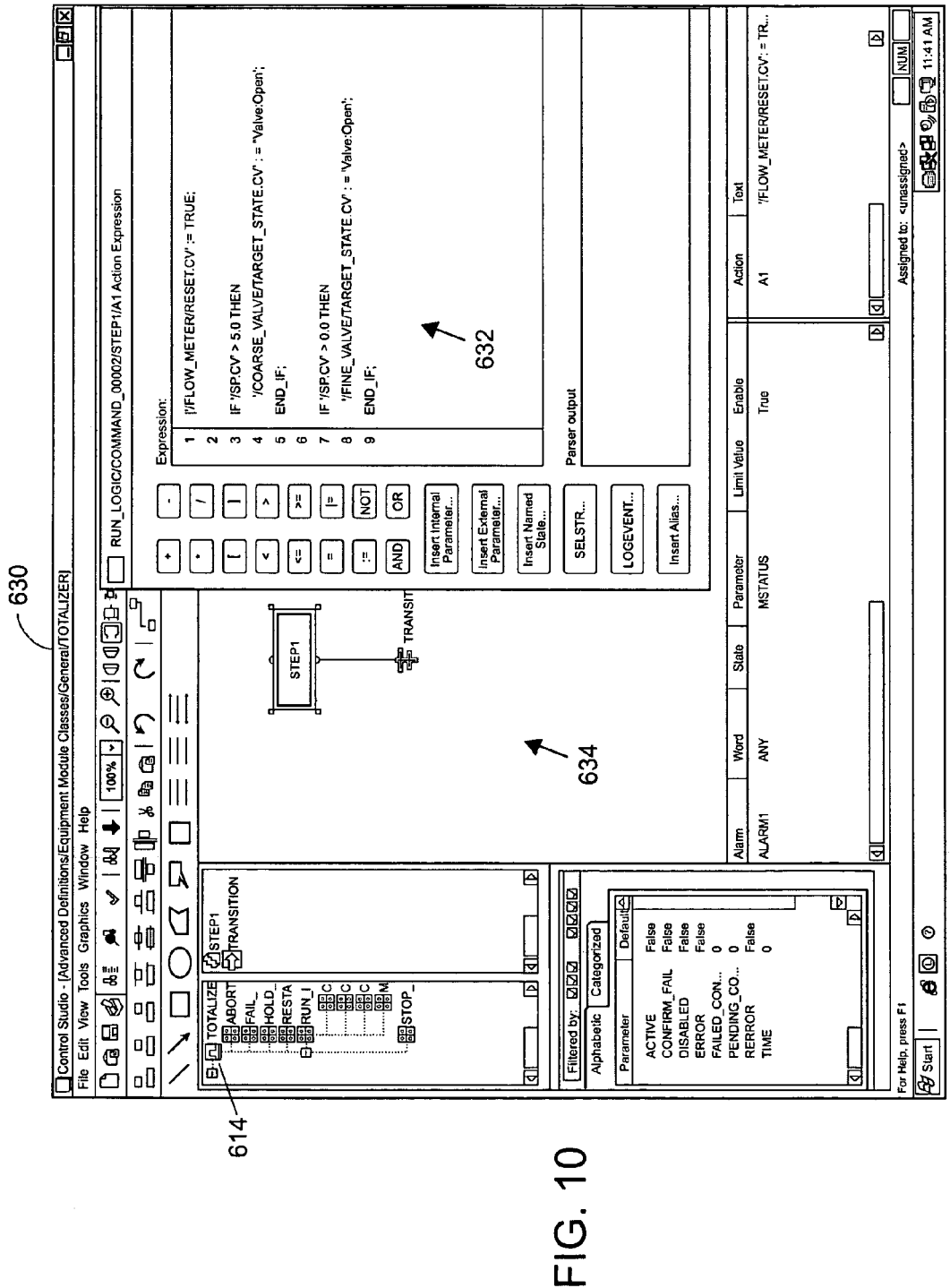
FIG. 10 is a depiction of a third configuration screen which may be used by a configuration operator to configure a process plant using module class objects.

FIG. 10 illustrates a further screen display 630 showing the details of the Command_00002 routine in the run logic of the totalizer equipment module class object 614. As illustrated in a pop-up window 632 developed from a sequential function chart programming editor 634, the Command_00002 routine includes a series of steps, and each step includes a series of actions. Only the first action (A1) of the first step (S1) of the Command_00002 routine is illustrated in the window 632. As will be noted, the first action of the first step of the Command_00002 routine sets the Flow_Meter control module object parameter Reset to "True" and then, based on conditions of the variable SP, sets the Target_State parameter of the Coarse_Valve control module object (or module block) to "Valve:Open" and sets the Target_State parameter of the Fine_Valve control module object (or module block) to "Valve:Open." It will be understood that this section of the Command_00002 routine references the Flow_Meter, the Coarse_Valve and the Fine_Valve control module objects (or module blocks) associated with the totalizer equipment module class object generically at this point, but that the Command_0002 routine of any actual totalizer equipment module object created from the totalizer equipment module class object will reference the actual name of the control module objects created with or as part of the totalizer equipment module object.

Figure 11:
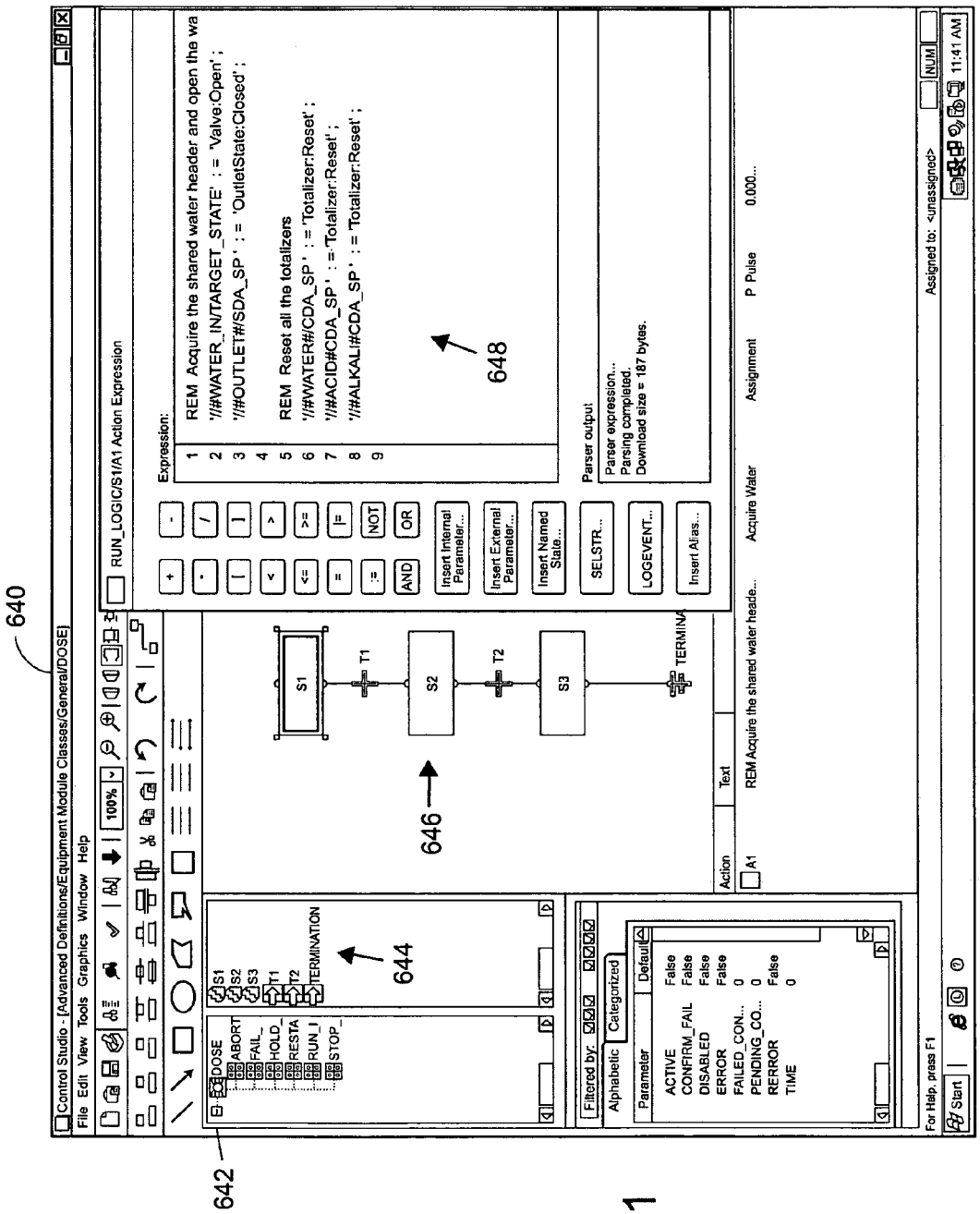
FIG. 11 is a depiction of a fourth configuration screen which may be used by a configuration operator to configure a process plant using module class objects.

FIG. 11 illustrates a screen view 640 showing details of a control algorithm associated with the Dose phase class 642 which may be used or referred to in Reactor unit module class object 610 of FIG. 8. In particular, the Dose phase class 642 includes a set of different general control actions including Abort, Fail, Hold, Restart and Run. The logic associated with the run action (called Run_Logic) includes a series of steps illustrated in the screen section 644 as Step 1 (S1), Step 2 (S2), and Step 3 (S3), two transitions T1 and T2 and a termination. A sequential function chart editor 646 graphically illustrates the steps and transitions in block diagram format. A pop-up screen 648 illustrates the actual control logic associated with Action 1 (A1) of Step 1 (S1). In particular, the run logic in the screen 648, which is a logic editor, includes the actions of acquiring the shared water header for the reactor, opening the water_in valve and then resetting all the totalizers associated with the reactor.

Because the Dose phase class is written independently of the reactor, it uses alias names to refer to equipment which will be specified either at or before runtime but which, of course, cannot be specified in the reactor unit module class object. However, the references to actual devices or other process elements used within the control algorithm 648 are to those devices as located within the same unit module class object, in this case the reactor unit module class object. In the control routine 648, alias names are delineated by the # symbol so that the #WATER_IN# is an alias name for the water_in control module within the same module, i.e., the unit module class object 610. Likewise, the #WATER#, the #ACID#, and the #ALKALI# designations refer to the Water, Acid and Alkali totalizer module blocks within the Reactor unit module class object 610. Of course, it will be understood that the totalizer and reactor outlet equipment module class objects and the on/off valve control module class objects are associated to the reactor unit module class object through corresponding totalizer and reactor equipment module objects (named, for example, Alkali1, Acid1, etc.) and on/off control module objects (named, for example, Coarse_Valve1, Fine_Valve1, Outlet1, etc.) and so, become a logical part of that unit class object.

Figure 12:
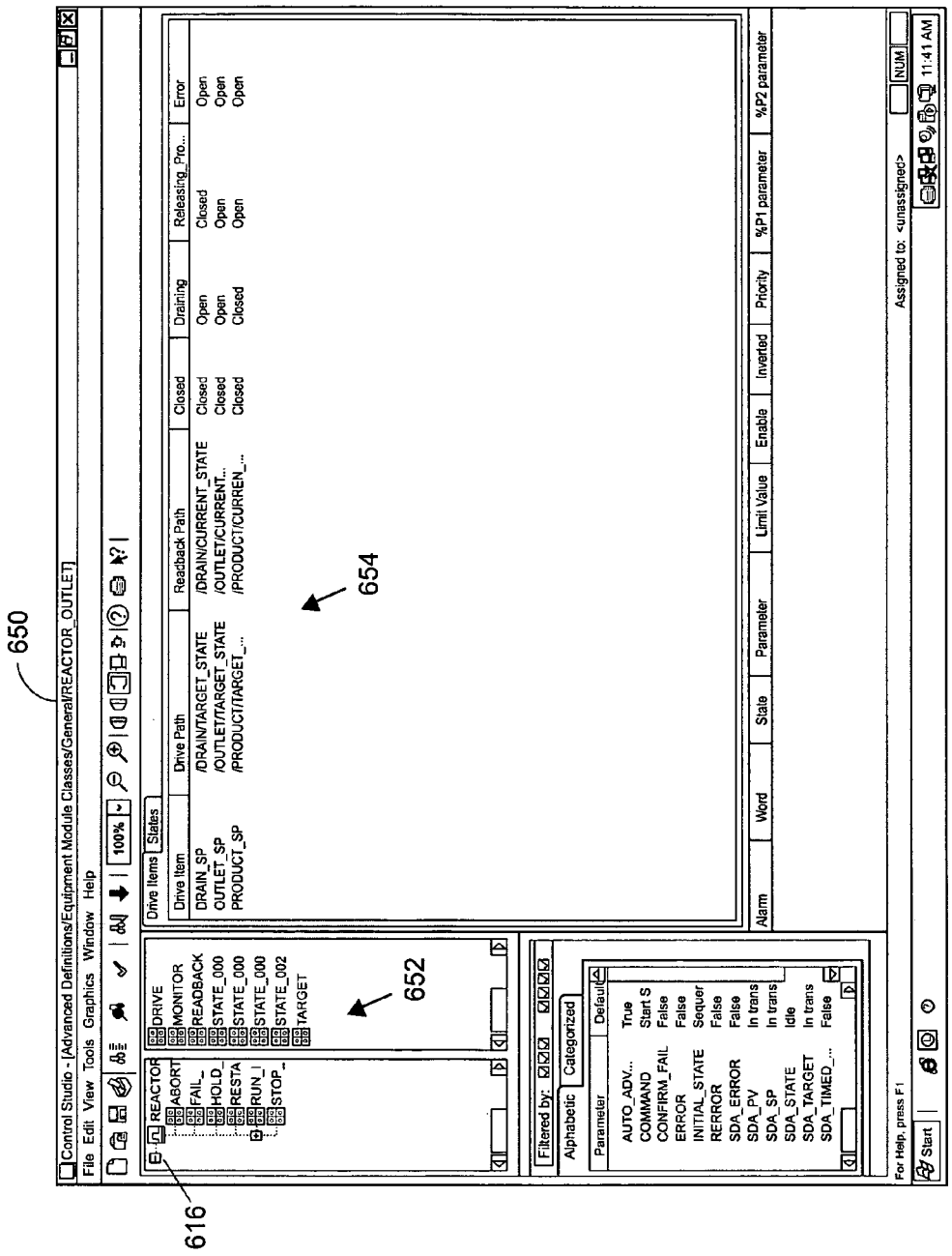
FIG. 12 is a depiction of a fifth configuration screen which may be used by a configuration operator to configure a process plant using module class objects.

FIG. 12 illustrates a screen display 650 in which the Reactor_Outlet equipment module class object 616 is illustrated in more detail. The Run_Logic associated with the Reactor_Outlet equipment module class object 616 is shown in a screen portion 652 as including a Drive element, a Monitor element, a Readback element and importantly, a state driven algorithm having four separate states used to control the valves associated with the Reactor_Outlet equipment module class object 616. The right-hand screen portion 654 includes details about the Drive items including the names of the drive items Drain_SP, Outlet_SP and Product_SP within control blocks or control modules used to open and close actual valves and the communication path specification for each control module Target_State in the module blocks named Drain, Outlet and Product. A readback path specification provides the communication path for the readback parameter of Current_State in each of the Drain, Outlet and Product module blocks and the states of the valves for different states of the Reactor_Outlet equipment are also provided. Thus, the Drive details within the screen portion 654 indicate that, during the closed state operation of the Reactor_Outlet 616, the drain, outlet and product valves are all closed, during the draining operation, the drain and outlet valves are open while the product valve is closed, and during the releasing product operation, the drain valve is closed and the outlet and product valves are open. As will be understood, while the screen display 650 of FIG. 12 illustrates one manner of specifying state driven control logic for an equipment module class object, any other desired manners may be used as well.

Of course if desired, these and similar screens as the screens 9–12 may be used by a configuration engineer to create and specify control algorithms within the Dose or other phase classes, or for any of the other modules, such as unit module class objects, equipment module class objects, and display module class objects to thereby create any desired module class object.

Figure 13:
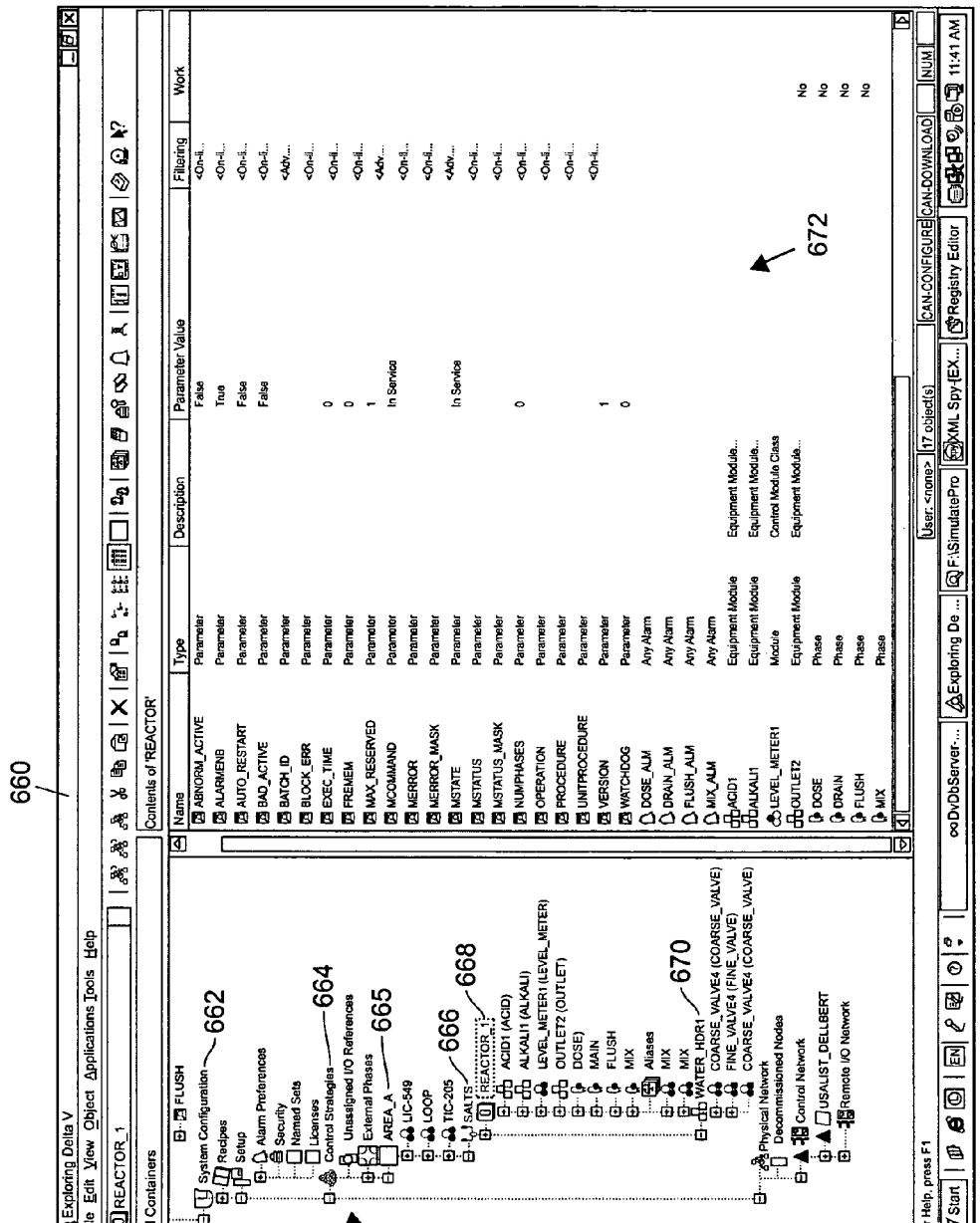
FIG. 13 is a depiction of a sixth configuration screen which may be used by a configuration operator to configure a process plant using module class objects.

After creating one or more module class objects as described above, the configuration engineer may then use these module class objects to configure elements within the process plant 10. FIG. 13 illustrates a screen display 660 having a hierarchical view 661 showing a system configuration 662 of the process plant 10. The system configuration 662 includes a section entitled control strategies 664 which specifies the control strategies for the process plant 10 and, in particular for use in controlling the process entities of the process plant 10. The control strategies 664 are divided into logical groupings, such as into physical areas of the plant 10. An Area_A 665 is illustrated in the view 661. Area_A 665 includes a salt manufacturing section 666 called Salts which may include numerous pieces or examples of replicated equipment therein used to manufacture salt.

To configure the salt manufacturing section of the plant 10, the configuration engineer may select the reactor unit module class object 610 within the unit module class library 604 of FIG. 8 and drag or otherwise copy it under the Salts 666 heading to create an instance of a reactor of the form specified by the reactor unit module class object 610. This reactor is illustrated in FIG. 13 as the Reactor_1 unit module object 668. The configuration application 50 may automatically name the Reactor_1 unit module object 668 based on the name of the unit module class object from which it was created but in a manner which is unique within the configuration system. As illustrated in FIG. 13, the Reactor_1 unit module object 668 includes an Acid_1 totalizer equipment module object, an Alkali_1 totalizer equipment module object, and an Outlet_2 equipment module object, which correspond to the acid, alkali and outlet module class objects specified within the reactor unit module class object 610. Still further, the Reactor_1 unit module object 668 includes Dose, Drain, Flush and Mix unit phases (developed from phase classes) as specified by the module class object 610. An alias resolution table is provided in a folder called Aliases and includes the resolution list for the alias used in the control routines anywhere in the Reactor_01 unit module object 668. The alias resolution table within the Reactor_1 unit module object 668 enables these control routines to be resolved before or during runtime to be bound to particular equipment within the process plant 10. The use of unit phases and alias resolution tables is described in detail in U.S. Pat. No. 6,385,496, which is assigned to the assignee of this patent and which is hereby expressly incorporated by reference herein. Still further, the Reactor_1 unit module object 668 includes a Water_HDR1 and a Water_In module object which correspond to the Water totalizer equipment module class object indicated within the Reactor unit class object 610 and the Water_In on/off valve control module class object of the Reactor unit class object 610, respectively. Of course, the configuration application 50 may again automatically provide the naming scheme used for the elements of the Reactor_01 unit module object 668 based on the names of the corresponding elements in the Reactor unit module class object 610 from which each of the individual elements of the Reactor_1 unit module object 668 was created, but in a manner that makes these names unique in the configuration strategy.

As will be understood from the discussion with respect to the Reactor unit module class object 610, the Water_HDR1 is a shared water header (corresponding to the water inlet valve system 110 of FIG. 1). As a result, a separate equipment module object under the Salts designation 666 is provided called Water_HDR1 670. Of course, the configuration engineer may create the Water_HDR1 670 module object from the totalizer equipment module class object 614 of FIG. 8 by copying or dragging the element to the screen section 661. As would be expected in this case, the shared water header Water_HDR1 670 is illustrated as including particular on/off valve control module objects (named Coarse_Valve4 and Fine_Valve4) and a particular flow meter control module object (named Flow_Meter4), which correspond to the Coarse_Valve, the Fine_Valve and the Flow_Meter control module class objects of the totalizer equipment module class object 614 of FIG. 8. Furthermore, the Water_HDR1 reference within the Reactor_1 module object 668 refers to the Water_HDR1 equipment module object 670.

Of course, any of the equipment or control modules could be designated within a unit module class object as a shared or a non-shared module object. A non-shared module object is completely owned by the higher level module object in which the non-shared module object is created. A shared module object is owned or associated with more than one higher level module object. The shared or non-shared nature of a module object influences the depiction of a module object in the explorer view. In particular, a non-shared module object designation results in a module object being depicted only under the higher level object within the control strategy, while a shared module object designation results in the shared module block or module object being depicted under each of the higher level module objects which share that element as well as a stand-alone module object in the explorer hierarchy.

As will be understood, the configuration engineer is able to create a control strategy within the control strategies section 664 of the configuration system for an entire reactor by simply copying a reactor unit module class object 610 and creating an instance thereof (the reactor unit module object 668) having all of the elements specified within the reactor unit module class object 610. However, the individual units and in particular, the control elements, of the reactor unit module object 668 are able to be tied or bound to particular entities within the process plant 10 using input/output designations that vary from module object to module object and using a configuration dialog box which may be created to enable a configuration engineer to specify the manner in which module objects are to be bound in the process plant. Also, as indicated above, the created reactor module object 668 is still connected to and owned by the reactor unit module class object 610 so that changes made within the reactor unit module class object 610 can be automatically propagated to and reflected within the Reactor_1 module object 668, if so desired. In any case, the configuration engineer may change or individually tailor the created module objects, such as the Reactor_1 unit module object 668, to accept or reject changes from the parent module class object either on a global (object wide) basis or on an element by element basis.

The right hand portion 672 of the screen 660 illustrates or lists the parameters, alarms, etc. associated with all of the elements in the Reactor_1 module object 668 (as that is the element selected in the section 661) and the values, filtering and other information associated therewith. Of course, the configuration engineer may change or specify this data for each of the elements of the Reactor_1 module object 668 as desired to thereby tailor individual module objects created from the module class object in any desired manner.

Figure 14:
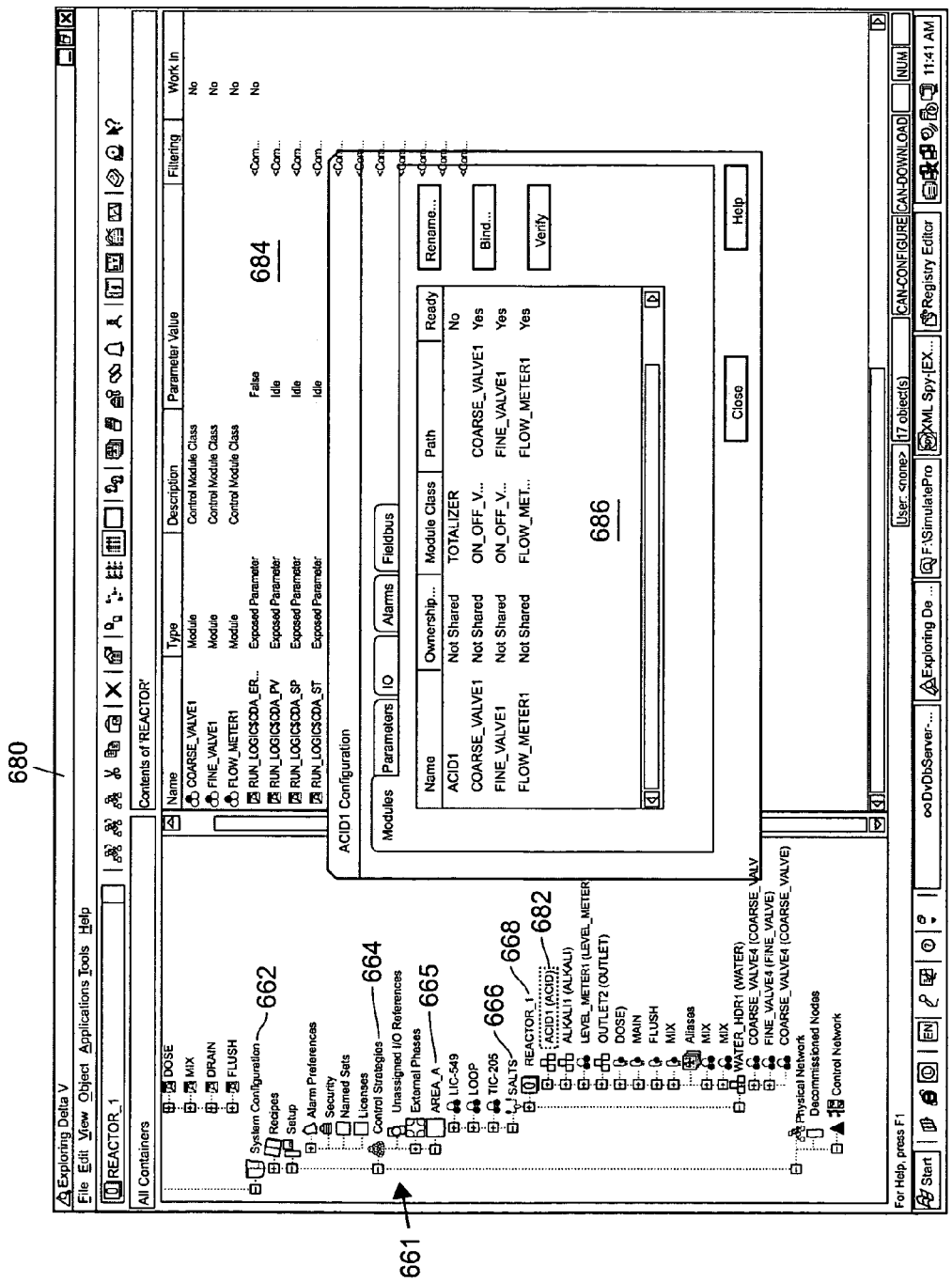
FIG. 14 is a depiction of a seventh configuration screen which may be used by a configuration operator to configure a process plant using module class objects.

FIG. 14 illustrates a screen display 680 showing the configuration of the Acid1 equipment module object 682 of the Reactor_1 unit module object 668. Because the Acid1 equipment module object 682 in FIG. 14 is selected, the elements thereof are illustrated in the right-hand portion 684 of the screen 680. These elements include a Coarse_Valve1, a Fine_Valve1 and a Flow_Meter1 control module objects, and exposed parameters.

A pop-up screen 686 provides information about the sub-module objects associated with the Acid1 equipment module object, as well as module class from which these sub-module objects originated or were created. In particular, the Acid1 equipment module object belongs to the totalizer equipment module class object, the Coarse_Valve1 and the Fine_Valve1 module objects belong to the On_Off_Valve control module class object from the library section 608 of FIG. 8 and the Flow_Meter1 module object belongs to the Flow_Meter control module class object in the library section 608 of FIG. 8.

The tabbed displays of the Acid1 configuration pop-up screen 686 also includes parameters, IO (input/output), alarms and Fieldbus designations. The parameters tab may be used to specify or fill in the parameters of each of the elements of the Acid1 totalizer of the Reactor_1 module object 668. The IO tab may be used to specify the input/output connections between each of the elements of the Acid1 totalizer module object 682 of the Reactor_1 module object 668 to thereby bind those individual elements to actual equipment within the process plant 10. If desired, these bindings may be specified using a spread sheet algorithm or program such as that illustrated in FIG. 15 to specify on a global or bulk basis the interconnections between all the elements of a module object (at any level) and the actual elements within the process plant 10. The spreadsheet display 688 of FIG. 15 illustrates a spreadsheet view that enables a configuration engineer to bind the coarse valves from different totalizer equipment modules to equipment within the process plant 10 at the same time. In this case, the IO_Out path names and IO_Readback path names are specified for the valves named VLV-101A, VLV-201A, VLV-301A and VLV-401A. However, if desired, different elements of the same module could be specified in a bulk manner.

Referring again to FIG. 14, the alarm tab of the pop-up screen 686 may be used to specify or configure alarms associated with the Acid_1 module object and a Fieldbus tab may be used to specify particular Fieldbus device connections as necessary. Of course, similar configuration screens could be used for other module objects within the Reactor_1 module object 668 or for the entire Reactor_1 module object 668. Likewise, the same or similar configuration screens may be used for other module objects. It will be understood that the configuration screens may be displayed and used at any level of module objects including at the unit module level, the equipment module level, the control module level, etc.

Figure 16:
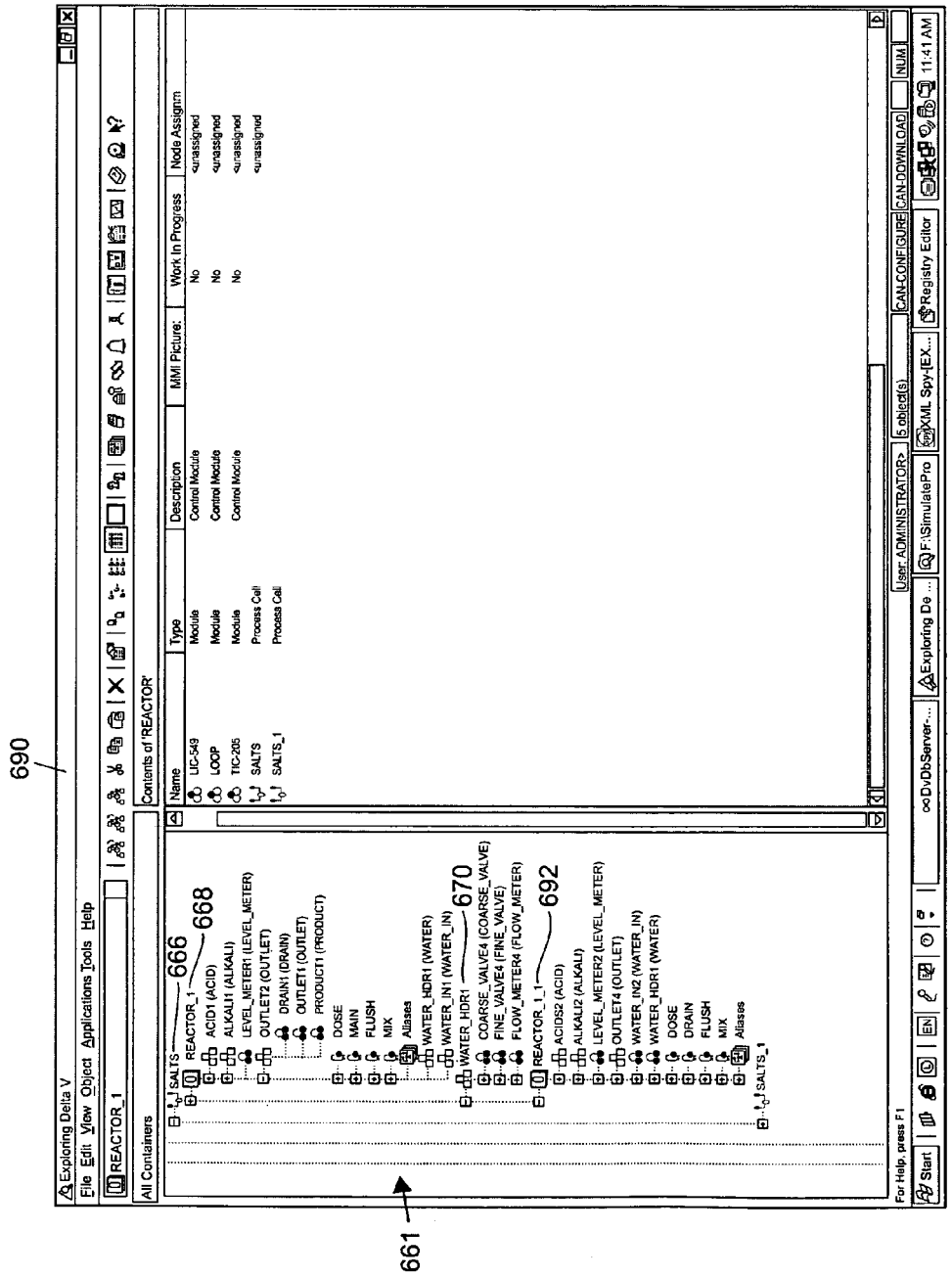
FIG. 16 is a depiction of a ninth configuration screen which may be used by a configuration operator to configure a process plant using module class objects.

FIG. 16 illustrates a screen display 690 including an explorer view 661 of the configuration system for the process plant 10 in which the configuration engineer has added a still further reactor module object 692, called Reactor_1_1, as copied or created from the Reactor unit module class object 610 of FIG. 8. Of course, when creating the Reactor_1_1 module object 692, the configuration engineer may specify different parameters, different connections to different devices and even different control routines to be used in the individual sub-elements thereof. As illustrated in FIG. 16, the Reactor_1_1 module object includes sub-objects for each of the equipment module class objects within the Reactor unit module class object 610 of FIG. 8 including an Acid2, Alkali2 and Outlet4 equipment module objects. The Reactor_1_1 module object also includes a Water_In2, and a Level_Meter2 control module object, a reference to the shared equipment module object named Water_HDR1 and Dose, Drain, Flush and Mix unit phases. The sub-objects that are associated only with the Reactor_1_1 module object 692 are given unique names while the shared units, such as the Water_HDR1 module object, is illustrated with the name of the shared water header.

It will be understood that, in a similar manner, the configuration engineer may use any other unit module class objects, equipment module class objects and control module class objects as well as display module class objects to create configuration elements for units, equipment, control elements and display elements within the process control environment according to the principles described therein. It will also be understood that the use of these module class objects, which can be quite detailed in nature, provides the configuration engineer with great advantages in creating a configuration because the engineer does not have to create each individual control element separately or copy each individual control element separately from a control template but, instead, can use module class objects which are provided at higher and higher levels or scopes to create larger and larger bulk configuration items for use in configuring the process plant 10.

Still further, the configuration engineer may make changes to the elements of the configuration of different process entities on a global basis by changing one or more of the unit module class objects and having those changes propagated to each of the module objects created from and associated with those unit module class objects. This feature makes changes within the configuration easier and less time consuming to make after a configuration has already been created. Moreover, the configuration engineer may specify an access level to different elements or components of module objects within the configuration system by setting security parameters within the module class objects. As noted above, the configuration engineer may specify a security on a module by module basis at any level, such as at the unit module level, the equipment module level, the control module level and the display module level. In this manner, some elements of a unit module object may be viewable while others may not be viewable.

Of course, once the configuration system is complete and the module objects are bound to the individual process entities within the process plant 10, the control and display modules or elements associated with these modules may be downloaded to the proper controllers 12 and workstations 14 of FIG. 1 for execution during operation of the process plant 10.

Figure 17:
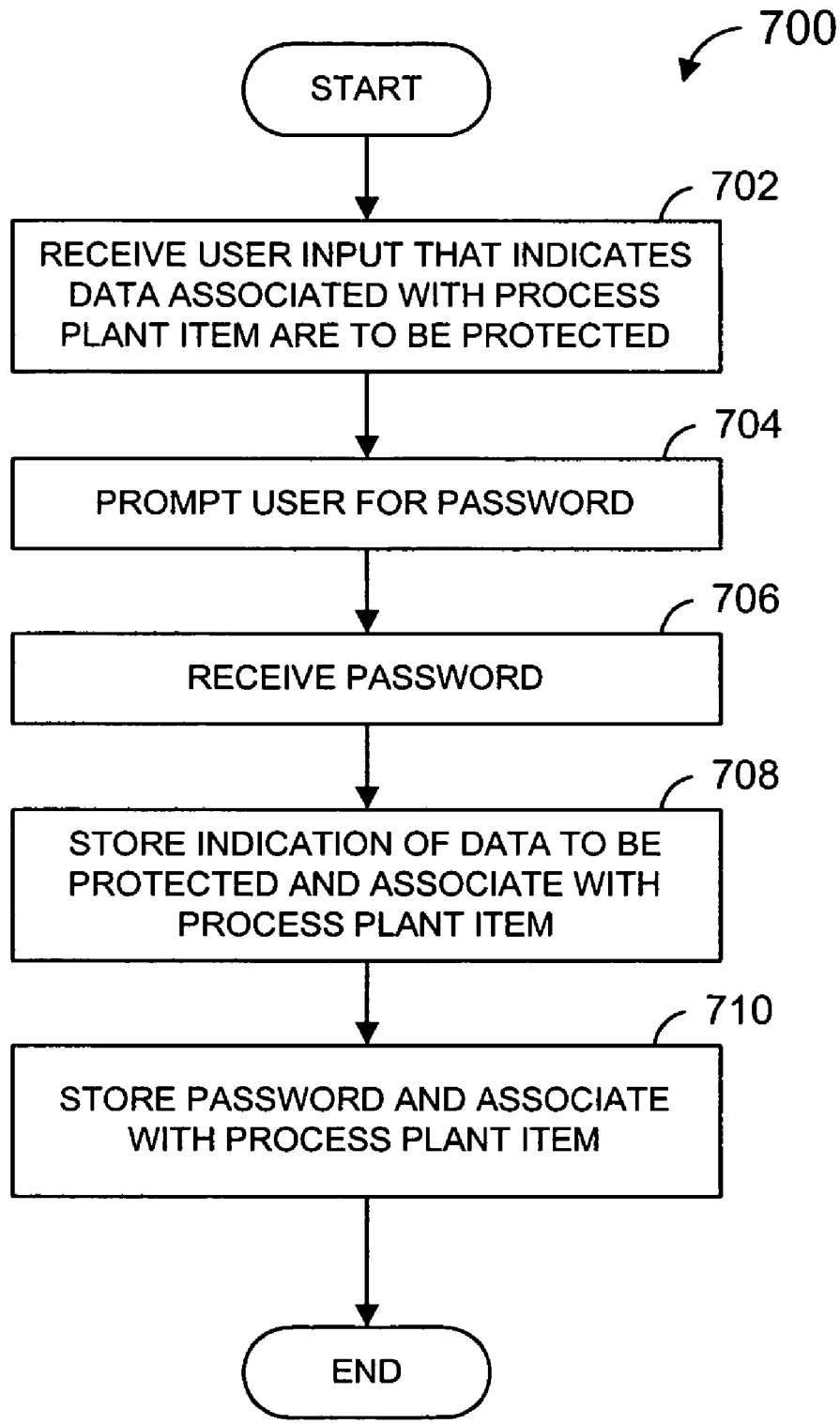
FIG. 17 is a flow diagram of an example routine for configuring a process plant item to limit access to the item.

FIG. 17 is a flow diagram of an example routine 700 for configuring a process plant item to limit access to the item. The routine 700 may be implemented by one or more computing systems such as one or more of the workstations 14 and/or the controllers 12 of the process plant 10 of FIG. 1. The routine 700 may be implemented by a computing system separate from the process plant 10 as well. For example, a third party provider could use the routine 700 to limit access to, for example, a module object, a module class object, a module template, a composite template, etc., developed by the third party provider. Then, the developed module object, module class object, composite template, etc., could be used by a customer of the third party provider, but the customer would not be able to, for example, view some or all of the internal items of the developed module object, module class object, composite template, etc. In general, the process plant item to be configured may be a module object, a module class object, a composite template, for example. The routine 700 may be implemented as part of a configuration application, such as the configuration application 50. For example, the routine 700 may be implemented during or after the configuration of a module object, a module class object, a composite template, etc., using the configuration application 50. Also, the routine 700 may be implemented by an application separate from the configuration application 50.

At a block 702, a user input is received that indicates that access to the process plant item is to be controlled (i.e., data associated with the process plant item are to be protected). For example, a person configuring the item may check a box, select a button, select a menu item, etc., that indicates that data associated with the item is to be protected. The user input may optionally also indicate which data associated with the item are to be protected. For example, the user may select to protect some data while leaving other data unprotected.

Alternatively, the user may not be allowed to select which data will be detected. For example, the user may be only able to choose between protection or no protection for an item. In one example, if a user selects to protect data associated with a module object or module class object, a set of the data associated with the module object or module class object may be protected whereas data not in the set is not protected. For example, function blocks that make up a module object or module class object and their interconnections will be protected, but parameters of the module object or module class object will not be protected.

Figure 18A:
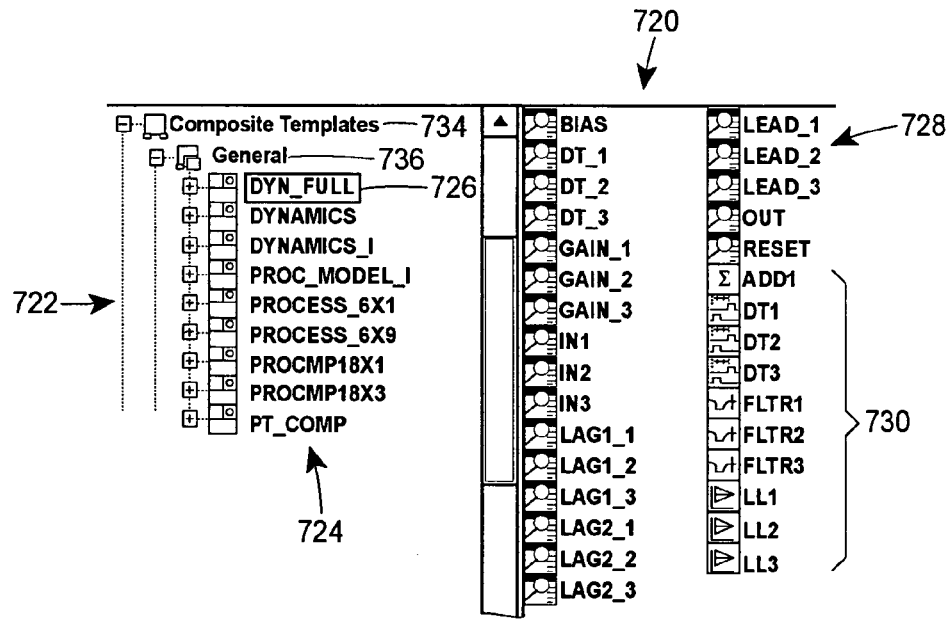
FIG. 18A is an example screen display showing sub-elements, including function blocks, of a composite template.
Figure 18B:
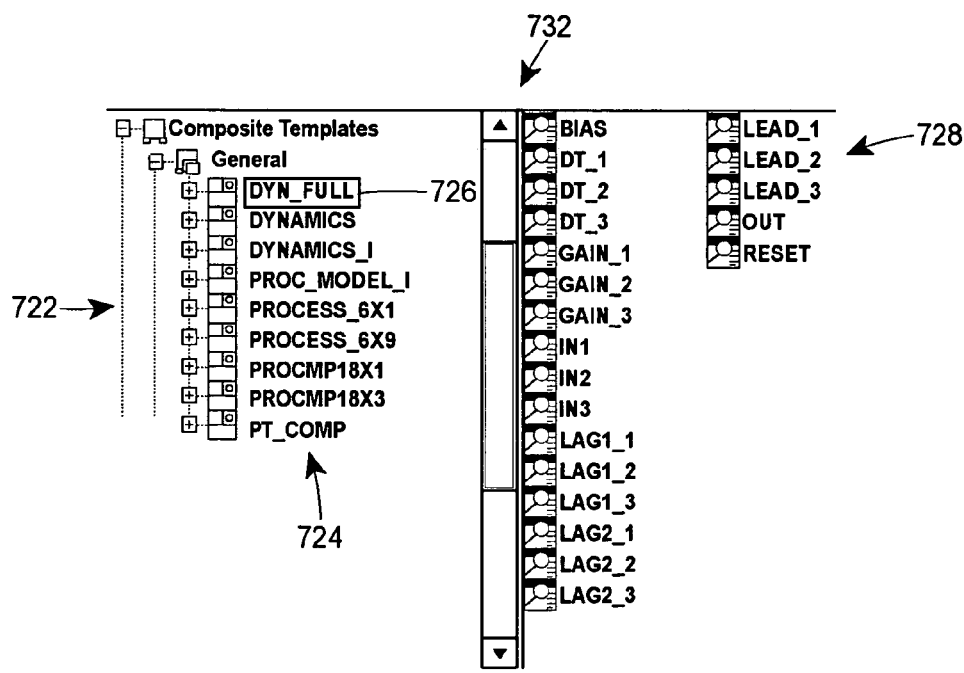
FIG. 18B is an example screen display showing sub-elements of the composite template of FIG. 18A, but in which the function block sub-elements are hidden.

FIGS. 18A and 18B are example screen displays that may be created by a configuration application such as the configuration application 50 of FIG. 1. Similar screen displays could be created by other types of applications such as an application used to monitor a process during operation of the process, a debugging application for debugging a configuration, an asset management application, etc. The screen display 720 includes a portion 722 of an explorer view having a library 724 of composite templates. One of the composite templates is the DYN_FULL composite template 726. The DYN_FULL composite template 726 comprises various sub-elements which, because the DYN_FULL composite template 726 has been selected in the explorer view 722, are depicted in the right-hand side 728 of the screen display 720. The sub-elements that make up the DYN_FULL composite template 726 include parameters and function blocks 730.

In the screen display 720, the DYN_FULL composite template 726 has not been configured as protected and thus the function blocks 730 are depicted in the right-hand side 728 of the screen display 720. In contrast, FIG. 18B illustrates a screen display 732 corresponding to the DYN_FULL composite template 726 configured as protected. Thus, in the screen display 732, the function blocks 730 are not depicted in the right-hand side 728 (i.e., they are hidden). The parameters of the DYN_FULL composite template 726 are still depicted even though it has been configured as protected.

Referring again to FIG. 17, at a block 704, the user may be prompted to enter a password. For example, a window, screen, audio prompt, etc., may prompt the user to enter a password. As will be described below, the password may be used at a subsequent point in time to access the protected data and/or to reconfigure the item to remove the protection. At a block 706, the password may be received. For example, the password may be entered via a keyboard, keypad, touch screen, light pen, mouse, etc., of a computing system.

At a block 708, an indication of the data associated with the process plant item that is to be protected may be stored and associated with the item. For example, if the item is an object, the indication may be stored as part of that object. As another example, the indication could be stored separate from the object and a link to the indication could be stored as part of the object. As yet another example, if the process plant item is an item created from a module class object, the indication could be stored as part of the module class object. If the user is not permitted to select which data is to be protected, the block 708 may be omitted.

At a block 710, the password received at the block 706 may be stored and associated with the item. For example, if the item is an object, the password may be stored as part of that object. As another example, the password could be stored separate from the object and a link to the password could be stored as part of the object. As yet another example, if the process plant item is an item created from a module class object, the password could be stored as part of the module class object.

Optionally, the data to be protected and/or the password may be encrypted. In these implementations, the blocks 708 and 710 may comprise storing and associating the encrypted data and/or the encrypted password. Further, if the process plant item is an item created from a module class object the protected data or the encrypted data could be stored as part of the module class object.

If the item is a module class object, the indication of data to be protected and the password may be propagated to items created from the module class object.

A routine similar to the routine 700 could be used to "unprotect" the process plant item or particular data associated with the item. Namely, user input that indicating that data associated with a protected process plant item is to be unprotected could be received. Then, the user could be prompted for a password. If the received password matches the password stored and associated with the protected process plant item at the block 710 of the routine 700, the user could be prompted as to which (or whether all) of the protected data is to be unprotected. Then, the indication stored and associated with the item at the block 708 of the routine 700 could be modified to indicate that some or all of the data is not to be protected.

Figure 19:
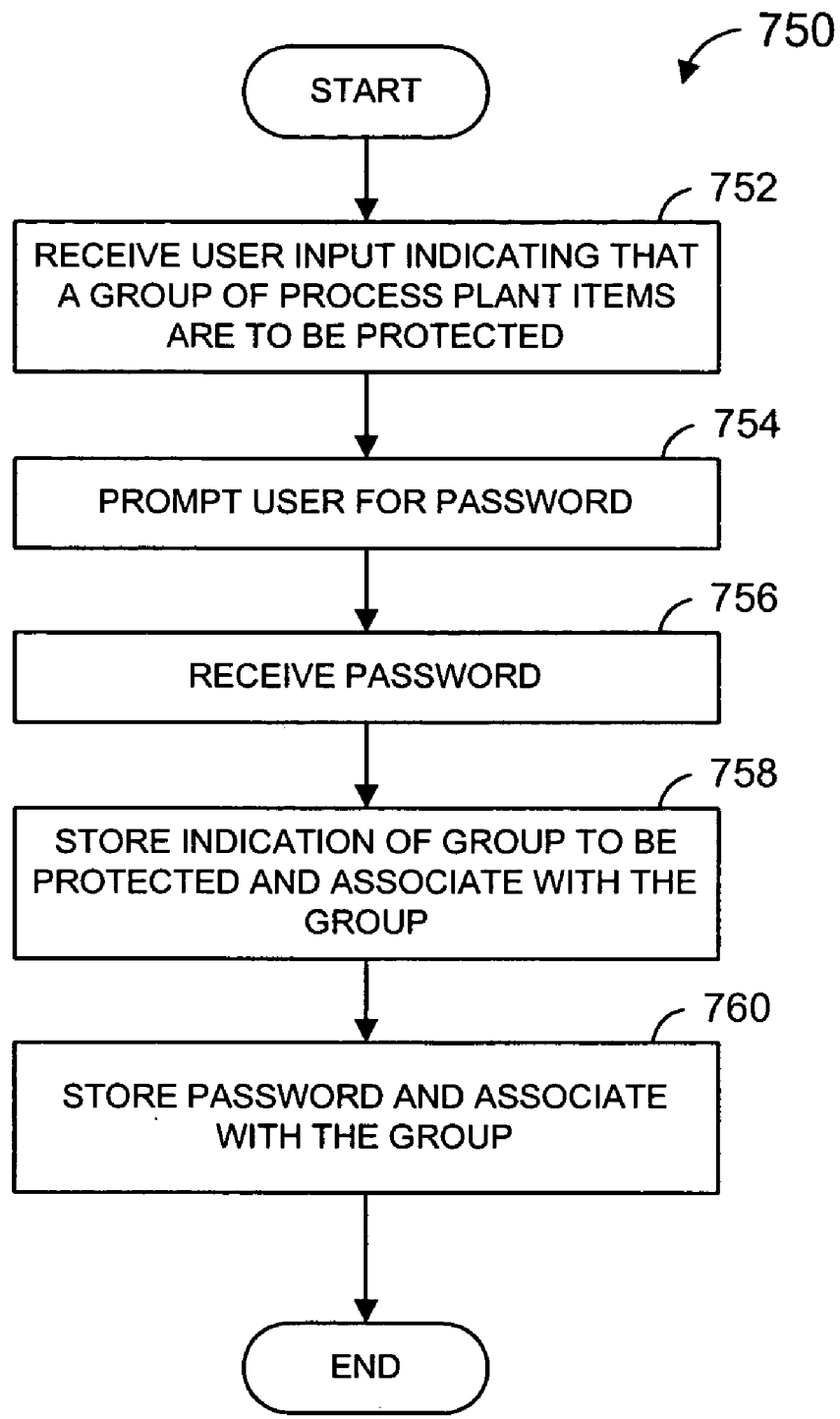
FIG. 19 is a flow diagram of an example routine for configuring a group of process plant items to limit access to the group.

FIG. 19 is a flow diagram of an example routine 750 for configuring a group of process plant items to limit access to the group. The routine 750 may be implemented by one or more computing systems such as one or more of the workstations 14 and/or the controllers 12 of the process plant 10 of FIG. 1. The process plant items in the group may be module objects, module class objects, and/or composite templates, for example. The routine 750 may be implemented as part of a configuration application, such as the configuration application 50. For example, the routine 750 may be implemented after the configuration of items in the group using the configuration application 50. Also, the routine 750 may be implemented by an application separate from the configuration application 50.

At a block 752, a user input is received that indicates that access to the group of items is to be controlled (i.e., the group of process plant items are to be protected). For example, access to data associated with each item in the group may be protected. Additionally, the addition of items to the group or the deletion of items from the group may not be permitted. The group of items may comprise, for example, a library of items, a folder of items, a class of items, a category of items, etc.

A person configuring the group of items may first select the group by, for example, highlighting the group of items, selecting a library name, a folder name, a class name, a category name, etc. Referring to FIG. 18A, a person could, for example, select the sub-library 734, select the category 736, highlight a plurality of modules in the category 736, etc. Then, the person may, for example, check a box, select a button, select a menu item, etc., that indicates that the group is to be protected.

Referring again to FIG. 19, at a block 754, the user may be prompted to enter a password. For example, a window, screen, audio prompt, etc., may prompt the user to enter a password. As will be described below, the password may be used at a subsequent point in time to access the protected group and/or to reconfigure the group to remove the protection. At a block 756, the password may be received. For example, the password may be entered via a keyboard, keypad, touch screen, light pen, mouse, etc., of a computing system.

At a block 758, an indication that the group of items is to be protected may be stored and associated with the group of items. For example, if the group is a category of items, the indication that the category is to be protected may be stored and that indication may be associated with that category so that if an attempt is subsequently made to modify the category it may be determined that the category is protected. In addition, an indication may be associated with each item in the group. For example, if the items are objects, an indication that the item is in a protected group may be stored as part of each object. Also, the indication may be stored separate from each object and a link to the indication may be stored as part of each object.

At a block 760, the password received at the block 756 may be stored and associated with the group of items. For example, if the group is a category of items, the password may be stored and that password may be associated with the category. In addition, the password may be associated with each item in the group. For example, if the items are objects, the password may be stored as part of each object. Also, the password may be stored separate from each object and a link to the password may be stored as part of each object.

As with the routine 700 of FIG. 17, a routine similar to the routine 750 could be used to "unprotect" the group of process plant items.

Figure 20:
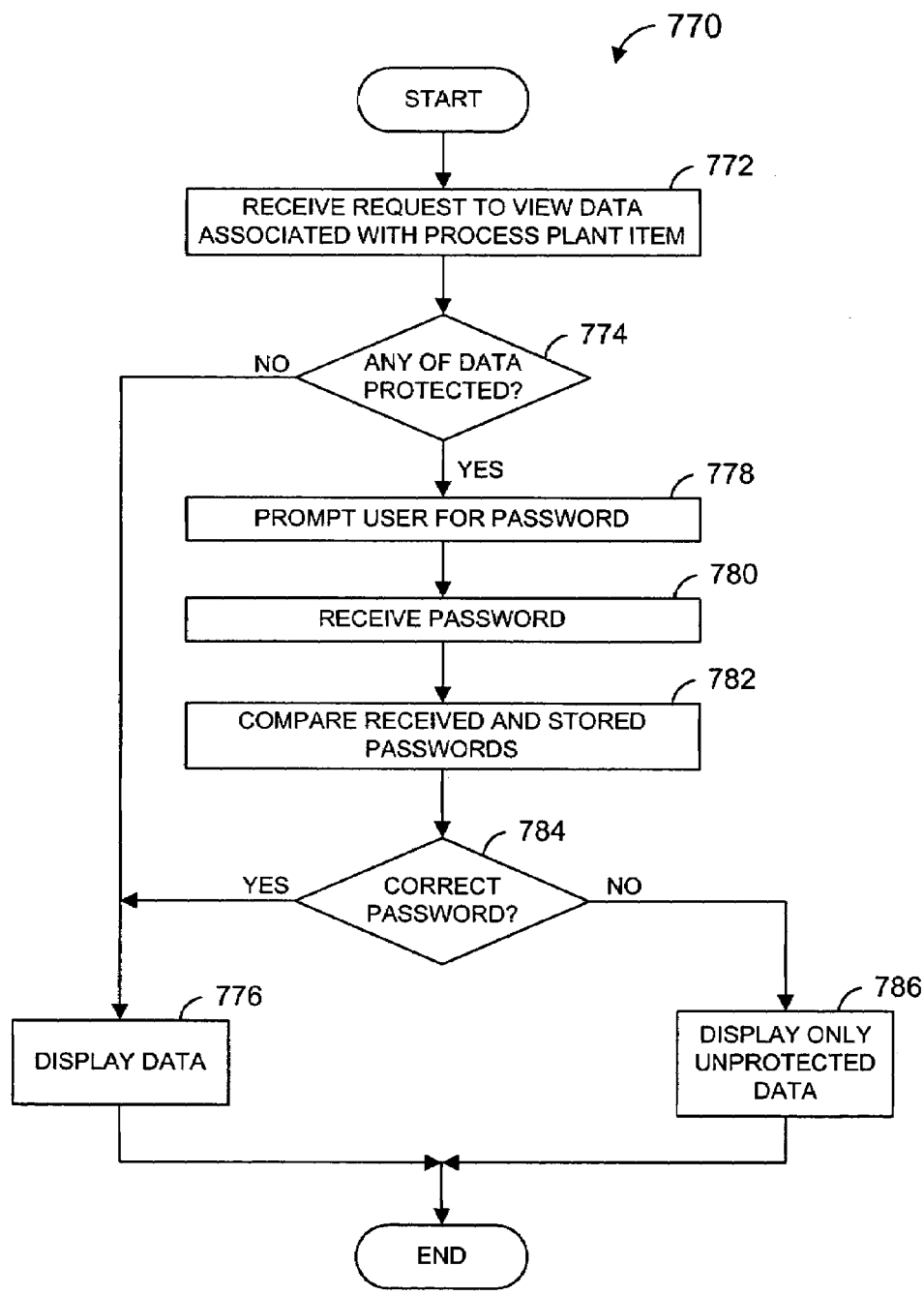
FIG. 20 is a flow diagram of an example routine for determining whether to permit viewing of data associated with a process plant.

FIG. 20 is a flow diagram of an example routine 770 for determining whether to permit viewing of data associated with a process plant item that may or may not be protected. The routine 770 may be implemented by one or more computing systems such as one or more of the workstations 14 and/or the controllers 12 of the process plant 10 of FIG. 1. The process plant item may comprise a module objects, a module class object, a composite template, for example. The routine 770 may be implemented as part of a configuration application, such as the configuration application 50. Also, the routine 770 may be implemented as part of another application such as a monitoring application, a debugging application, an asset management application, etc.

At a block 772, a request to view data associated with a process plant item may be received. For example, a user may select an item in an explorer view, attempt to "drill down" into a module to see components of the module, etc. Referring to FIG. 118B as an example, a user has selected the DYN_FULL composite template 726 in the portion 722 of the explorer view in the screen display 732. Thus, sub-elements of the DYN_FULL composite template 726 are to be displayed in the right-hand portion 728 of the screen display 732.

At a block 774, it is determined whether any data associated with the item is protected. For example, it may be determined whether there is an indication associated with the item, such as the indication stored at the block 708 in FIG. 17, that indicates that data associated with the item is protected. As another example, it may be determined whether there is an indication associated with the item, such as the indication stored at the block 758 in FIG. 19, that indicates that the item is part of a group of items that is protected.

If data associated with the item is not protected, the flow may proceed to a block 776 at which data associated with the item is displayed. For instance, if the user had selected the item in an explorer view, sub-elements of that item may be displayed in a portion of a display screen. Referring to FIG. 18A as an example, a user has selected the DYN_FULL composite template 726 in the portion 722 of the explorer view in the screen display 720. Thus, sub-elements of the DYN_FULL composite template 726 including function blocks 730 are displayed in the right-hand portion 728 of the screen display 720. As another example, if the user requested to "drill down" into a module to see components of the module, the components of that module could be displayed in display screen or window.

If it is determined at the block 774 that data associated with the item is protected, the flow may proceed to a block 786, at which protected data associated with the item is not displayed while unprotected data may be displayed.

Optionally, if it is determined at the block 774 that data associated with the item is protected, the flow may proceed to a block 778. At the block 778, the user may be prompted, using, for example, a window, a display screen, an audio prompt, etc., to enter a password. At a block 780, the password entered by the user may be received. For example, the password may be entered via a keyboard, keypad, touch screen, light pen, mouse, etc., of a computing system. At a block 782, the password received at the block 780 may be compared to a password stored and associated with the item. For example, the received password may be compared to the password stored at the block 710 of FIG. 17, or the password stored at the block 760 of FIG. 19.

At a block 784, it may be determined if the password received at the block 780 matches the password stored and associated with the item. If the passwords match, data associated with the item may be displayed at the block 776. If the passwords do not match, protected data associated with the item is not displayed while unprotected data may be displayed at the block 786. Referring to FIG. 18B, for example, parameters of the DYN_FULL module 726 are displayed in the right-hand portion 728 of the display screen 732, but function blocks of which the DYN_FULL module 726 is comprised are not displayed.

It is to be understood that the blocks 778, 780, 782, and 784 are optional and may be omitted. In this case, as discussed above, if it is determined at the block 774 that data is protected, the flow may proceed to the block 786.

Figure 21:
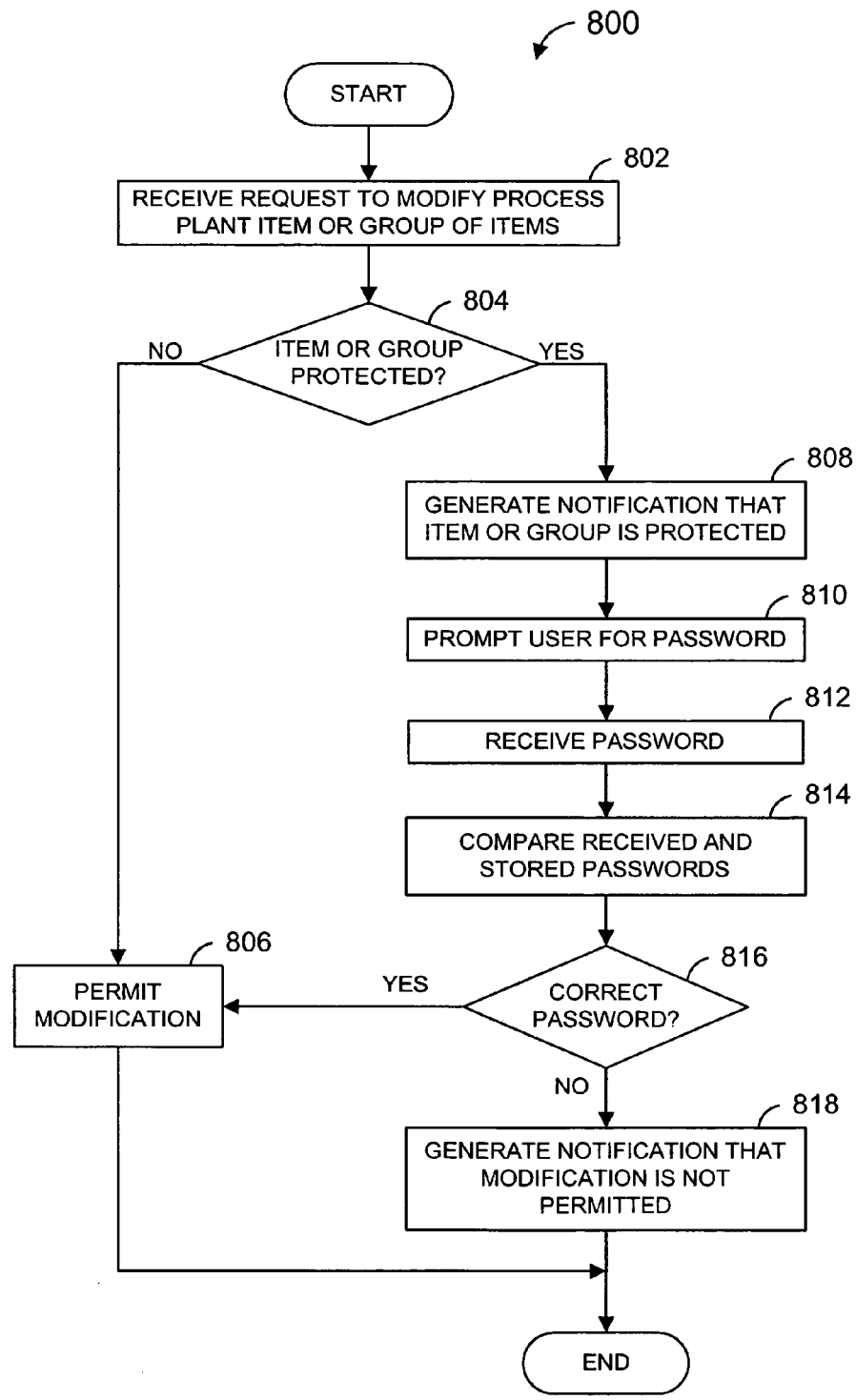
FIG. 21 is a flow diagram of an example routine for determining whether to permit modification of a process plant item or a group of process plant items.

FIG. 21 is a flow diagram of an example routine 800 for determining whether to permit modification of a process plant item or a group of process plant items that may or may not be protected. The routine 800 may be implemented by one or more computing systems such as one or more of the workstations 14 and/or the controllers 12 of the process plant 10 of FIG. 1. The process plant items may comprise module objects, module class objects, and/or composite templates, for example. The routine 800 may be implemented as part of a configuration application, such as the configuration application 50. Also, the routine 800 may be implemented as part of another application such as an asset management application, for example.

At a block 802, a request to modify a process plant item or a group of process plant items may be received. For example, a user may select an item in an explorer view for modification, select a component of an item for modification, etc. As another example, the user may attempt to delete an item from a group of items, add a new item to a group of items, etc.

At a block 804, it is determined whether the item or the group of items is protected. For example, it may be determined whether there is an indication associated with the item, such as the indication stored at the block 708 in FIG. 17, that indicates that the item is protected. As another example, it may be determined whether there is an indication associated with the item, such as the indication stored at the block 758 in FIG. 19, that indicates that the item is part of a group of items that is protected. As yet another example, it may be determined whether there is an indication associated with the group of items, such as the indication stored at the block 758 in FIG. 19, that indicates that the group of items is protected.

If data associated with the item or group of items is not protected, the flow may proceed to a block 806 at which modification is permitted. If, however, it is determined at the block 804 that the item or group of items is protected, the flow may proceed to a block 808. At the block 808, a notification (e.g., a window, display screen, audio prompt, etc.) may be generated that indicates that the item or group of items that the user is attempting to modify is protected. Optionally, the block 808 may be omitted. In this case, the item or group of items may displayed in such a way as to indicate to the user that the item or group of items are protected. For example, a depiction of the item or group of items on a display screen may be "greyed," include a symbol, etc., that indicates that the item or group is protected in another example, there may be no indication to the user that the item or group is protected. In this case, the user may simply be unable to modify the item or group. After the block 808, or if the block 808 is omitted, the routine may end.

Optionally, the flow may proceed to a block 810. At the block 810, the user may be prompted, using, for example, a window, a display screen, an audio prompt, etc., to enter a password. At a block 812, the password entered by the user may be received. For example, the password may be entered via a keyboard, keypad, touch screen, light pen, mouse, etc., of a computing system. At a block 814, the password received at the block 812 may be compared to a password stored and associated with the item or group of items. For example, the received password may be compared to the password stored at the block 710 of FIG. 17, or the password stored at the block 760 of FIG. 19.

At a block 816, it may be determined if the password received at the block 812 matches the password stored and associated with the item or group of items. If the passwords match, the modification may be permitted at the block 806. If the passwords do not match, a notification may be generated at the block 818 that the modification is not permitted. Alternatively, or in addition, the notification may indicate that the password received at the block 812 was not the correct password.

As discussed above, blocks 810, 812, 814, 816, and 818 are optional and may be omitted. In this case, the routine may end after the block 808. Also, the block 808 is optional and may be omitted. In this case the routine may end or may proceed to the option block 810 if it is determined at the block 804 that the item or group is protected.

Although in FIGS. 17 and 19–21 passwords for limiting access to process plant items were discussed, other techniques for limiting access may be used alternatively or in addition to passwords. For example, a preauthorized security access level or levels indicating personnel authorized to access items, a list of indications of particular persons (e.g., login names, ID numbers, etc.) authorized to access items, biometric data, etc., could be used. Further, additional data related to a level of protection may also be associated with an item or group of items such as whether all access is forbidden, whether read-only access allowed, different levels of protection for different persons and/or levels of clearance, etc. Moreover, in some implementations, a user may be permitted to select different levels of security for sub-elements of an item. In general, access security data (e.g., password, biometric data, preauthorized security access levels, a list of authorized persons and/or IDs, etc.) may be stored and associated with a process plant item, and this access security data may be compared with user security data (e.g., a password entered by a user, the user's ID, the user's login ID, biometric data obtained from the user, etc.) to determine if the user is permitted access to the item and/or particular sub-elements of the item.

Referring to FIG. 17, blocks 704, 706, and 710 may be omitted if desired. For example, a user could indicate that the process plant item or data associated with the process plant item are to be protected. Then, the user could use a routine similar to the routine 750 of FIG. 19 to protect a group of items that includes the process plant item that the user wishes to protect. In this way, the user could prevent others from changing the configuration of the item in order to view the protected data.

Figure 22:
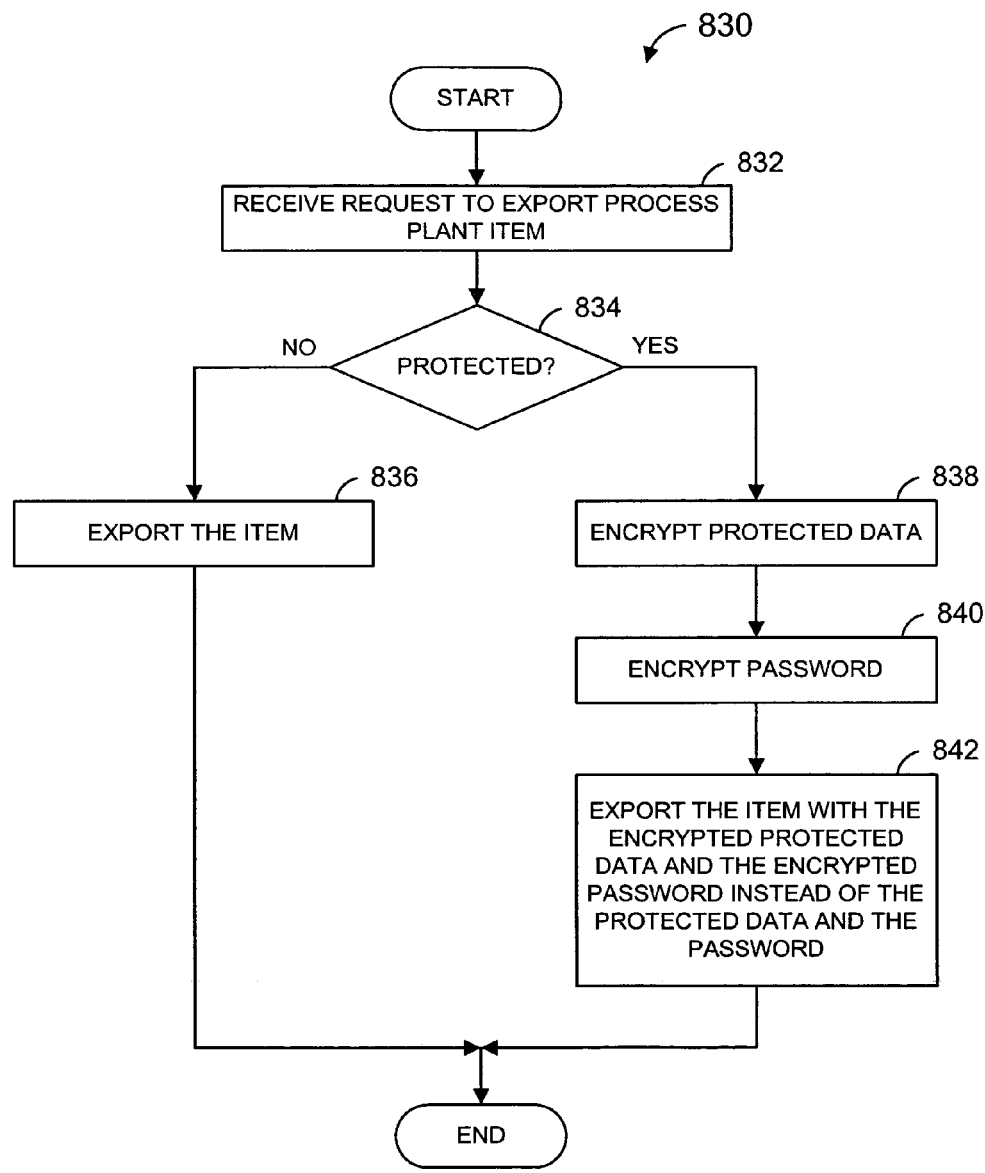
FIG. 22 is a flow diagram of an example routine for exporting a process plant item.

FIG. 22 is a flow diagram of an example routine 830 for exporting a process plant item. The routine 830 may be implemented by one or more computing systems such as one or more of the workstations 14 and/or the controllers 12 of the process plant 10 of FIG. 1. Also, the routine 830 may be implemented by a computing system separate from the process plant 10. For example, the routine 830 could be implemented by a computing system of a third-party provider or a computing system of another process plant in order to export a process plant item to a customer or to the process plant 10. The process plant item may comprise a module object, a module class object, a composite template, for example. The routine 830 may be implemented as part of a configuration application, such as the configuration application 50. Also, the routine 830 may be implemented as part of another application such as an asset management application, or an application used by a third-party provider, for example.

At a block 832, a request to export a process plant item may be received. For example, a user may select an item in an explorer view for export. As another example, the user may select a group of process plant items for export, and the routine 830 may be implemented for each item in the group.

At a block 834, it is determined whether any data associated with the item is protected. For example, it may be determined whether there is an indication associated with the item, such as the indication stored at the block 708 in FIG. 17, that indicates that data associated with the item is protected. As another example, it may be determined whether there is an indication associated with the item, such as the indication stored at the block 758 in FIG. 19, that indicates that the item is part of a group of items that is protected. If data associated with the item is not protected, the flow may proceed to a block 836 at which the item may be exported.

If, however, it is determined at the block 834 that data associated with the item is protected, the flow may proceed to a block 838. At the block 838, the protected data may be protected. Then, at a block 840, a password associated with the item may be encrypted. For example, the password received at the block 706 of FIG. 17 or the password received at the block 756 of FIG. 19 is encrypted.

At a block 842, the item may be exported but with the protected data replaced by the encrypted protected data and the password replaced by the encrypted password. If the process plant item is an item created from a module class object the encrypted data and/or the encrypted password could be exported as part of the module class object or the item, for example.

Figure 23:
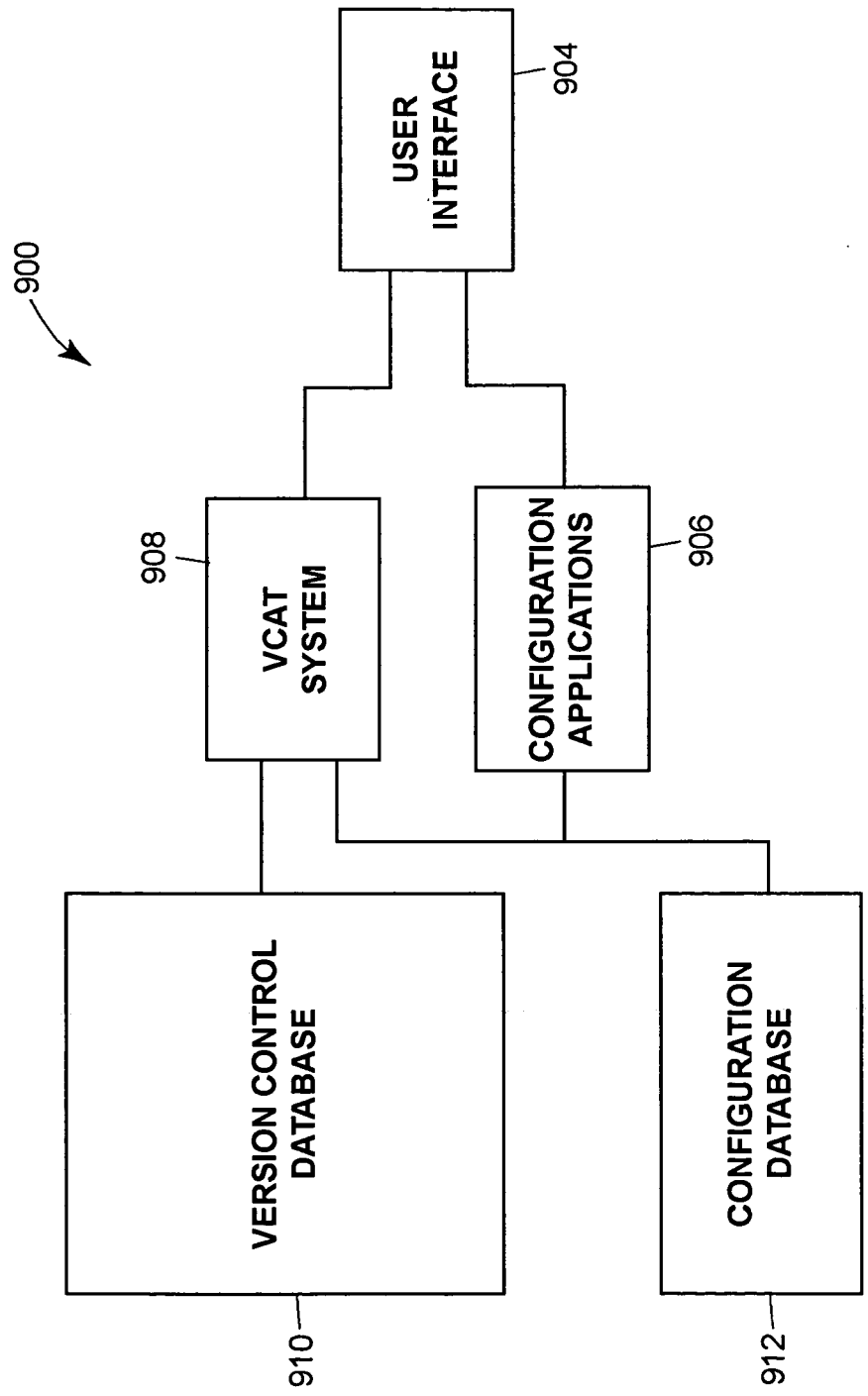
FIG. 23 is a block diagram of an example configuration system that may be used to provide version control and audit trail information associated with a process plant.

FIG. 23 is a block diagram of an example configuration system 900 that may be used to provide version control and audit trail information associated with a process plant. Further aspects of version control and audit trail techniques that may be used are described in U.S. Pat. No. 6,449,624, entitled "Version Control and Audit Trail in a Process Control System," assigned to the assignee of the present application. It is to be understood that the techniques described in U.S. Pat. No. 6,449,624 need not be used, and different techniques may also be used. U.S. Pat. No. 6,449,624 is hereby incorporated by reference herein in its entirety for all purposes.

The configuration system 900 comprises a user interface 904 which, for example, may be generated on a display device of the workstation 14 (FIG. 1) or some other computing device. The user interface 904 may enable a user to configure a process plant or a portion of a process plant via one or more configuration applications 906. The configuration applications 906 may include a configuration application such as the configuration application 50 (FIG. 1). The user interface 904 also interfaces with a version control and audit trail system 908 (hereinafter "the VCAT system"), which, in general, cooperates with the configuration applications 906 to record and administer historical information regarding the configuration of the process plant or the portion of the process plant. Both the configuration applications 906 and the VCAT system 908 access and otherwise communicate with a configuration database 912, which may store data representative of a current configuration of the process plant or the portion of the process plant (hereinafter the "process configuration"). The VCAT system 908 is also in communication with a version control database 910.

The version control database 910 may include configuration history data indicative of any number of prior versions of each item utilized in the process configuration. Taken together, the history data for all of the items may be used to reconstruct past configurations of the process. More particularly, for each item in the configuration database 912 (as well as those no longer in the configuration database 912), data representative of the configuration of that item is stored for a plurality of versions. For example, an item may have been modified on three occasions since it was created. The version control database 910 would therefore have data indicative of the configuration of the item at the point of creation, which may be referred to as "Version b 1," as well as data indicative of the configuration of the item after each of the three modifications, which would correspond with "Version 2," "Version 3," and "Version 4."

The configuration history data may thus include data representative of all of the modifications made to module objects and module class objects. The modifications may, but need not, be made using the configuration applications 906. Any or all of the user interface 904, the configuration applications 906, and the VCAT system 908 could be combined into a single, integrated system. For ease of explanation, however, tasks will be described herein as being attributed to the user interface 904, the configuration applications 906, and the VCAT system 908 separately.

The VCAT system 908 may be implemented using one or more computing device, such as the workstation 14 (FIG. 1), in a manner that allows for the monitoring of modifications to the process configuration. The user interface 904 and the configuration applications 906 may be implemented on the same computing device(s) as the VCAT system 908, or on different computing devices in communication with the computing device(s) that implement the VCAT system 908.

The data in one or both of the databases 910, 912 may be stored in a computer-readable medium physically located anywhere within the process plant 10, such as, for example, a volatile memory or a magnetic or optical storage medium associated with the workstations 14. Alternatively, one or both of the databases 910, 912 may be stored in a remote location such that a computing device such as the workstation 14 accesses the data stored therein over a network such as an intranet, the Internet, or any other communication medium. Furthermore, the data stored in each database 910, 912 need not be stored in the same computer-readable medium, such that any portion of either database 910, 912 may be stored in a memory device or medium which is distinct from devices or media storing other portions.

In FIG. 23, the VCAT system 908 is shown as distinct and separate from the version control database 910. Alternatively, the version control database 910 could from a portion of the VCAT system 908. Similarly, the configuration database 912 and the version control database 910 may, but need not, constitute separate and distinct data structures. That is, the databases 910, 912 may be located in the same storage medium and, in fact, may compose portions of a common database dedicated to the process plant 10. Accordingly, a "database," as used herein, should be understood to not be limited to any particular data structure.

Figure 24:
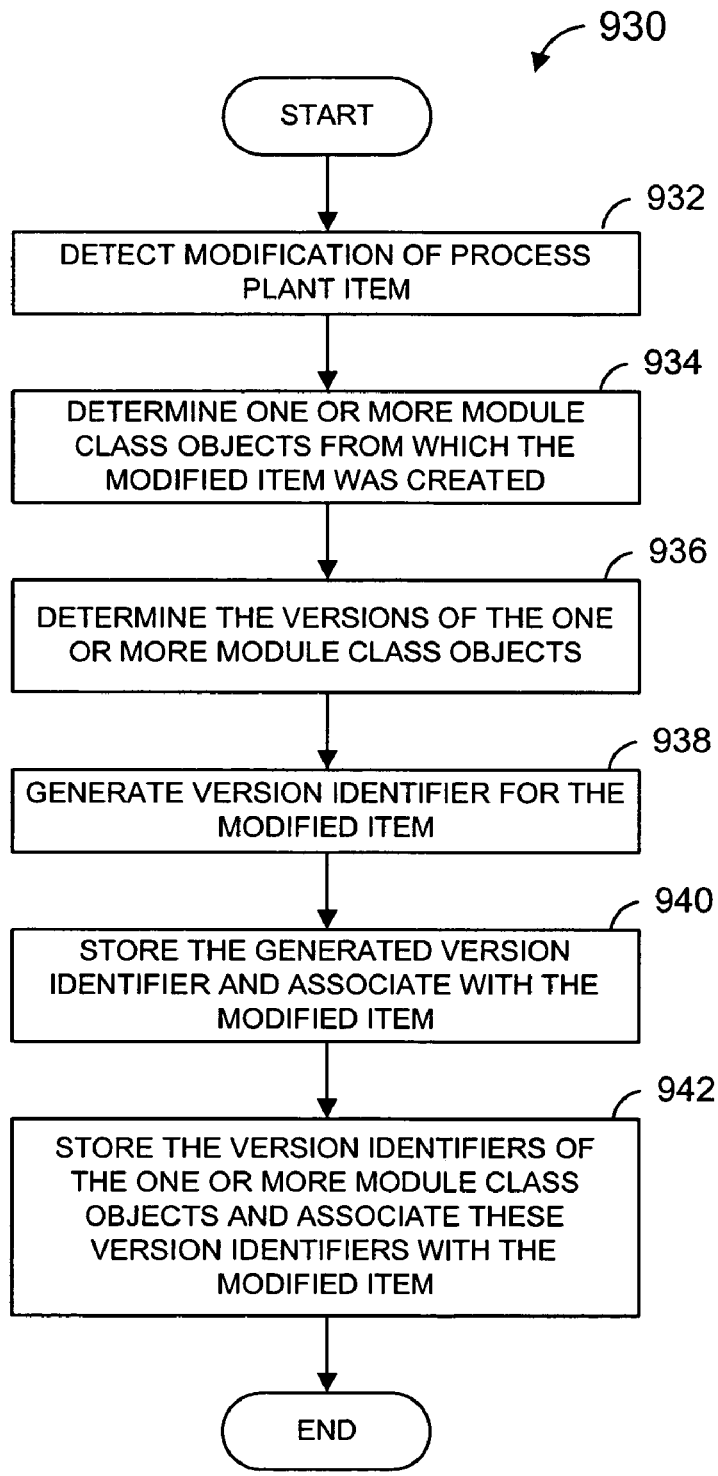
FIG. 24 is a flow diagram of an example routine for facilitating the tracking of versions of a process plant item.

FIG. 24 is a flow diagram of an example routine 930 for facilitating the tracking of versions of a process plant item. The process plant item may comprise module objects and/or module class objects, for example. The routine 930 may be implemented by the VCAT system 908 of FIG. 23, for example, and will be discussed with reference to FIG. 23.

At a block 932, a modification of a process plant item may be detected. For example, a user may try to add a new item to the process configuration using the configuration applications 906. As another example, the user may request to save an item to the configuration database 912 after having modified the item. As yet another example, the user may request to "check-in" an item to the configuration database 912 after having modified the item. U.S. Pat. No. 6,449,624 describes techniques related to "check-in" and "check-out" procedures that may be used.

At a block 934, it may be determined which, if any, module class objects were used to create the modified item. For example, a first module class object could have been used to create a second module class object, which in turn was used to create the item. If one or more module class objects were used to create the modified item, at the block 936 the version of each module class object used may be determined.

At a block 938, a version identifier for the modified item is generated. The version identifier may comprise numbers, letters, symbols, etc. The version identifier is indicative of the version that reflects the modification detected at the block 932. For example, if the modification detected at the block 932 was the creation of the item, the version identifier may be indicative of an initial version. As another example, if the modification detected at the block 932 was a modification of a first version of the item, the version identifier may be indicative of a second version.

At a block 940, the version identifier generated at the block 938 may be stored and associated with the modified item. For example, if the item is an object, the version identifier may be stored as part of that object. As another example, the version identifier could be stored separate from the object and a link to the version identifier could be stored as part of the object.

At a block 942, the version identifier(s) of the one or more module class object from which the item was created, if any, determined at the block 936 may be stored and associated with the modified item. For example, if the item is an object, the version identifier(s) may be stored as part of that object. As another example, the version identifier(s) could be stored separate from the object and a link or links to the version identifier(s) could be stored as part of the object. In yet another example, the version identifier generated at the block 938 could be generated using the version identifiers determined at the block 936. For instance, the version identifiers determined at the block 936 could be encoded within the version identifier generated at the block 938. In this case, the block 940 could comprise the block 942.

Figure 25:
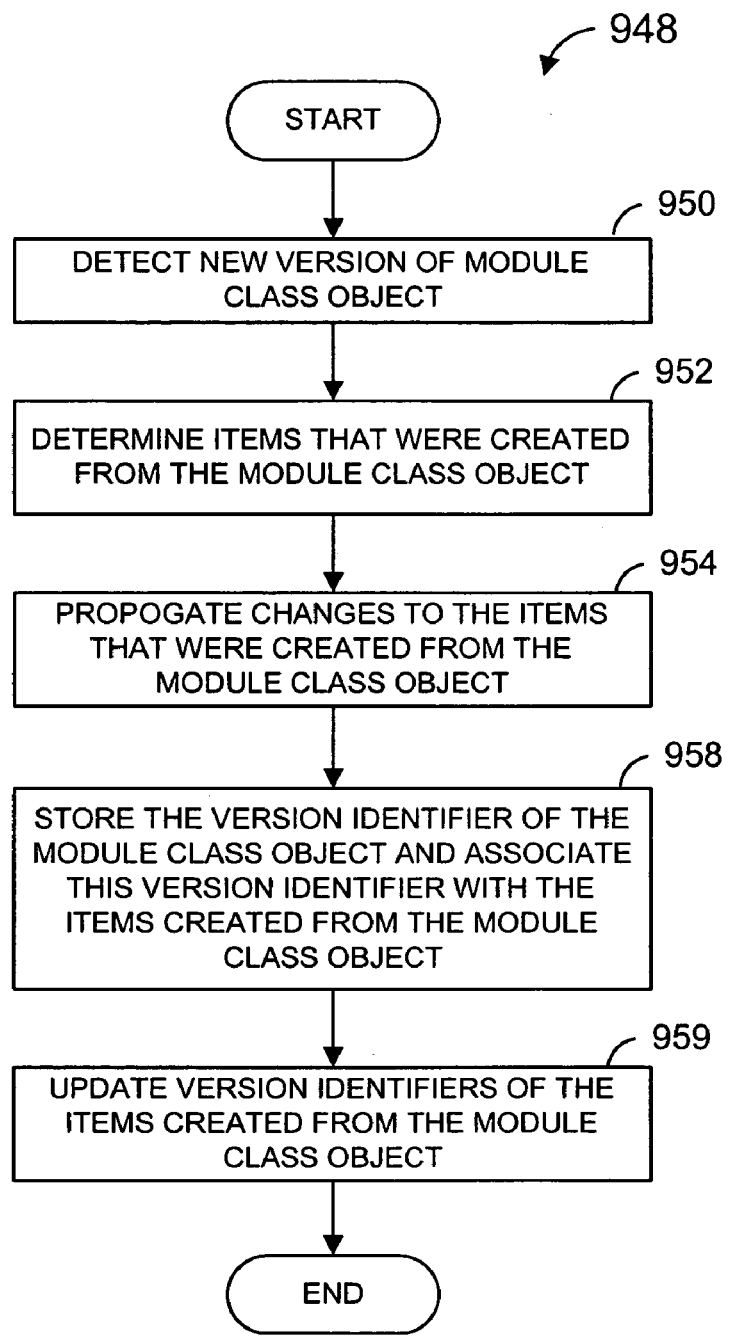
FIG. 25 is a flow diagram of an example routine for facilitating the tracking of versions of process plant items.

FIG. 25 is a flow diagram of an example routine 948 for facilitating the tracking of versions of process plant items. The process plant items may comprise module objects and/or module class objects, for example. The routine 948 may be implemented by the VCAT system 908 of FIG. 23, for example.

At a block 950, it may be determined whether a new version of a module class object has been created. For example, it could be detected when a new version module class object has been "checked in." At a block 952, process plant items that were created using the module class object may be determined. Referring to FIG. 6, for example, the memory 526 could be examined to determine which module objects that were created from the module class object. Also, the memory 526 or some other memory or section could be examined to determine which other module class objects were created from the module class object.

At a block 954, the new version of the module class object, or the changes made to the module class object, may be propagated to the items determined at the block 952. Then, at a block 958, the version identifier of the new version of the module class object may be stored and associated with the items determined at the block 952. In one example, the version identifiers of the items determined at the block 952 are not updated to reflect new versions of the items. Optionally, in another example, the version identifiers of the items determined at the block 952 are updated at a block 959. Then, the new version identifiers of the items may be stored and associated with the items.

The version identifiers stored at the blocks 940 and 942 of FIG. 24 and block 958 and 959 of FIG. 25 may help a user to track which versions of items, and versions of module class objects from which the items were created, are being used in a current configuration. For example, a configuration application, an asset management application, etc., could examine the configuration database 912 (FIG. 23) to determine the versions of items and versions of module class objects from which the items were created. As another example, a debugging application, a monitoring application, etc., could examine a memory of a controller 12, for instance, to determine the versions of items and versions of module class objects from which the items were created.

Figure 26:
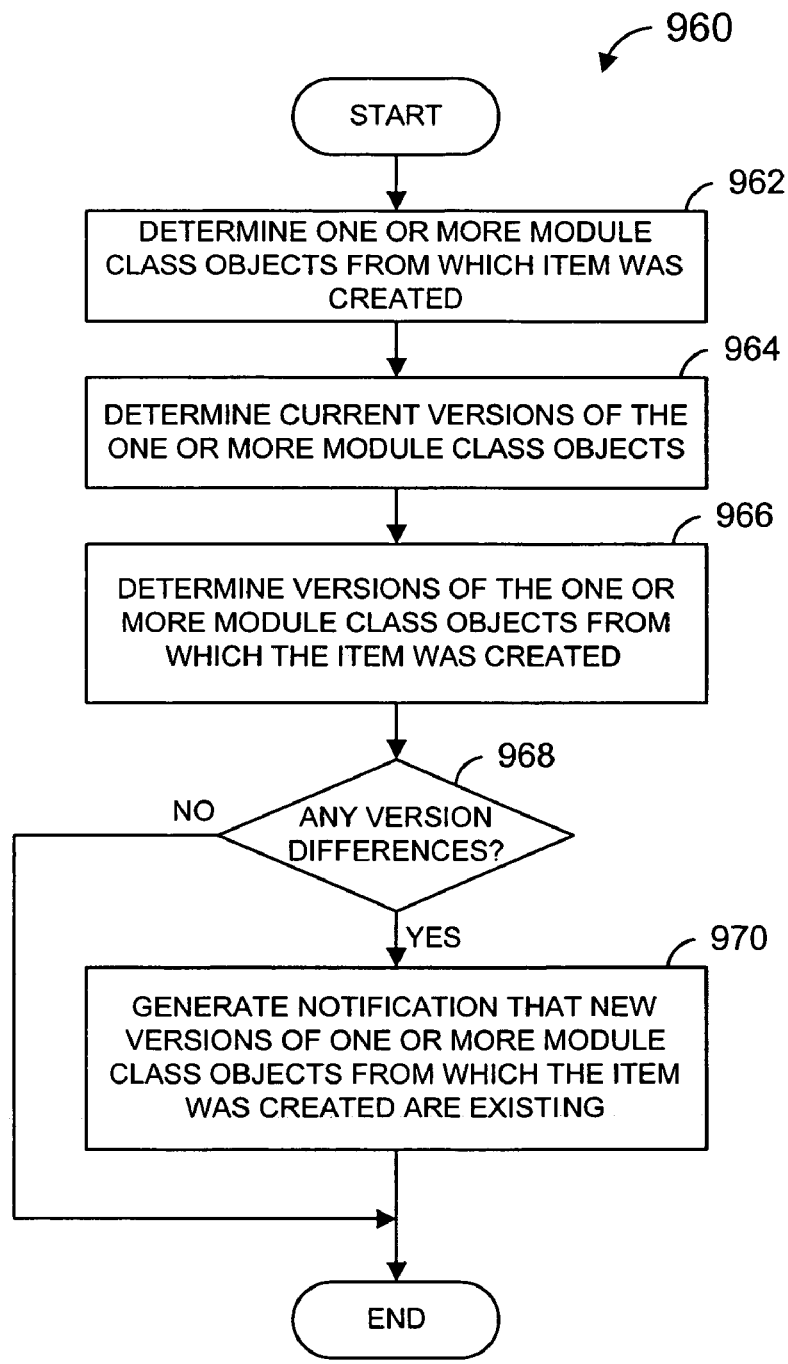
FIG. 26 is a flow diagram of an example routine for facilitating the configuration of a process plant item.

FIG. 26 is a flow diagram of an example routine 960 for facilitating the configuration of a process plant item. The routine 960 may be implemented, for example, when a process plant item is displayed on a display screen by a configuration application. The process plant item may comprise module objects and/or module class objects, for example. The routine 960 may be implemented by the configuration applications 906 and/or the VCAT system 908 of FIG. 23, for example, and will be discussed with reference to FIG. 23.

At a block 962, it may be determined which, if any, module class objects were used to create the item. For example, a first module class object could have been used to create a second module class object, which in turn was used to create the item. If one or more module class objects were used to create the item, at the block 964 a current version of each of those module class objects may be determined. At a block 966, the version of each the module class objects used to create the item may be determined. For example, the version identifiers stored and associated with the item at the block 942 of FIG. 24 could be retrieved.

At a block 968, it may be determined, for each of the module class objects used to create the item, if the current version of the module class object is different than the version of the module class object used to create the item. If there are no differences, the routine may end. If, however, one or more differences are detected, a notification may be generated at the block 970. The notification generally may indicate that a new version of a module class object used to create the item is available. The notification may comprise text, symbols, colors, an audio prompt, etc. For example, a text box or window may be displayed next to, or overlapping with, a graphical representation of the item on a configuration display screen. As another example, a symbol may be displayed on or near the item representation. As yet another example, the color, brightness, etc., of the item representation may be changed. The notification itself may indicate which module class object(s) have a new version available. Alternatively, the notification may not notify the user which module class object(s) have a new version available, but the user can perform additional steps to determine that information by, for example, selecting a menu item, "double-clicking" on a symbol, "drilling down" into the item, etc.

Optionally, the user may then be provided with a user interface mechanism for initiating a process to modify the process plant item by updating the item using the new versions of the module class objects. For example, the user may be provided with a button, for example, to start the process. As another example, the user may be provided with a user interface mechanism to select which of possibly several module class objects having new versions are to be used to update the process plant item. For example, the user may be able to check boxes, highlight graphical representations, etc., corresponding to the module class objects having new versions that are to be used to update the process plant item.

Figure 27:
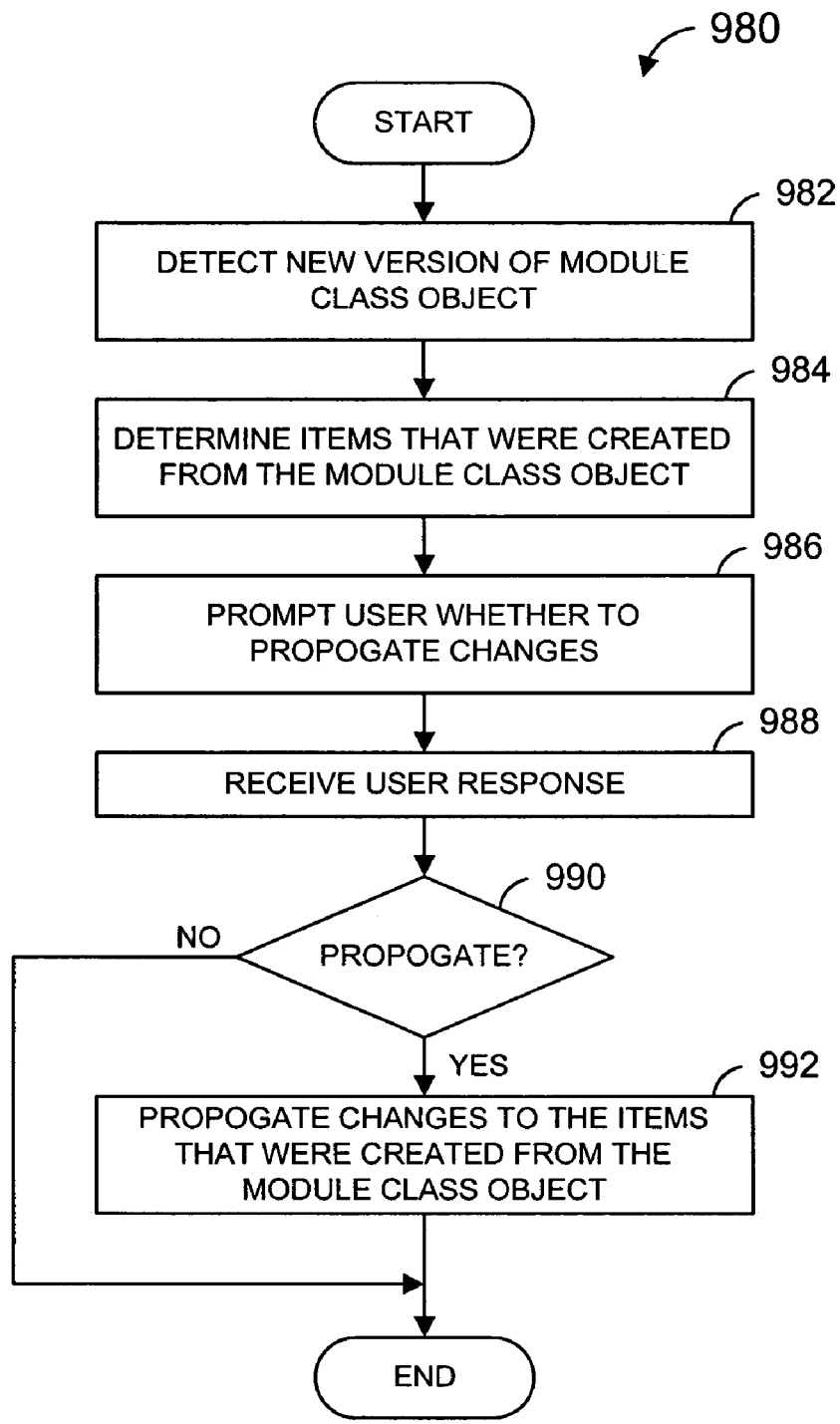
FIG. 27 is a flow diagram of an example routine for facilitating the configuration of process plant items.

FIG. 27 is a flow diagram of an example routine 980 for facilitating the configuration of process plant items. The routine 980 may be implemented, for example, when a process plant items are being modified and/or "checked in." The process plant item may comprise a module class object, for example. The routine 980 may be implemented by the configuration applications 906 and/or the VCAT system 908 of FIG. 23, for example, and will be discussed with reference to FIG. 23.

At a block 982, it may be determined whether a new version of a module class object has been created. For example, it could be detected when a new version module class object has been "checked in." At a block 984, process plant items that were created using the module class object may be determined. Referring to FIG. 6, for example, the memory 526 could be examined to determine which module objects that were created from the module class object. Also, the memory 526 or some other memory or section could be examined to determine which other module class objects were created from the module class object.

At a block 986, the user could be prompted as to whether the changes to the module class objects should be propagated to one or more of the process plant items identified at the block 984. For example, a text box, window, display screen, audio prompt, etc. may be used to prompt the user.

Optionally, the user may be provided with a user interface mechanism to select particular process plant items identified at the block 984 to which changes are to be propagated. For example, the user may be able to check boxes, highlight graphical representations, etc., corresponding to the process plant items to which changes are to be propagated.

At a block 988, a user response to the prompt generated by the block 986 is received. At a block 990, it may be determined if the user response indicates that the changes are to be propagated. If the changes are not to be propagated, the routine may end. If the changes are to propagates, at a block 992, the changes are propagated to the process plant items identified at the block 984. Optionally, the changes may be propagated to selected ones of the process plant items identified at the block 984.

Although FIGS. 17, 19–22, and 24–27 were described with respect to process plant items, similar routines may be used for limiting access to, tracking changes made to, propagating changes with respect to sequences of control steps to be performed by process plant items. For example, routines similar to those of FIGS. 17, 19–22, and 24–27 may be used to limit access to, track changes made to, propagate changes with respect to phase classes, unit phases, and/or groups of phase classes or unit phases.

Figure 28:
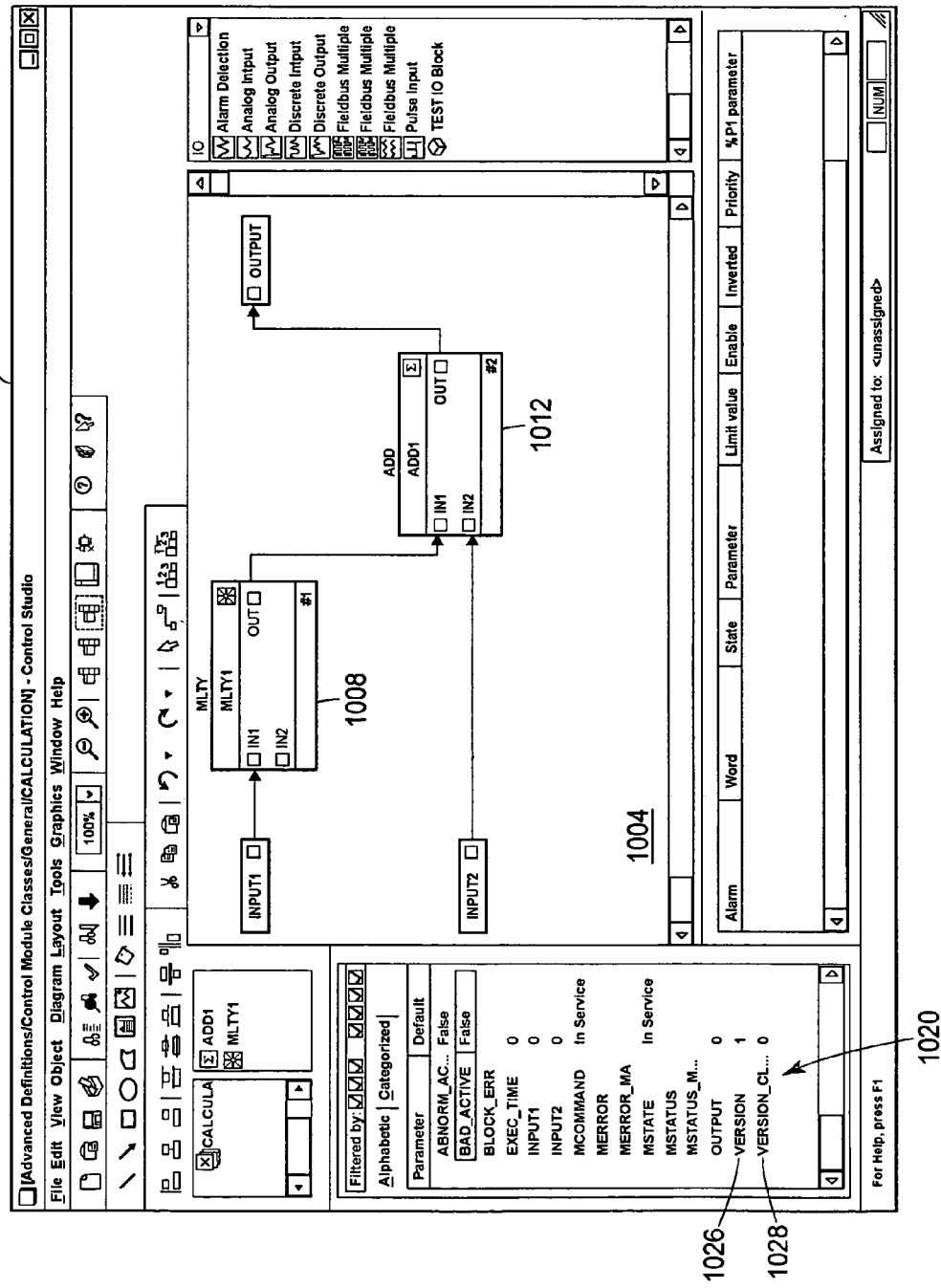
FIG. 28 is an example screen display of a user interface for configuring a module class object.

FIG. 28 is an example screen display 1000 of a user interface for configuring a module class object. In the screen display 1000, details of a module class object called "CALCULATION" are shown. The screen display 1000 includes an editing portion 1004 for editing the object. As shown in FIG. 28, the CALCULATION module class object comprises a multiplier function block 1008 and an adder function block 1012. The screen display 1000 also includes a portion 1020 that indicates parameters of the CALCULATION module class object that will not be hidden if access to the CALCULATION module class object were limited. Parameters that will not be hidden include a version indicator 1026 that indicates a version of a module object created from the CALCULATION module class object, and a version indicator 1028 that indicates a version of the CALCULATION module class object.

Figure 29:
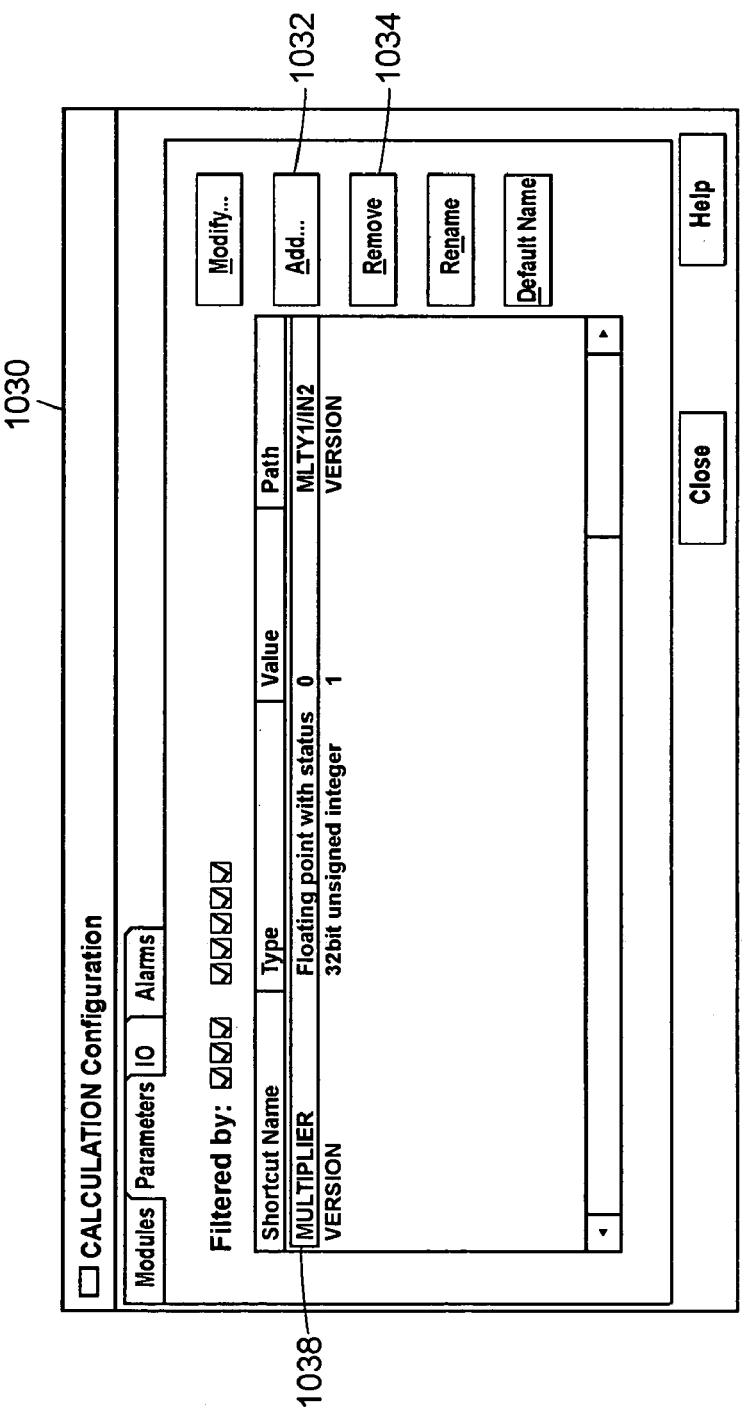
FIG. 29 is another example screen display of a user interface for configuring a module class object.

FIG. 29 is another example screen display 1030 of a user interface for determining parameters of the CALCULATION module class object that will not be hidden. The screen display 1030 includes buttons 1032 and 1034 for adding and removing, respectively, parameters from the group of parameters that will not be hidden. The screen display 1030 shows that a MULTIPLIER parameter 1038 will be added to the group of parameters that will not be hidden. Referring also to FIG. 28, the MULTIPLIER parameter 1038 corresponds to the input "IN2" of the multiplier block 1008.

Figure 30:
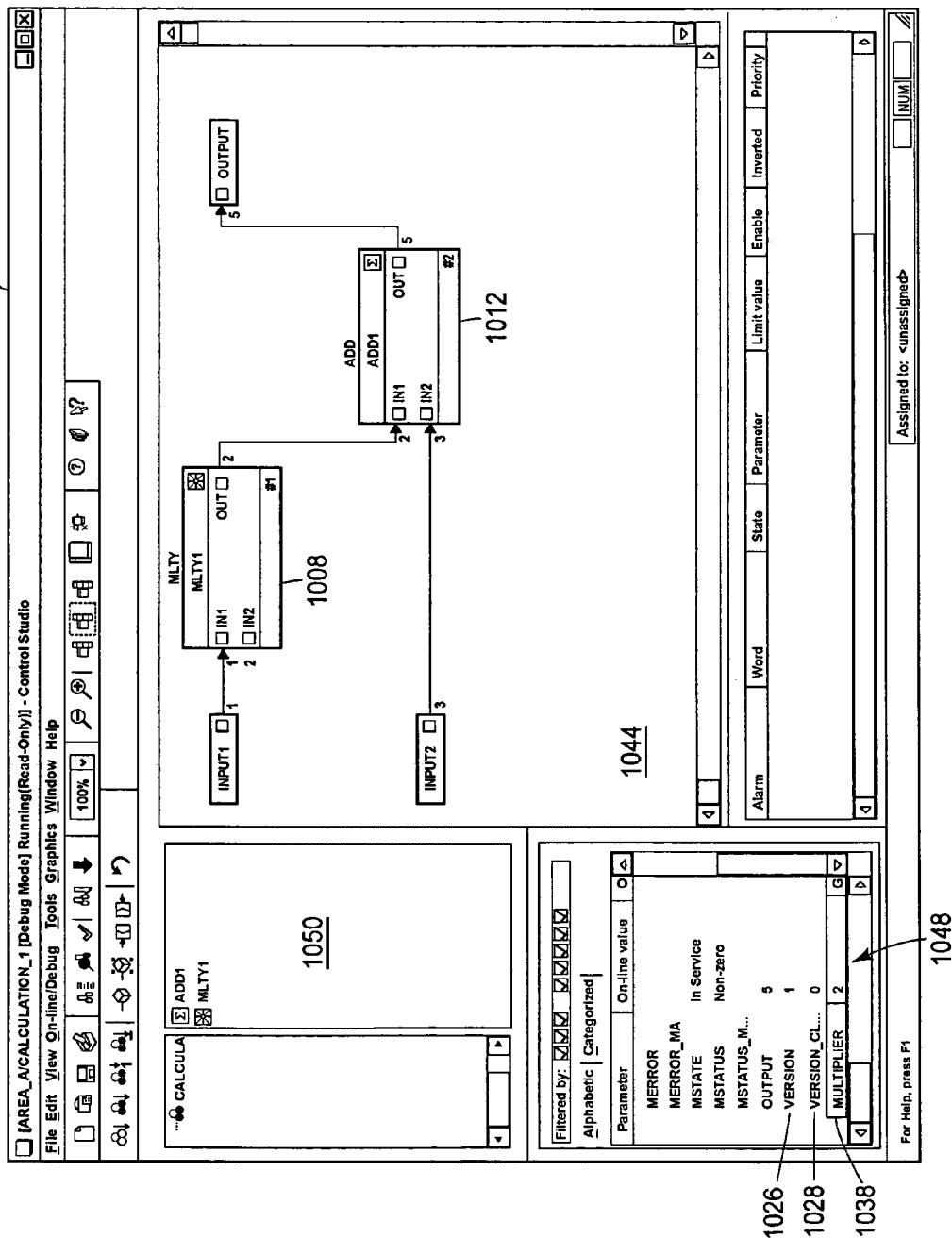
FIG. 30 is an example screen display of a user interface for debugging a module object in which data associated with the module object is not hidden.

FIG. 30 is an example screen display 1040 of a user interface for a debugging application. In the screen display 1040, details of a CALCULATION_1 module object are shown. The CALCULATION_1 module object has been created from the CALCULATION module class object. In this example, access to the CALCULATION module class object has not been limited. Therefore, the screen display 1040 generally shows details of the sub-elements of which the CALCULATION_1 module object is comprised. For example, a portion 1044 shows that the CALCULATION_1 module object comprises the multiplier function block 1008 and the adder function block 1012. The screen display 1040 also includes a portion 1048 that indicates parameters of the CALCULATION_1 module object. For example, the CALCULATION_1 module object includes the version indicators 1026 and 1028 and the MULTIPLIER parameter 1038. Additionally, the screen display 1040 also includes a portion 1050 that indicates function blocks of which the CALCULATION_1 module object is comprised. Namely, the portion 1050 indicates that the CALCULATION_1 module object comprises an adder function block and a multiplier function block.

Figure 31:
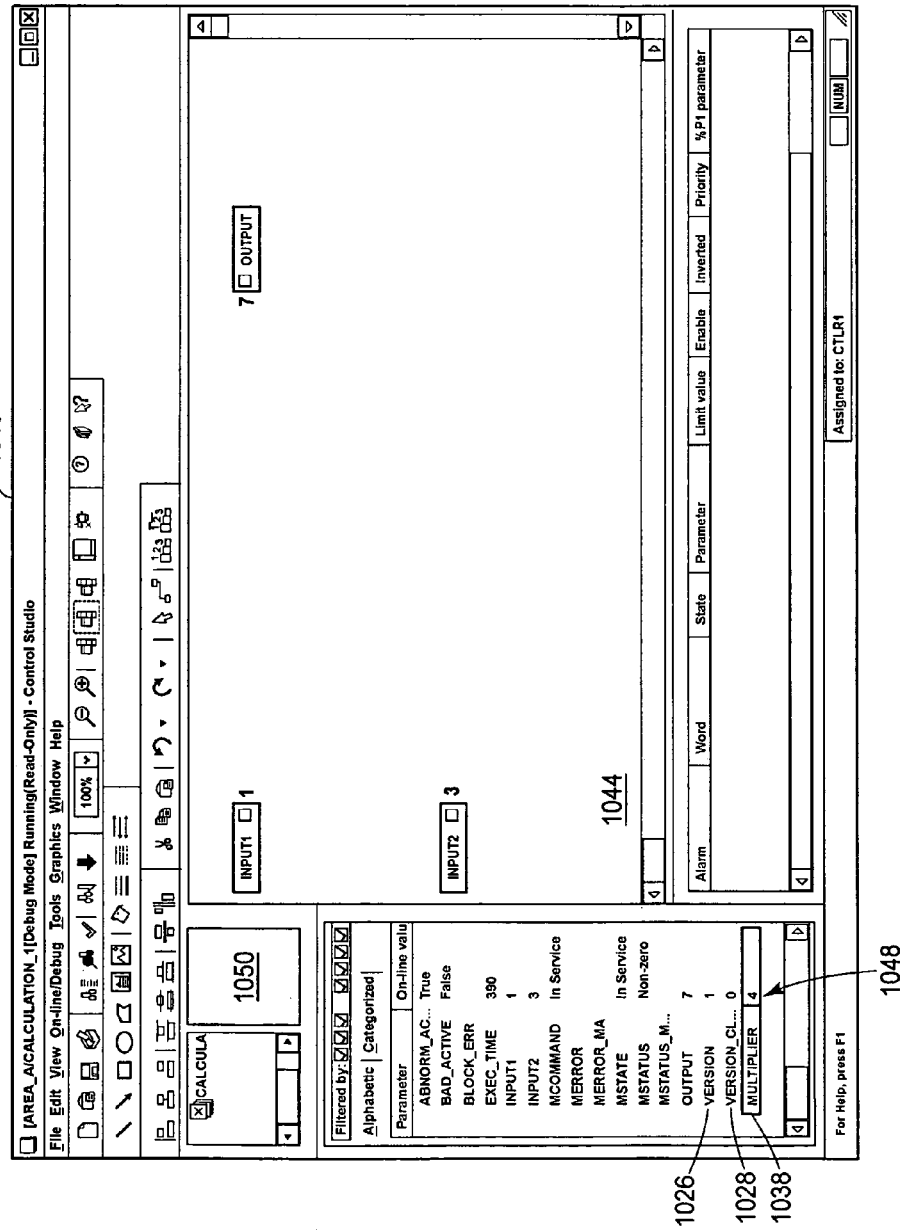
FIG. 31 is the example screen display of FIG. 30 but in which data associated with the module object is hidden.

FIG. 31 is the example screen display 1040 in the case in which access to the CALCULATION module class object has been limited. Therefore, the screen display 1040 generally does not show all the details of the sub-elements of which the CALCULATION 1 module object is comprised. For example, the portions 1044 and 1050 do not show that the CALCULATION_1 module object comprises the multiplier function block 1008 and the adder function block 1012. The portion 1048, however, still indicates the parameters of the CALCULATION_1 module object.

It will be understood by those of ordinary skill in the art that various modifications of the techniques described herein may be employed. For example, the orders of blocks may be changed, blocks may be omitted, new blocks may be added, etc. Further, various techniques described herein could be combined. For example, a routine similar to the routine 700 of FIG. 17 could be used to protect some data associated with a module class object. Then, a module template could be created from the module class object. Next, a routine similar to the routine 700 of FIG. 17 could be used to protect some data associated with a module template that was not protected with respect to the module class object. Then, a particular instance of the module template could be created that included the protection specified with respect to the module class object and the module template.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An object entity for use in configuring a process plant, the object entity comprising:
   a computer readable memory;
   a class object stored on the computer readable memory, the class object generically representing a process entity within the process plant and including:
   a first memory storage adapted to store indications of one or more process elements making up the process entity;
   a second memory storage adapted to store a reference to one or more module objects, each module object created from the class object to include indications of one or more specific process elements conforming to the one or more process elements making up the process entity and programming tied to the one or more specific process elements to be executed during operation of the process plant; and
   a third memory storage adapted to store data indicative of a version of the class object.

2. An object entity as defined in claim 1, further comprising:
   a fourth memory storage adapted to store a reference to one or more other module class objects from which the class object was created; and
   a fifth memory storage adapted to store data indicative of respective versions of the one or more other module class objects.

3. An object entity as defined in claim 1, wherein the process entity comprises a unit and wherein the one or more process elements comprise one or more sub-elements of the unit.

4. An object entity as defined in claim 1, wherein the process entity comprises an equipment entity and wherein the one or more process elements comprise one or more sub-elements of the equipment entity.

5. An object entity as defined in claim 1, wherein the process entity comprises a control element and wherein the one or more process elements comprise a generic control routine adapted to be used to provide control activities within the process plant.

6. An object entity as defined in claim 1, wherein the process entity comprises a display element and wherein the one or more process elements comprise a generic display routine adapted to be used to provide display activities to a user within the process plant.

7. An object entity for use in configuring a process plant, the object entity comprising:
   a computer readable memory;
   a class object stored on the computer readable memory, the class object specifically representing a process entity within the process plant and including:
   a first memory storage adapted to store indications of one or more functions to be performed by the process entity during operation of the process plant;
   a second memory storage adapted to store data indicative of a version of the class object;
   a third memory storage adapted to store a reference to one or more module class objects from which the class object was created; and
   a fourth memory storage adapted to store data indicative of respective versions of the one or more module class objects.

8. An object entity as defined in claim 7, wherein the process entity comprises a unit and wherein one or more process elements comprise one or more sub-elements of the unit.

9. An object entity as defined in claim 7, wherein the process entity comprises an equipment entity and wherein one or more process elements comprise one or more sub-elements of the equipment entity.

10. An object entity as defined in claim 7, wherein the process entity comprises a control element and wherein one or more process elements comprise a generic control routine adapted to be used to provide control activities within the process plant.

11. An object entity as defined in claim 7, wherein the process entity comprises a display element and wherein one or more process elements comprise a generic display routine adapted to be used to provide display activities to a user within the process plant.

* * * * *

UNITED STATES PATENT AND TRADEMARK OFFICE
CERTIFICATE OF CORRECTION

| | | |
|---|---|---|
| PATENT NO. | : 7,117,052 B2 | Page 1 of 2 |
| APPLICATION NO. | : 10/853668 | |
| DATED | : October 3, 2006 | |
| INVENTOR(S) | : John M. Lucas et al. | |

It is certified that error appears in the above-identified patent and that said Letters Patent is hereby corrected as shown below:

<u>Title Page:</u>

Item (75) Inventors:, 8$^{th}$ named Inventor, "Herschel O. Koska" should be --Herschel O. Koska, II --

<u>In the Drawings:</u>

At Sheet 24, Fig. 25, 4$^{th}$ box, "PROPOGATE" should be -- PROPAGATE --.

At Sheet 26, Fig. 27, 4$^{th}$ box, "PROPOGATE" should be -- PROPAGATE --.

At Sheet 26, Fig. 27, 6$^{th}$ box, "PROPOGATE" should be -- PROPAGATE --.

At Sheet 26, Fig. 27, 7$^{th}$ box, "PROPOGATE" should be -- PROPAGATE --.

<u>In the Specification:</u>

At Column 8, line 61, "Reactor)_01" should be -- Reactor_01 --.

At Column 9, line 25, "totalizes" should be -- totalizers --.

At Column 14, line 46, "each of is" should be -- each of which is --.

At Column 20, line 37, "change, and" should be -- change and --.

At Column 30, line 22, "input that indicating" should be -- input indicating --.

At Column 31, line 39, "objects" should be -- object --.

At Column 31, line 50, "FIG. 118B" should be -- FIG. 18B --.

At Column 33, lines 24-25, "protected in" should be -- protected. In --.

At Column 35, line 48, "Version b 1" should be -- Version 1 --.

At Column 37, line 31, "objects that were" should be -- objects were --.

At Column 38, line 52, "when a" should be-- when --.

UNITED STATES PATENT AND TRADEMARK OFFICE
CERTIFICATE OF CORRECTION

PATENT NO. : 7,117,052 B2
APPLICATION NO. : 10/853668
DATED : October 3, 2006
INVENTOR(S) : John M. Lucas et al.

It is certified that error appears in the above-identified patent and that said Letters Patent is hereby corrected as shown below:

In the Specification (cont'd):

At Column 38, line 66, "objects that were" should be -- objects were --.

At Column 39, line 18, "to propagates" should be -- to be propagated --.

Signed and Sealed this

Eleventh Day of September, 2007

JON W. DUDAS
*Director of the United States Patent and Trademark Office*